US008027637B1

(12) United States Patent
Bims

(10) Patent No.: US 8,027,637 B1
(45) Date of Patent: Sep. 27, 2011

(54) SINGLE FREQUENCY WIRELESS COMMUNICATION SYSTEM

(75) Inventor: Harry Bims, Menlo Park, CA (US)

(73) Assignee: Broadcom Corporation, Irvine, CA (US)

(*) Notice: Subject to any disclaimer, the term of this patent is extended or adjusted under 35 U.S.C. 154(b) by 1201 days.

(21) Appl. No.: 10/661,107

(22) Filed: Sep. 12, 2003

Related U.S. Application Data

(63) Continuation-in-part of application No. 10/044,016, filed on Jan. 11, 2002, now Pat. No. 6,788,658.

(51) Int. Cl.
*H04B 7/14* (2006.01)
(52) U.S. Cl. ........................... 455/16; 455/18
(58) Field of Classification Search ............... 455/13.1, 455/16
See application file for complete search history.

(56) References Cited

U.S. PATENT DOCUMENTS

| | | | |
|---|---|---|---|
| 4,284,848 A | | 8/1981 | Frost |
| 4,363,129 A | * | 12/1982 | Cohn et al. ............... 455/17 |
| 4,534,061 A | | 8/1985 | Ulug |
| 5,093,927 A | * | 3/1992 | Shanley .................. 455/513 |
| 5,384,776 A | * | 1/1995 | Gulliford et al. ........... 370/438 |
| 5,392,449 A | | 2/1995 | Shaughnessy et al. |
| 5,461,627 A | | 10/1995 | Rypinski |
| 5,475,683 A | | 12/1995 | Harrison et al. |
| 5,479,400 A | | 12/1995 | Dilworth et al. |
| 5,507,035 A | | 4/1996 | Bantz et al. |
| 5,594,731 A | | 1/1997 | Reissner |
| 5,636,220 A | | 6/1997 | Vook et al. |
| 5,717,688 A | | 2/1998 | Belanger et al. |
| 5,732,076 A | * | 3/1998 | Ketseoglou et al. ......... 370/347 |
| 5,774,461 A | | 6/1998 | Hyden et al. |
| 5,815,811 A | | 9/1998 | Pinard et al. |
| 5,818,829 A | * | 10/1998 | Raith et al. ............... 370/347 |
| 5,825,776 A | | 10/1998 | Moon |
| 5,838,226 A | * | 11/1998 | Houggy et al. ........... 340/310.11 |
| 5,862,481 A | | 1/1999 | Kulkarni et al. |
| 5,864,579 A | * | 1/1999 | Briskman .................. 375/130 |
| 5,875,179 A | | 2/1999 | Tikalsky |
| 5,875,186 A | | 2/1999 | Belanger et al. |

(Continued)

FOREIGN PATENT DOCUMENTS

WO WO 96/22636 7/1996

OTHER PUBLICATIONS

Bahl, Paramvir and Padmanabhan, Venkata N., "Radar: An In-Building RF-based User Location and Tracking System," Proceedings of IEEE INFOCOMM 200, Mar. 2000, pp. 775-784.

(Continued)

*Primary Examiner* — Lester Kincaid
*Assistant Examiner* — Joel Ajayi
(74) *Attorney, Agent, or Firm* — Sterne, Kessler, Goldstein & Fox P.L.L.C.

(57) ABSTRACT

A method and apparatus for communicating between devices is described. In one embodiment, the method comprises one or more communication devices coordinating transmissions of data packets to function as an access point with respect to a first mobile station and a second station wirelessly communicatively coupled to the one or more communication devices, and the one or more communication devices wirelessly transmitting a first packet and a second packet to the first mobile station and the second mobile station respectively at different time or at time when the transmissions overlap, at least partially, based on whether transmissions of the first and second packets would interfere with each other.

30 Claims, 38 Drawing Sheets

U.S. PATENT DOCUMENTS

| | | | |
|---|---|---|---|
| 5,903,834 A | 5/1999 | Wallstedt et al. | |
| 5,923,702 A | 7/1999 | Brenner et al. | |
| 5,926,758 A * | 7/1999 | Grybos et al. | 455/429 |
| 5,946,308 A | 8/1999 | Dobbins et al. | |
| 5,958,018 A | 9/1999 | Eng et al. | |
| 5,968,126 A | 10/1999 | Ekstrom et al. | |
| 5,979,757 A | 11/1999 | Tracy et al. | |
| 5,987,062 A | 11/1999 | Engwer et al. | |
| 5,991,287 A | 11/1999 | Diepstraten et al. | |
| 6,002,918 A | 12/1999 | Heiman et al. | |
| 6,023,604 A * | 2/2000 | Tsuboike et al. | 455/12.1 |
| 6,038,448 A | 3/2000 | Chheda et al. | |
| 6,058,106 A | 5/2000 | Cudak et al. | |
| 6,067,297 A | 5/2000 | Beach | |
| 6,084,528 A | 7/2000 | Beach et al. | |
| 6,085,238 A | 7/2000 | Yuasa et al. | |
| 6,097,707 A | 8/2000 | Hodzic et al. | |
| 6,115,615 A * | 9/2000 | Ota et al. | 455/422.1 |
| 6,130,896 A | 10/2000 | Lueker et al. | |
| 6,137,791 A | 10/2000 | Frid et al. | |
| 6,137,802 A | 10/2000 | Jones et al. | |
| 6,138,009 A | 10/2000 | Birgerson | |
| 6,178,426 B1 | 1/2001 | Klein et al. | |
| 6,188,681 B1 | 2/2001 | Vesuna | |
| 6,188,898 B1 | 2/2001 | Phillips | |
| 6,199,753 B1 | 3/2001 | Tracy et al. | |
| 6,243,581 B1 | 6/2001 | Jawanda | |
| 6,253,082 B1 | 6/2001 | Hengeveld | |
| 6,259,898 B1 | 7/2001 | Lewis | |
| 6,285,665 B1 | 9/2001 | Chuah | |
| 6,285,886 B1 * | 9/2001 | Kamel et al. | 455/522 |
| 6,307,837 B1 | 10/2001 | Ichikawa et al. | |
| 6,370,380 B1 | 4/2002 | Norefors et al. | |
| 6,396,841 B1 | 5/2002 | Co et al. | |
| 6,404,772 B1 | 6/2002 | Beach et al. | |
| 6,405,049 B2 | 6/2002 | Herrod et al. | |
| 6,411,608 B2 | 6/2002 | Sharony | |
| 6,452,915 B1 | 9/2002 | Jorgensen | |
| 6,459,700 B1 | 10/2002 | Hoang | |
| 6,477,670 B1 | 11/2002 | Ahmadvand | |
| 6,487,184 B1 | 11/2002 | Pecen et al. | |
| 6,501,582 B2 | 12/2002 | Chiou et al. | |
| 6,522,880 B1 | 2/2003 | Verma et al. | |
| 6,556,547 B1 | 4/2003 | Srikanth et al. | |
| 6,594,475 B1 | 7/2003 | Anvekar et al. | |
| 6,611,547 B1 | 8/2003 | Rauhala | |
| 6,683,866 B1 | 1/2004 | Stanwood et al. | |
| 6,717,924 B2 * | 4/2004 | Ho et al. | 370/311 |
| 6,757,286 B1 | 6/2004 | Stone | |
| 6,760,318 B1 | 7/2004 | Bims | |
| 6,760,877 B1 | 7/2004 | Lappetelainen et al. | |
| 6,788,658 B1 | 9/2004 | Bims | |
| 6,799,054 B2 | 9/2004 | Shpak | |
| 6,834,192 B1 | 12/2004 | Watanabe et al. | |
| 6,836,469 B1 * | 12/2004 | Wu | 370/322 |
| 6,842,777 B1 | 1/2005 | Tuli | |
| 6,857,095 B2 | 2/2005 | Suumaki et al. | |
| 6,862,448 B1 | 3/2005 | Bims | |
| 7,035,633 B2 | 4/2006 | Kirkpatrick | |
| 7,103,511 B2 | 9/2006 | Petite | |
| 7,113,498 B2 | 9/2006 | Bajic | |
| 7,236,470 B1 | 6/2007 | Bims | |
| 2001/0024953 A1 | 9/2001 | Balogh | |
| 2002/0060995 A1 | 5/2002 | Cervello et al. | |
| 2002/0061763 A1 | 5/2002 | Weissman | |
| 2002/0075825 A1 | 6/2002 | Hills et al. | |
| 2002/0075844 A1 | 6/2002 | Hagen | |
| 2002/0131386 A1 | 9/2002 | Gwon | |
| 2002/0167965 A1 | 11/2002 | Beasley et al. | |
| 2002/0188723 A1 | 12/2002 | Choi et al. | |
| 2003/0051170 A1 | 3/2003 | Spearman | |
| 2003/0063583 A1 * | 4/2003 | Padovani et al. | 370/329 |
| 2003/0106067 A1 | 6/2003 | Hoskins et al. | |
| 2003/0112778 A1 * | 6/2003 | Lundby | 370/335 |
| 2003/0133422 A1 | 7/2003 | Bims | |
| 2003/0195002 A1 | 10/2003 | Singhal et al. | |
| 2007/0025349 A1 | 2/2007 | Bajic | |
| 2008/0031185 A1 | 2/2008 | Bims | |

OTHER PUBLICATIONS

Lucent Technologies Inc., Orinoco Manager Suite—User's Guide, Nov. 2000.

Messier, Andrew et al., "Performance Monitoring of a Wireless Campus Area Network," Local Computer Networks, 1997, Proceedings, 22$^{nd}$ Annual Conference on Nov. 1997, pp. 232-238.

PCT International Search Report mailed Apr. 15, 2003 for International Application No. PCT/US03/00783 (4 pages).

PCT International Search Report mailed Apr. 25, 2003 for International Application No. PCT/US03/0782.

Charles Perkins, Mobile IP, IEEE Communications Magazine, dated May 1997, pp. 84-99.

IEEE Std 802.11-1997, Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Published by IEEE dated 1997.

Bim, Harry, "Plug-n-playable Wireless Communication System" U.S. Appl. No. 10/661,163, filed Sep. 12, 2003.

Bim, Harry, "Tunneling Protocols for Wireless Communications" U.S. App. No. 10/661,218, filed Sep. 12, 2003.

* cited by examiner

SINGLE FREQUENCY WIRELESS COMMUNICATION SYSTEM

RELATED APPLICATIONS

The present patent application is a continuation-in-part (CIP) of, and claims priority to U.S. patent application Ser. No. 10/044,016, filed on Jan. 11, 2002 now U.S. Pat. No. 6,788,658, which is hereby incorporated by reference.

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of wireless communications; more particularly, the present invention relates to a single frequency wireless communication system.

BACKGROUND OF THE INVENTION

FIG. 1 illustrates an exemplary network environment used today. Referring to FIG. 1, a corporate Local Area Network (LAN) backbone 102 interfaces to a number of desktop computers $103_1$-$103_n$ and may interface to Internet 101. Corporate LAN backbone 102 may comprise a firewall 102A, corporate server 102B, and a standard Ethernet switch 102C. Ethernet switch 102C includes an interface by which desktops $103_1$-$103_n$ are coupled to the corporate LAN backbone 102 for access to corporate sever 102B and to Internet 101 (via firewall 102A).

More recently, wireless LANs (WLANs) are being installed. Many of the recently implemented WLANs operate according to the protocol set forth in the 802.11 Standard, particularly as more enterprises are adopting the 802.11 Standard. ISO|IEC DIS 8802.11

FIG. 2 illustrates one embodiment of an 802.11 based WLAN (LAN) system. Referring to FIG. 2, the Internet or other LAN 201 is coupled to an 802.11 server 203 via firewall (FW) 202. Server 203 communicates with mobile stations in a number of 802.11 cells $206_1$-$206_n$ using an access point in each of cells $206_1$-$206_n$, such as access point 204. Server 203 is coupled to access points such as access point 204, via an Ethernet connection. There is one access point for each of the 802.11 cells $206_1$-$206_n$. Mobile stations in each of the 802.11 cells, such as laptops $205_1$ and $205_2$ in cell $206_1$, communicate wirelessly with the access points via the 802.11 protocol. The communications from mobile stations in the 802.11 cells to the access points are forwarded through to server 203 and potentially to Internet/LAN 201, while communications from Internet/LAN 201 are forwarded through server 203 to the mobile stations via the access points.

There are a number of problems associated with the current implementations of 802.11 networks. For example, in order to set up an 802.11 network such as shown in FIG. 2, a site survey is required in order to determine where each of the access points are to be placed to ensure that the 802.11 cells provide complete coverage over a particular geographic area. This may be costly. Also, the cost of each of the access points is approximately $500.00. Generally, such a high cost is a deterrent to having a large number of access points. However, by reducing the number of access points, coverage diminishes and the 802.11 network is less effective. Furthermore, there are a number of mobility problems associated with the current 802.11 network deployments. For example, the 802.11 standard sets forth a number of solutions to handle the issue of mobility of mobile stations between the 802.11 cells. However, these schemes do not work effectively for real time applications, such as a voice related application, as there is no standard solution in place and users haven't indicated a desire for long-term proprietary solutions.

SUMMARY OF THE INVENTION

A method and apparatus for communicating between devices is described. In one embodiment, the method comprises one or more communication devices coordinating transmissions of data packets to function as an access point with respect to a first mobile station and a second station wirelessly communicatively coupled to the one or more communication devices, and the one or more communication devices wirelessly transmitting a first packet and a second packet to the first mobile station and the second mobile station respectively at different time or at time when the transmissions overlap, at least partially, based on whether transmissions of the first and second packets would interfere with each other.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
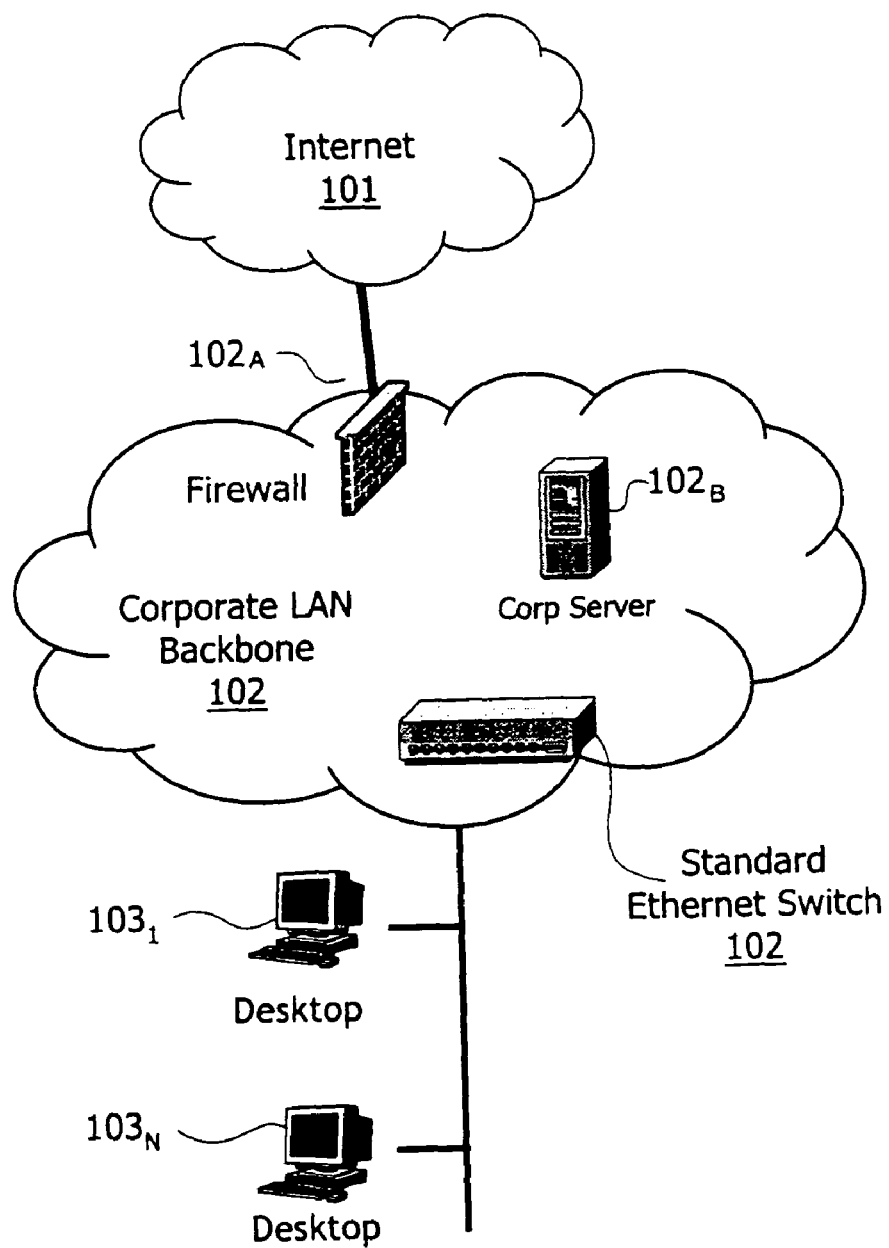
FIG. 1 illustrates an exemplary network environment used today.
Figure 2:
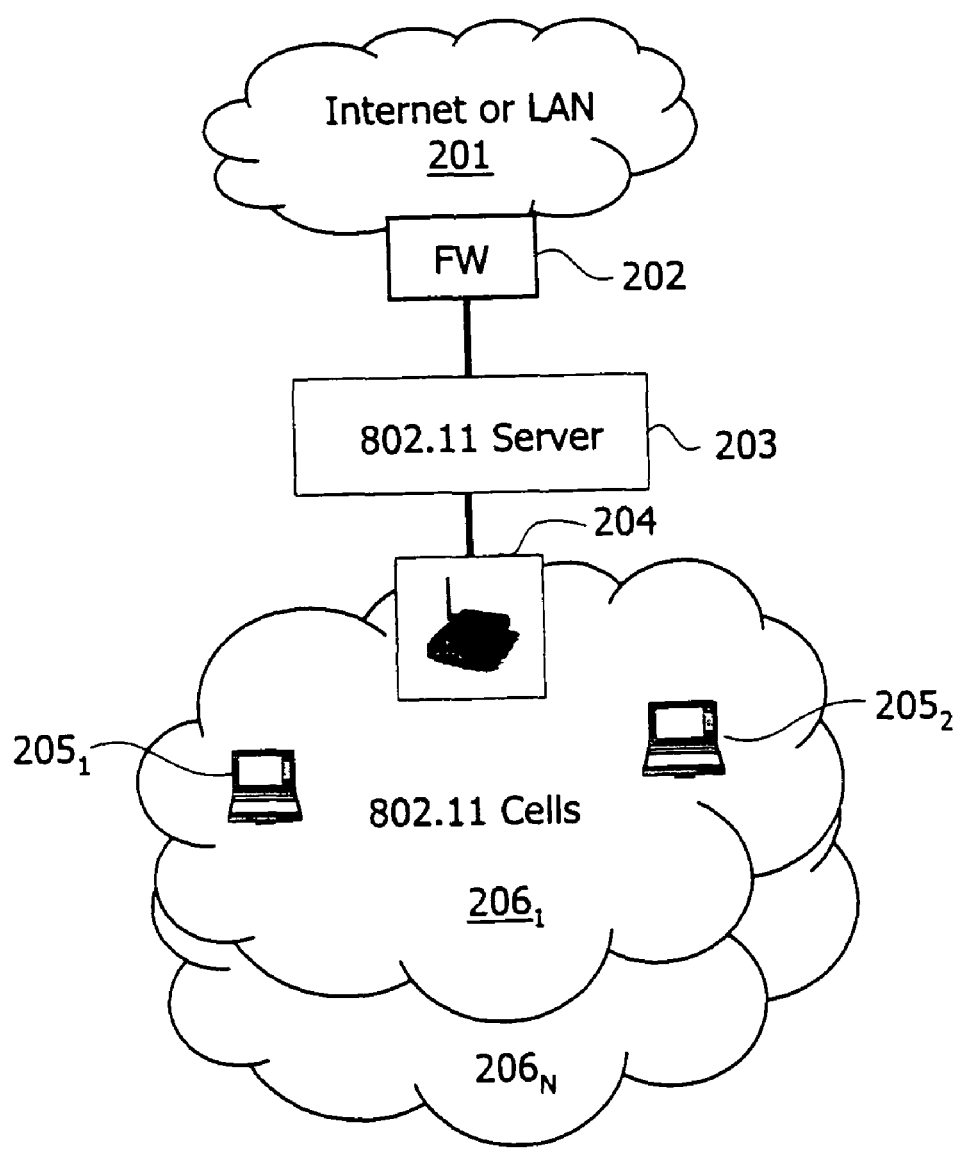
FIG. 2 illustrates one embodiment of an 802.11 based wireless LAN-based (LAN) system.

A communication system is described. In one embodiment, the communication system comprises a mobile station having a transmitter to transmit packets wirelessly according to a protocol and multiple repeaters communicably coupled with the mobile station. Each of the repeaters receives one or more packets of the wirelessly transmitted packets from the mobile station. In one embodiment, the repeater assigned to the mobile station (e.g., the repeater with the token of the mobile station) sends the body of each of the one or more packets along with a received signal strength for each of the one or more packets to a switch communicatively coupled to the repeaters. Each of the other repeaters determines which of the wirelessly transmitted packets they received without errors and a received signal strength for those packets. Each of these other repeaters forwards to the switch the received signal strength indication. Based on the received signal strength indication received from each of the repeaters, the switch determines whether to reassign the mobile station to another repeater, such as, for example, a repeater that receives the mobile station packets at a higher received signal strength than any other repeater.

In one embodiment, the repeaters are grouped and the switch handles each group of repeaters separately. Even so, if a mobile station moves to a location in which a different repeater in a different group is associated with the mobile station, any data buffered by the switch may be forwarded to the mobile device through the new repeater using a single data transfer within the switch.

In the following description, numerous details are set forth in order to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Exemplary Network Architecture

Figure 3:
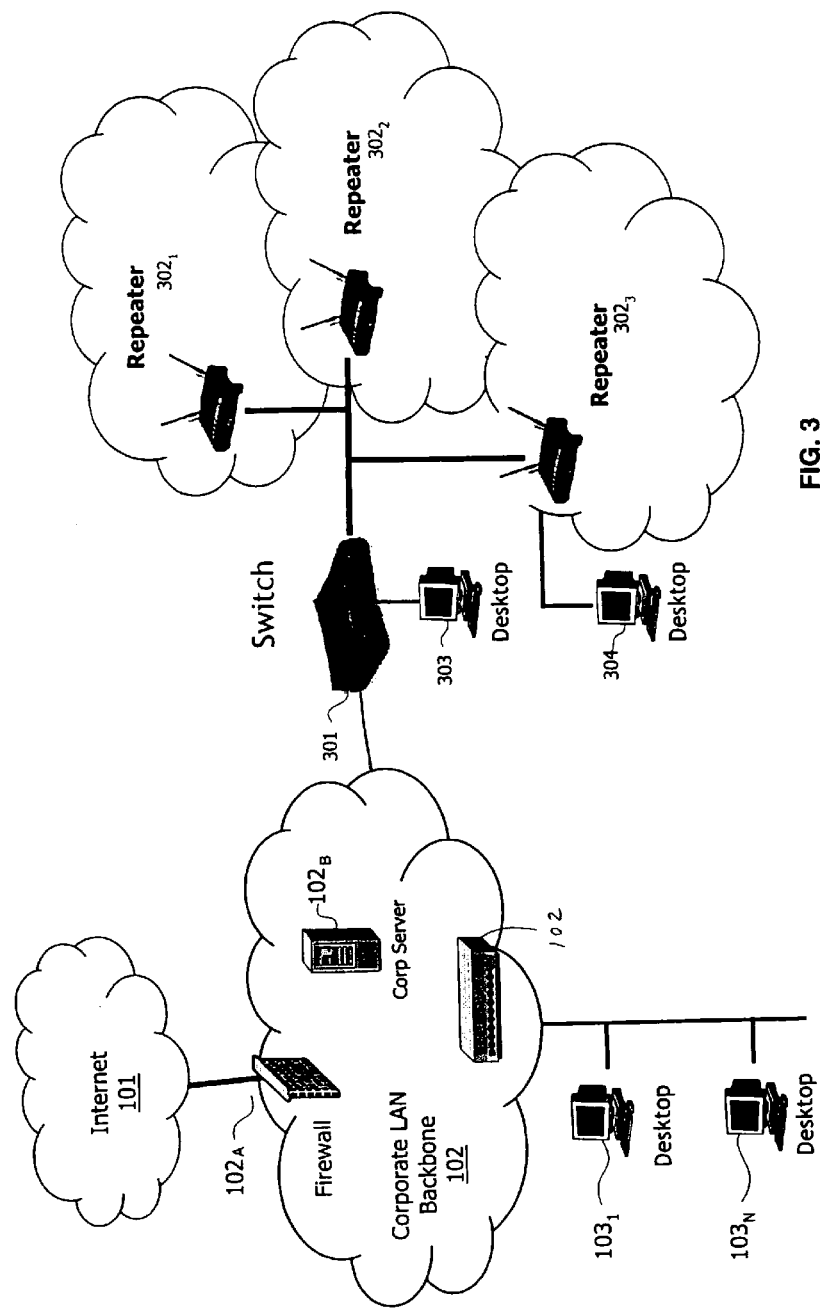
FIG. 3 illustrates one embodiment of a network architecture.

FIG. 3 illustrates one embodiment of a network architecture. Referring to FIG. 3, a LAN backbone 102 interfaces a number of desktops $103_1$-$103_n$ to Internet 101. Note that the present invention does not require that a LAN backbone be included. All that is necessary is that there be a communication mechanism that is capable of receiving packets from other devices and/or sending packets to other devices.

Similar to FIG. 1, LAN backbone 102 includes firewall 102A, corporate server 102B and Ethernet switch 102C. However, in contrast to FIG. 1, LAN backbone 102 also includes switch 301 which interfaces to repeaters $302_1$-$302_3$. Although only three repeaters are shown, alternative embodiments may utilize any number of repeaters with a minimum of one. In one embodiment, switch 301 is coupled to repeaters $302_1$-$302_3$ via a wired connection, such as cabling. In one embodiment, the wired connection may comprise CAT5 cabling.

Each of repeaters $302_1$-$302_3$ receives wireless communications from devices (e.g., mobile stations such as, for example, a mobile phone, a cellular phone, a cordless phone, a headset, a voice-enabled mobile station, a laptop computer system, a personal digital assistant, a computer-data-enabled mobile station, a speakerphone, video game controller, a DVD controller, a stereo controller, a TV controller, etc.) in the coverage areas of the repeaters. In one embodiment, these wireless communications are performed according to the 802.11 protocol. That is, each of the mobile stations in each of cells $310_1$-$310_n$ exchanges packets with repeaters $302_1$-$302_3$ using the 802.11 protocol.

In one embodiment, switch 301 includes 802.11 MAC (medium access control) protocol software and/or hardware that allows switch 301 to communicate with repeaters $302_1$-$302_3$. Different from the prior art, some of the 802.11 MAC functionality typically associated with the access points, as described above in the Background section, are not in repeaters $302_1$-$302_3$ and are, instead, centralized in switch 301. More specifically, the MAC layer is split between repeater $302_1$-$302_3$ and switch 301 to enable transfer of messages over wiring (e.g., CAT5 cabling). As such, repeaters $302_1$-$302_3$ and switch 301 coordinate to perform functionality of the 802.11 MAC layer as described below.

In one embodiment, switch 301 includes one or more Ethernet connectors (e.g., external Ethernet connector) to enable a computer system, such as desktop computer system 303, or other device, to have an Ethernet connection to LAN backbone 102 via switch 301. Similarly, in one embodiment, one or more of repeaters $302_1$-$302_3$ includes an Ethernet connector to enable a device (e.g., computer system, such as desktop computer system 304) to gain access, via a repeater, such as repeater $302_3$, to switch 301 and the rest of the communication system. In such a case, the wiring coupling switch 301 to repeaters $302_1$-$302_3$ may combine 802.11 information, including management and control (as opposed to solely data) information, with traditional Ethernet packets on the same wiring (e.g., CAT5).

In one embodiment, switch 301 may be implemented as a server that may be located within corporate LAN backbone 102 or other networks. The server may communicate with repeaters $302_1$-$302_3$ over the network (e.g., a layer 2 network). That is, the server includes, but not limited to, substantially all the functionality of switch 301 to handle communications between the server and repeaters $302_1$-$302_3$ over a layer 2 network. In this embodiment, repeaters $302_1$-$302_3$ are communicatively coupled, wired or wirelessly, to the network where the server is located (e.g., corporate LAN backbone 102), instead of a port of switch 301. The server communicates with the repeaters based on layer 2 information (e.g., MAC layer) of repeaters $302_1$-$302_3$. It will be appreciated that one or more networks (e.g., another Intranet or WAN) may exist between the network of the server (e.g., corporate LAN backbone 102) and repeaters $302_1$-$302_3$.

Distributed Receiver Diversity Approach

The network architecture described above allows for overlapping coverage between cells supported by the repeaters. This overlapping coverage allows for receiver diversity.

The packets from the mobile stations in each of the cells are broadcast and may be received by multiple repeaters. By allowing multiple repeaters to receive packets from one of the mobile stations, collisions and dropped packets may be reduced or avoided. For example, if a collision occurs or if a packet is dropped by one of the repeaters, then a particular packet can still be received by other repeaters. In this manner, the use of repeaters described herein provides for higher reliability.

In an embodiment in which mobile stations exchange packets with repeaters using the 802.11 protocol, each packet from a mobile station includes an Ethernet MAC address, which is embedded in the packet. Each packet may be received by one or more repeaters. Each repeater that receives a packet from a mobile station without errors (i.e., cleanly) determines the received signal strength of the packet in a manner well-known in the art. The received signal strength is converted into an indication, such as a received signal strength indicator (RSSI). In one embodiment, the RSSI is specified in a value from 1 to 127. These 128 discrete values can be mapped to dB signal strength values based on the particular implementation being used. In one embodiment, all repeaters send their RSSI for the packet to switch 301. The repeater that is assigned to the mobile station (e.g., has the token for the mobile station) sends the packet along with the RSSI. In one embodiment, the repeater encapsulates the packet into an Ethernet packet with the RSSI in a header and forwards the Ethernet packet to switch 301. In an alternative embodiment, each repeater receiving the packet without error forwards the packet, along with the RSSI to the switch. Thus, all packets received from mobile stations by a repeater without errors are forwarded to switch 301. Switch 301 knows which repeater sent the packet(s) because it is received on its preassigned port.

In one embodiment, the fact that a particular repeater received a packet without errors is communicated to all other repeaters. In one embodiment, this is accomplished by having the repeater send each encapsulated packet and its RSSI as a broadcast packet to switch 301. This broadcast packet is similar to those broadcast packets used in Ethernet and includes a special broadcast address, which is recognized by switch 301. In another embodiment, only the header of the packet, which includes the RSSI and uniquely identifies the packet, is encapsulated and sent as a broadcast packet to the other repeaters. In this case, the data portion of the packet is not forwarded.

In response to receiving the broadcast packet with the specific broadcast address, switch 301 broadcasts the packet on all of the other ports used for communication between switch 301 and the other repeaters.

In one embodiment, upon receiving a packet without error from a particular mobile station, the repeater sets a timer within which it is to receive packets received by other repeaters that are duplicates to the packet it has already received. When the timer expires, the repeater examines the RSSI of the packet it received (without error) with the RSSI values of duplicate packets received by other repeaters. Based on that information, the repeater determines if it is to send an acknowledgement packet for the subsequent transmission from the mobile station. Thus, if the time expires without receiving a duplicate packet, the repeater sends the acknowledgement. If the timer expires and the repeater receives a duplicate packet, thereafter, it is treated as a new packet. To avoid this, the timer time out value is set to handle the worst case time delay that a repeater may face in receiving duplicate packets.

In one embodiment the communication protocol used between the mobile stations and the repeater is a modified version of the 802.11 protocol in which acknowledgement packets are disabled and thus, not sent. By doing so, a repeater that is assigned to a particular mobile station in response to receiving a packet at a larger received signal strength than any other repeater may not be delayed in handling the packet, and thereby avoids missing a portion of a packet from the mobile station.

Note that switch 301 forwards each packet received from repeaters (note duplicates) to the remainder of the communication system (e.g., LAN backbone, other mobile stations, the Internet, etc.). In one embodiment, this occurs after de-duplication of packets so that only one copy of each packet is forwarded.

Once the broadcast packets have been received, in one embodiment, all the repeaters know what packets were received cleanly by the others and at what RSSI the packets were received by the other repeaters. Thereafter, each repeater selects the packet with the highest RSSI and determines the repeater that received it. In other words, each repeater performs a comparison on the received signal strength of the packets it received that were also received by one or more other repeaters. For each of the packets that a repeater receives at a power level higher than any of the other repeaters that received that packet, that repeater sends an acknowledgement back to the mobile station acknowledging that the packet was received without errors. This prevents all the repeaters that receive the packet cleanly from sending multiple acknowledgements to the mobile station.

In one embodiment, if two repeaters have the same receive signal strength for a packet, the repeater with the lower port number (the port number by which switch 301 is coupled to the repeater) is the repeater that is selected to send the acknowledgement to the mobile station. In this manner, only one repeater is selected to send the acknowledgement to the mobile station and, thus, the receiver diversity is handled in the network architecture in a distributed fashion. In one embodiment, to enable the repeaters to determine which is to send the acknowledgement in the case of a packet received with the same received signal strength by multiple repeaters, each packet includes identification information, such as its switch port number, to enable the determination of which has the lowest port number. Note, in an alternative embodiment, the repeater with the highest port number may be the one to send the acknowledgement or other pre-assigned priority information may be used by the repeaters in such situations.

In an alternative embodiment, instead of using the port number to determine which repeater is to send the acknowledgement when two repeaters have the same received signal strength, the repeater MAC address may be used. For example, the repeater with the lowest MAC address may send the acknowledgement packet, or alternatively, the repeater with the highest MAC address may send the acknowledgement packet. Using the repeater MAC address for the determination is preferred in cases where a layer 2 network is communicatively coupled between the repeaters and the switch such that a single port is used by multiple repeaters.

Figure 4A:
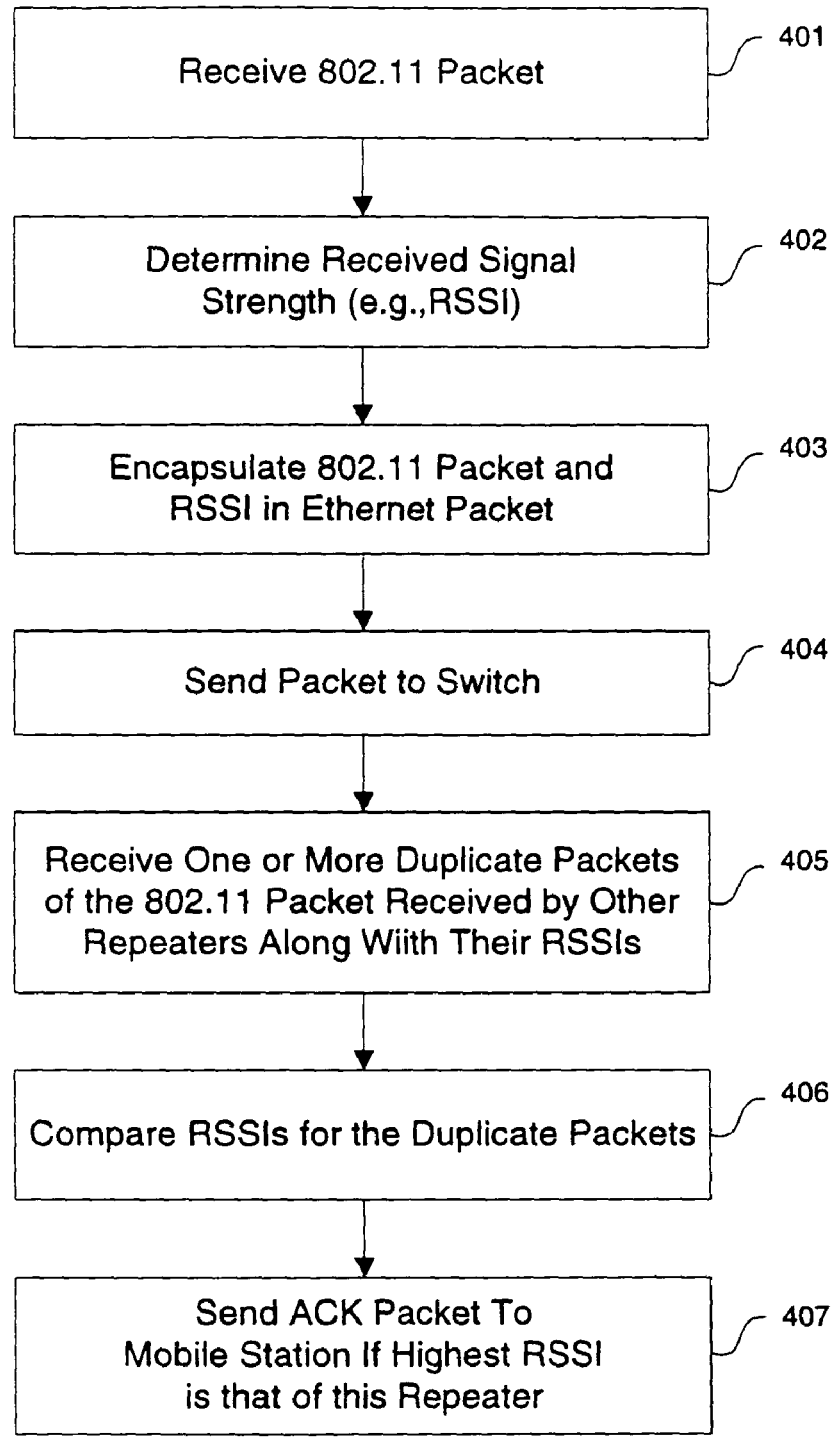
FIG. 4A is a flow diagram of one embodiment of a receiver diversity processing performed by a repeater.

FIG. 4A is a flow diagram of one embodiment of a receiver diversity process performed by a repeater. The process is performed by processing logic that may comprise hardware (circuitry, dedicated logic, etc.), software (such as is run on a general purpose computer system or a dedicated machine), or a combination of both.

Referring to FIG. 4A, processing logic initially receives an 802.11 packet (processing block 401). In response to the 802.11 packet, processing logic determines the received signal strength (e.g., RSSI) (processing block 402). In one embodiment, this processing logic comprises a hardware mechanism, such as a radio frequency (RF) device (e.g., integrated circuit (e.g., RF IC 1002 in FIG. 10)) in the repeater. In such a case, the RF device sends the RSSI to a baseband processor in the repeater.

Thereafter, processing logic encapsulates 802.11 packet and RSSI in an Ethernet packet (processing block 403) and sends the Ethernet packet to the switch (processing block 404). In one embodiment, a baseband processor (e.g., baseband processor 1001 in FIG. 10) performs the encapsulation and sends the Ethernet packet to the switch.

Later in time, processing logic receives one or more packets from the switch that are duplicates of the 802.11 packet. These duplicate packets are transmitted by other repeaters and encapsulated by those repeaters, along with their RSSIs (processing block 405). Processing logic in the repeater compares RSSIs for the duplicate packets (processing block 406). In one embodiment, a baseband processor (e.g., baseband processor 1001 in FIG. 10) performs the comparison. If the repeater determines it received the 802.11 packet with the highest RSSI, then processing logic sends the acknowledgment packet to the mobile station (processing block 407).

Figure 4B:
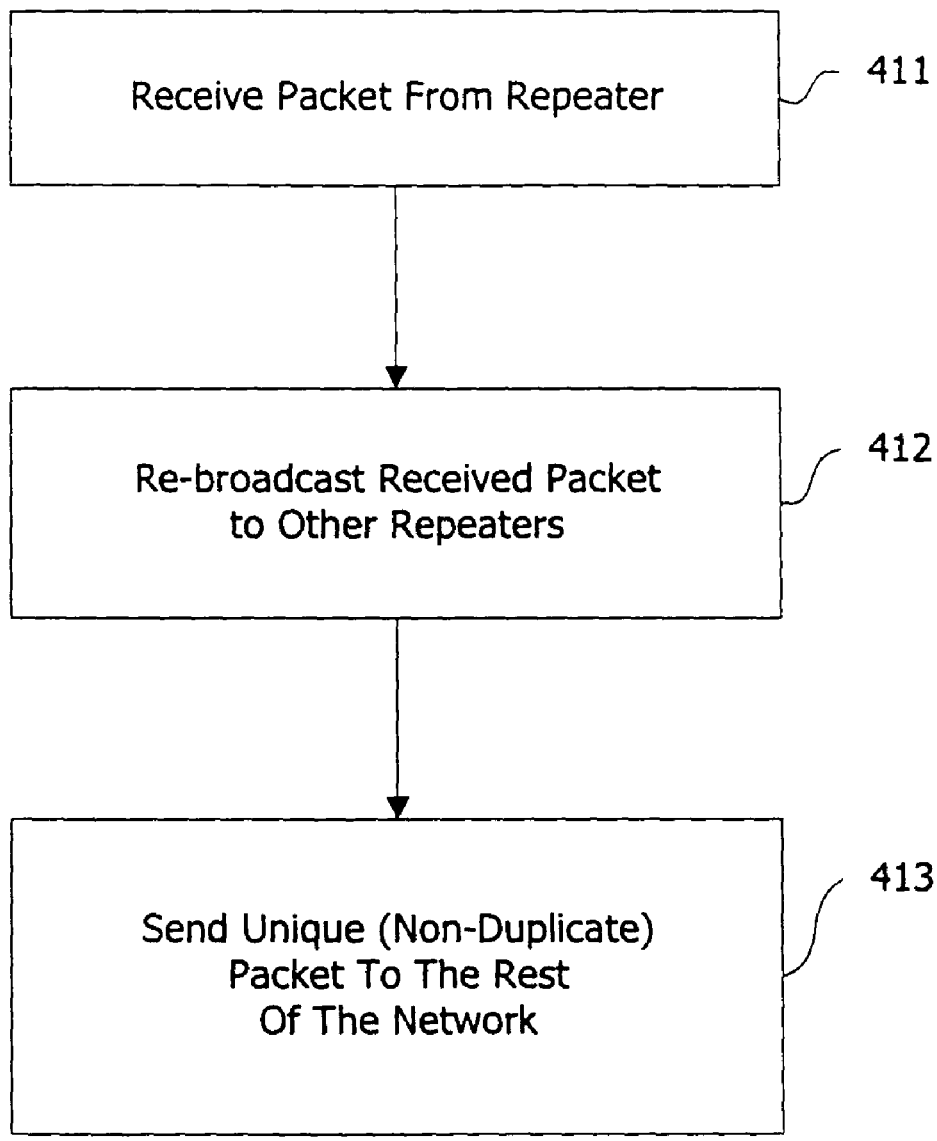
FIG. 4B is a flow diagram of one embodiment of a receiver diversity processing performed by a switch.

FIG. 4B is a flow diagram of one embodiment of a receiver diversity processing performed by a switch. The process is performed by processing logic that may comprise hardware (circuitry, dedicated logic, etc.), software (such as is run on a general purpose computer system or a dedicated machine), or a combination of both.

Referring to FIG. 4B, processing logic initially receives a packet from a repeater (processing block 411). In response to the packet, processing logic determines that the packet is to be sent to the other repeaters and re-broadcasts the received packet to other repeaters (processing block 412). Then processing logic sends only one copy of the packet to the rest of the network (processing block 413).

Token-Based Receiver Diversity Approach

Note that the above receiver diversity procedure is particularly useful when gigabit or faster Ethernet communication exists between switch 301 and repeaters $302_1$-$302_3$. However, if such is not the case, another technique for receiver diversity may be utilized. For example, a token-based receiver diversity procedure may be used. In this case, switch 301 has a token for every mobile station on the 802.11 network and it gives the token to one of the repeaters. In other words, switch 301 pre-assigns the token before a packet is even transmitted by a mobile station. The repeater stores the token in a table that lists all mobile stations for which it has a token. The repeater with the token sends the acknowledgement packet to the mobile stations listed in the table when those mobile stations send packets that are received by the repeater. Therefore, a comparison of received signal strengths for duplicate packets is not necessary. Note that in one embodiment with this token based mechanism, if the repeater with the token does not receive a packet cleanly, but another repeater does, that packet will be forwarded to the switch and not acknowledged to the mobile client. However, switch 301 moves the token before a subsequent packet is sent by the mobile station. Therefore, this will only occur for one packet.

In one embodiment, switch 301 includes a database with a listing of mobile stations and repeater numbers corresponding to the repeater that has been designated to acknowledge packets received from the mobile station and, thus, has the token. The table may also include additional information describing the repeater itself.

Since switch 301 receives the received signal strength from each repeater that received a packet without error, switch 301 can determine the closest repeater to a particular mobile station. If the repeater determined to be closest to the particular mobile station is different than the one previously identified as closest (e.g., based on RSSI of packets received from the mobile station), then switch 301 moves the token to a new repeater, i.e. the one that is closer to the mobile station. The token may be moved on a packet-by-packet basis or every predetermined number of the packets (e.g., 10 packets, 100 packets, etc.).

Switch 301 may employ a timer to indicate the time during which duplicate RSSI values for the same packet may be received in much the same manner the timer is used by the repeaters in the distributed approach described above.

Figure 4C:
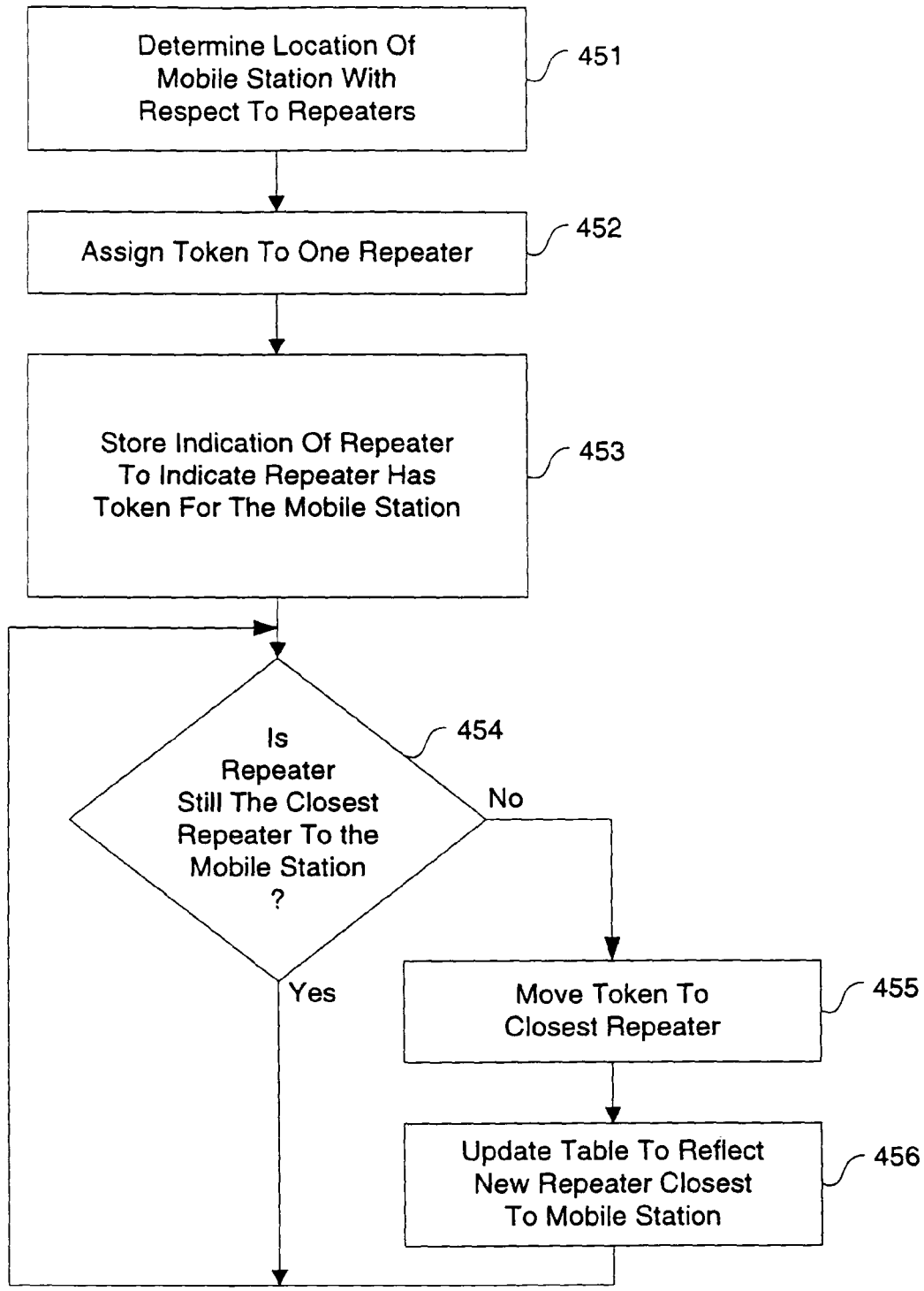
FIG. 4C is a process for managing repeaters using a token-based mechanism.

FIG. 4C is a process for managing repeaters using a token-based mechanism. The process is performed by processing logic that may comprise hardware (circuitry, dedicated logic, etc.), software (such as is run on a general purpose computer system or a dedicated machine), or a combination of both.

Referring to FIG. 4C, processing logic first determines the location of mobile stations with respect to repeaters (processing block 451). Processing logic then assigns a token for each of the mobile stations to one of the repeaters (processing block 452) and stores an indication of the repeater assigned to each mobile station (processing block 453). This information is stored in a table in memory. This table is referred to herein as an active station list. In one embodiment, this table includes a listing of mobile stations and an indication of which repeater and/or switch port number is assigned to the mobile station. The table may be the same data structure used for location tracking described below.

In one embodiment, the switch assigns a token by sending an Add Token command to the repeater, which causes the repeater to add a new mobile station to its table of mobile stations that the repeater supports. This command includes the MAC address of the mobile station.

Subsequently, processing logic periodically tests whether the repeater assigned the token for a particular mobile station is still the closest repeater to that mobile station (processing block 454). If so, then the processing is complete. If not, then processing logic moves the token to the closest repeater (processing block 455) and updates the table (e.g., the active station list) to reflect the new repeater that is closest to the mobile station (processing block 456). Processing logic also updates the switch port to reflect the new repeater for use when sending packets to the mobile station from the switch.

In one embodiment, the switch moves the token by sending a Delete Token command to the repeater that currently has it, causing the repeater to delete the token (and assorted MAC Address) from its list of supported mobile stations, and by sending an Add Token command to the repeater that is currently closest to the mobile station.

Figure 4D:
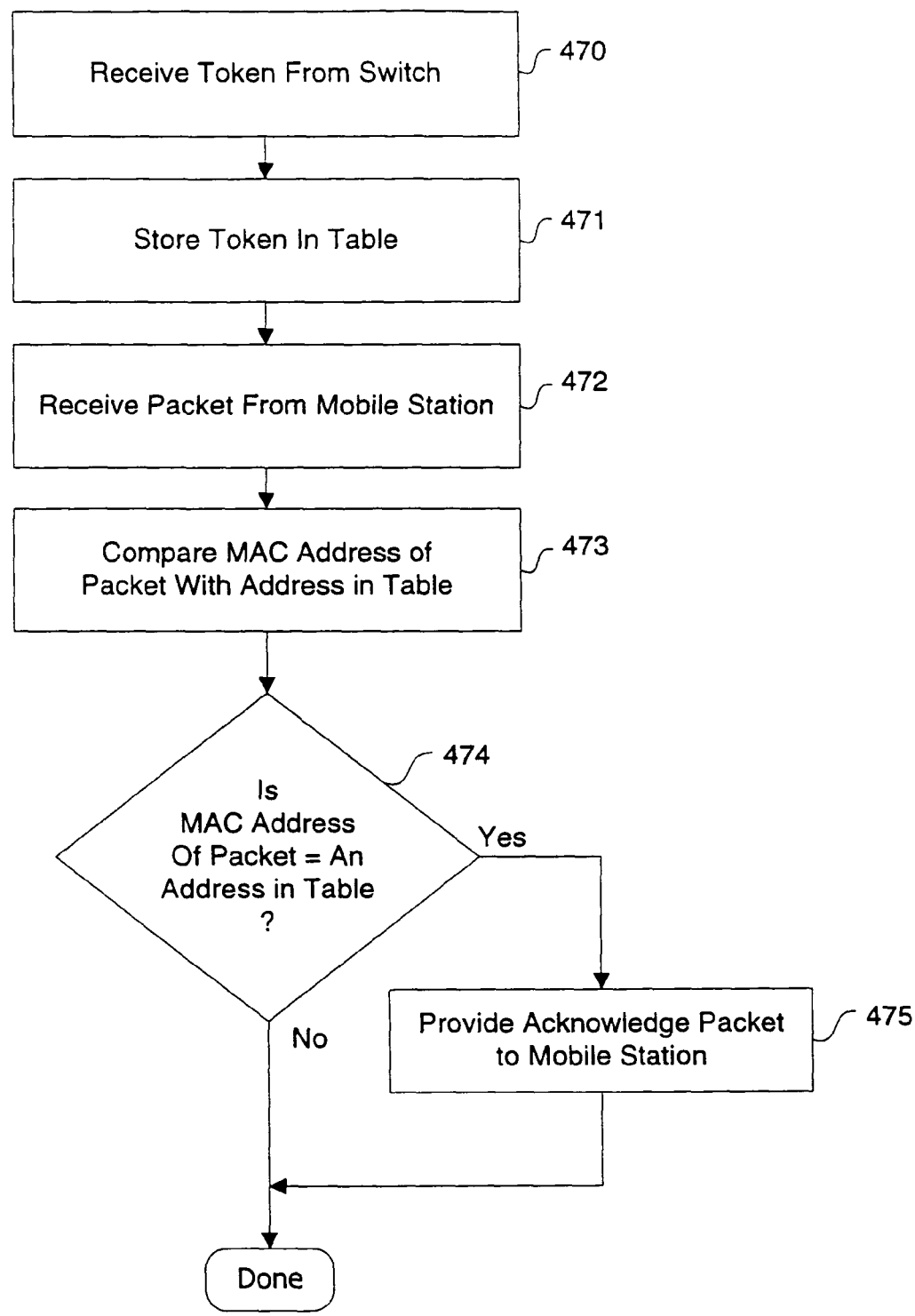
FIG. 4D is one embodiment of a token-based process for handling packets.

FIG. 4D is one embodiment of a token-based process for handling packets. The process is performed by processing logic that may comprise hardware (circuitry, dedicated logic, etc.), software (such as is run on a general purpose computer system or a dedicated machine), or a combination of both.

Referring to FIG. 4D, processing logic receives a token from the switch (processing block 470) and stores the token in a table stored in a repeater memory that indicates all the mobile stations for which the repeater has a token (processing block 471).

Subsequently, when processing logic receives a packet from mobile station (processing block 472), processing logic compares the MAC address of the 802.11 packet from the mobile station with the address in the table (processing block 473). Then, processing logic tests whether the MAC address of a packet equals an address in the table (processing block 474). If so, processing logic provides an acknowledgment (ACK) packet to the mobile station (processing block 475). If not, processing logic ignores the packet.

Note that since all repeaters communicate the fact that they received a packet from a mobile station along with the received signal strength to switch 301, switch 301 is able to determine the coverage area of the transmission of the mobile station. In one embodiment, each packet received by switch 301 from the repeaters terminates in a network processor in switch 301 (e.g., network processor 1206 of FIG. 12), which determines the coverage area because it has access to the RSSI values. By determining the coverage area of the transmission, switch 301 is able to track the location of a particular device.

Downstream Communication Scheduling

For communications in the reverse direction (e.g., in the downstream direction), in one embodiment, the repeater transmissions are scheduled to reduce collisions. This scheduling is useful because repeaters can be close enough to interfere with one another. Because of this, switch 301 schedules the transmissions to prevent the collisions when the repeaters are actually transmitting.

For example, if a packet is destined for a particular IP address, then switch 301 performs an address translation to translate, for example, the IP address into an Ethernet MAC address. Switch 301 uses the Ethernet MAC address to search in a location tracking database to determine which repeater is closest to the mobile station having the Ethernet MAC address. Once the repeater is identified by switch 301, then switch 301 knows the switch port on which the packet should be sent so that it is sent to the repeater listed in the location tracking database (for forwarding by the repeater to the mobile station).

Once the repeater (and the port number) has been identified, switch 301 checks whether an interference problem would be created if the packet is sent by switch 301 to the mobile station at that time. An interference problem would be created if there are other transmissions that would be occurring when the packet is forwarded onto its destination mobile station. If no interference problem would exist, switch 301 sends the packet through the identified port to the repeater most recently determined to be closest to the mobile station. However, if an interference problem would be created by sending the packet immediately, then switch 301 delays sending the packet through the identified port to the repeater most recently determined to be closest to the mobile station.

In one embodiment, to determine if an interference problem would exist if a packet is sent immediately upon determining the switch port number on which the packet is to be sent, switch 301 maintains and uses two databases. One of the databases indicates which of the repeaters interfere with each other during their transmissions. This database is examined for every downstream packet that is to be sent and switch 301 schedules the transmission of downstream packets so that the repeaters that interfere with each other when they transmit at the same time do not transmit at the same time. The other database is a listing of mobile stations and the corresponding set of repeaters that last received the transmissions. If two mobile stations have overlapping sets, then it is possible for their acknowledgement packets to interfere when they simultaneously receive non-interfering data packets from different repeaters. Because the mobile stations send acknowledge packets upon receiving downstream packets, there is a possibility that the mobile stations will interfere with each other when sending their acknowledgement packets. Switch 301 takes this information into account during scheduling and schedules downstream packets to the mobile stations to reduce the occurrence of mobile stations interfering with other when sending acknowledgment packets. The information in these two databases may be collected by sending out test packets to the WLAN to determine which repeaters and mobile devices cause the interference described above.

Alternatively, in one embodiment, all repeaters communicatively coupled to the switch perform the scheduling instead of the switch. This type of scheduling is also referred to as a distributed form of scheduling, which is in addition to the centralized scheduling typically performed by a switch. In one embodiment, there is no need to have databases to keep track of where the interference may occur (e.g., between the communications of repeaters and mobile stations). Instead, each repeater acts on its own to transmit packets when the repeater determines that the communication channel is clear. For example, if a repeater detects that there may be one or more transmissions performed by one or more other repeaters that would cause interference that prevents the packets from being received by the intended mobile station, the repeater may wait for a period of time to allow the respective communication channel cleared, using some techniques similar to a CSMA/CD (carrier sense multiple access/collision detection) algorithm. Alternatively, the repeaters may communicate with each other, wired or wirelessly, with respect to the scheduling using, for example, tunneling protocols within the Ethernet protocol. However, in one embodiment, in such a case, the switch still handles routing the token to the correct repeater for mobility support.

Upstream Communication Scheduling

The same databases used for downstream traffic scheduling may be used for upstream traffic scheduling to enable the switch to schedule upstream communications. As with downstream traffic, by using the two databases, the switch is able to determine when parallel communication may take place based on the overlap described above. This scheduling may be used to implement quality of service (QoS) where a period of time when traffic is scheduled is used (bypassing the CSMA algorithm). Similarly, as described above, the scheduling may be performed by the repeaters to coordinate the upstream transmissions to the switch without involving the switch.

Location—Tracking by Received Signal Strength (RSSI)

Figure 5A:
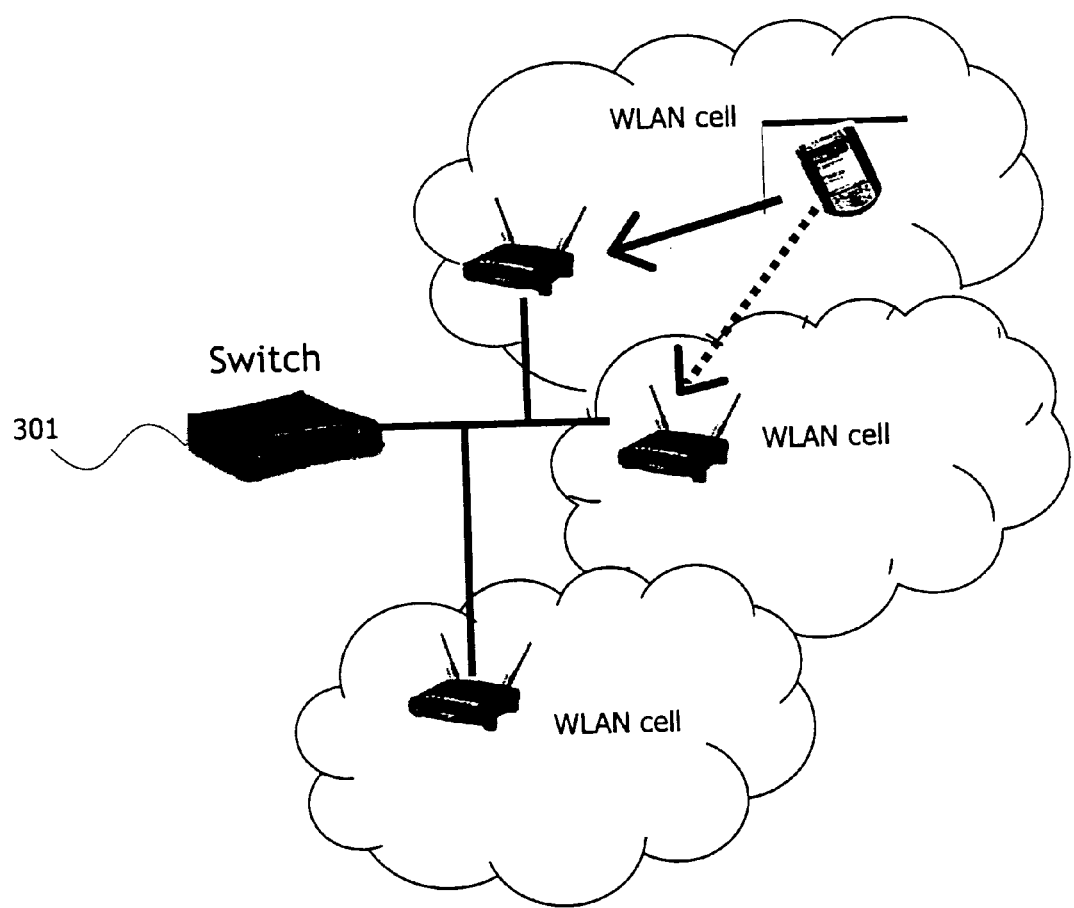
FIG. 5A illustrates one technique for location tracking by RSSI.

FIG. 5A illustrates one technique for location tracking by RSSI. Referring to FIG. 5A, switch 301 obtains the RSSI for each packet received by the repeaters and may have multiple RSSI values for a packet when that packet is received by two or more different repeaters. More specifically, a mobile station communicates with two (or more) repeaters and one repeater is going to have a stronger received signal strength than the other for the same packet. Based on this information, switch 301 is able to determine that a mobile station is closer to one repeater than the other. By continually monitoring the received signal strength, switch 301 can track the movement of a mobile station with respect to the repeaters.

Figure 5B:
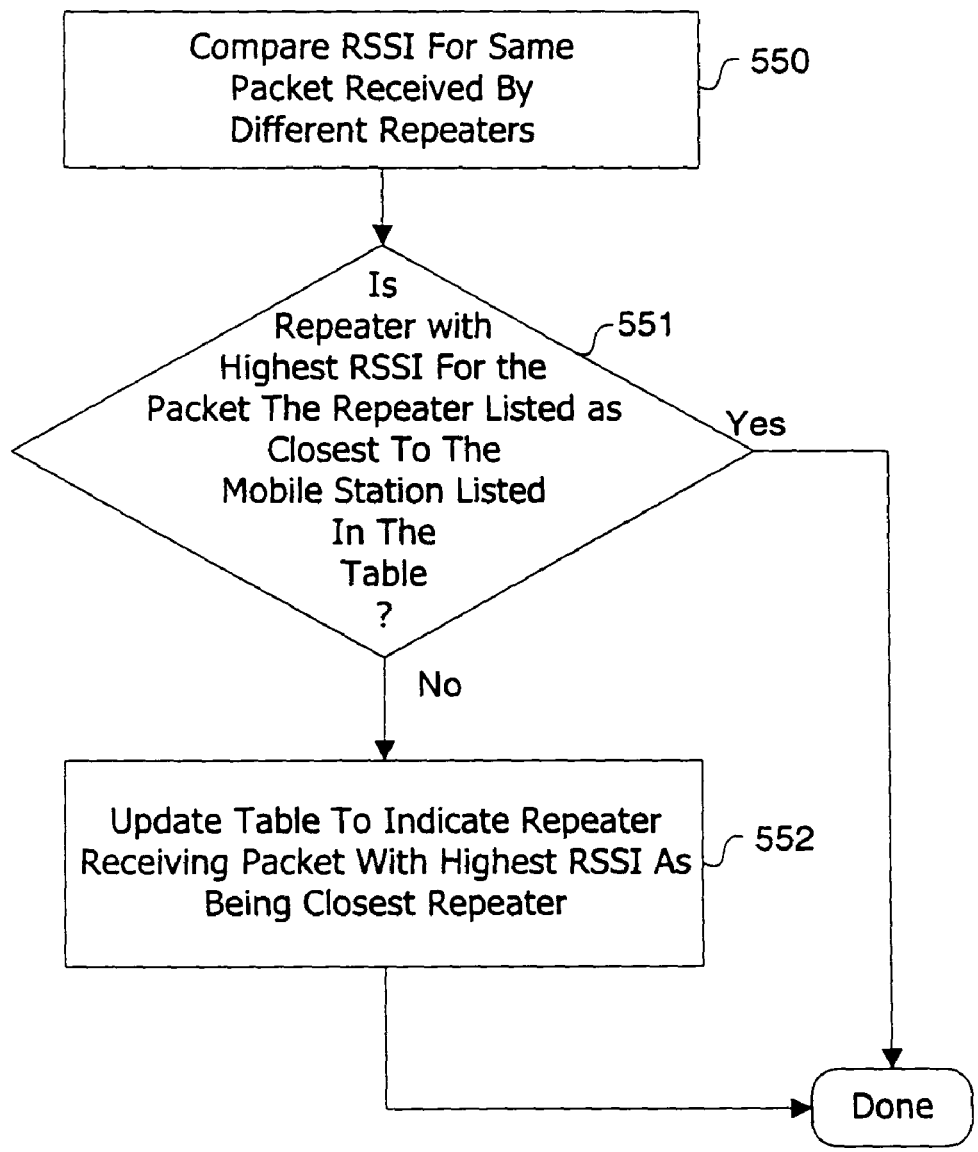
FIG. 5B is a flow diagram of one embodiment of a process for performing location tracking by a switch.

FIG. 5B is a flow diagram of one embodiment of a process for performing location tracking by a switch. The process is performed by processing logic that may comprise hardware (circuitry, dedicated logic, etc.), software (such as is run on a general purpose computer system or a dedicated machine), or a combination of both. In one embodiment, the processing logic comprises a network processor in the switch (e.g., network processor 1206 of FIG. 12).

Referring to FIG. 5B, processing logic compares the RSSI for the duplicate packets received by different repeaters from a mobile station (processing block 550) and tests whether the repeater with the highest RSSI for the packet is the repeater listed as closest to the mobile station in a location tracking table (e.g., database) (processing block 551). If not, processing logic updates the table to indicate that the repeater that received the packet with the highest RSSI is the closest repeater (processing block 552). Processing logic also switches port assignment for the mobile station to the port of new repeater (if the port is different than the port of the previously assigned repeater).

In one embodiment, the location tracking table may include a listing of mobile stations and their individually assigned repeaters. The location tracking table may also be referred to herein as the active station list. This table may also include, or include instead of the assigned repeater, an indication of the switch port by which the switch is to communicate with the repeater assigned to each mobile station.

Mobility Supported By Routing

Figure 6:
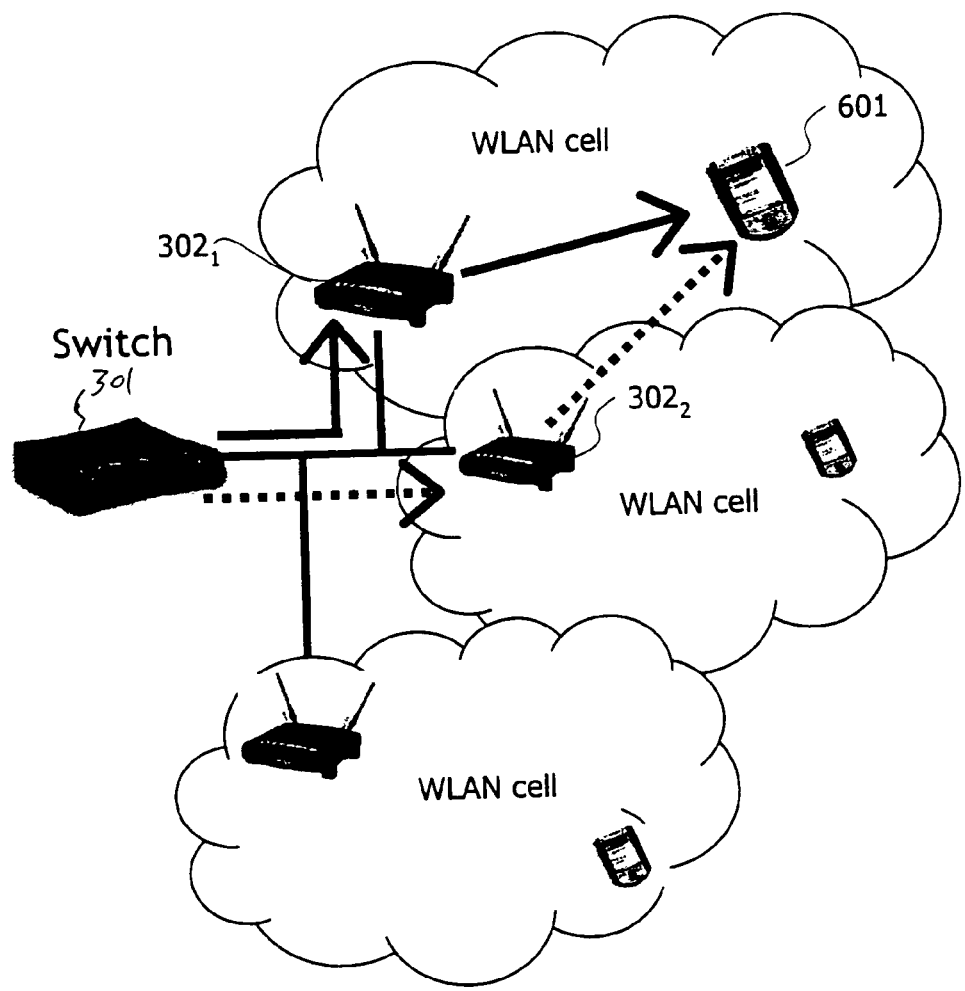
FIG. 6 illustrates mobility supported by routing.

FIG. 6 illustrates mobility supported by routing. Referring to FIG. 6, the dotted arrow path for communication from switch 301 to mobile station 601 through repeater $302_2$ is the original communication path with the network. As the mobile station 601 moves, a routing handoff occurs so that communication occurs over the solid arrowed path. In order to accomplish this handoff, switch 301 reroutes the packet to a different port. For example, if the first communication path illustrated as the dotted line arrow was on port 1, switch 301 may switch the packet to port 5, the port that associated with the communication path through repeater $302_1$. Thus, mobility is supported by simply moving a packet to a different port of switch 301 that is assigned to a different repeater. In such a situation, the mobility provisions of the 802.11 protocol may be ignored. Note that for embodiments where multiple repeaters are on the same port, the repeater MAC address may be changed instead of changing the port number.

In one embodiment, switch 301 determines that a particular mobile station is closer to a different repeater (by monitoring the received signal strength of duplicate packets). As described above, switch 301 maintains a table (e.g., database, active station list, etc.) of all mobile stations in the 802.11 network and includes an indication of the repeater closest to each mobile station. Switch 301 performs port-based routing and may use the table in the same manner an IP routing table is used. Switch 301 has an Ethernet port for each repeater. When switch 301 determines that a mobile station is closer to a repeater that is different than the one listed in the database (based on the received signal strength of duplicate packets among multiple repeaters), then switch 301 updates the database. Thereafter, if a packet is received by switch 301 for that mobile station, switch 301 merely sends it out on the Ethernet port assigned to the repeater that was most recently determined to be the closest to that mobile station.

Multi-Switch System

Figure 7:
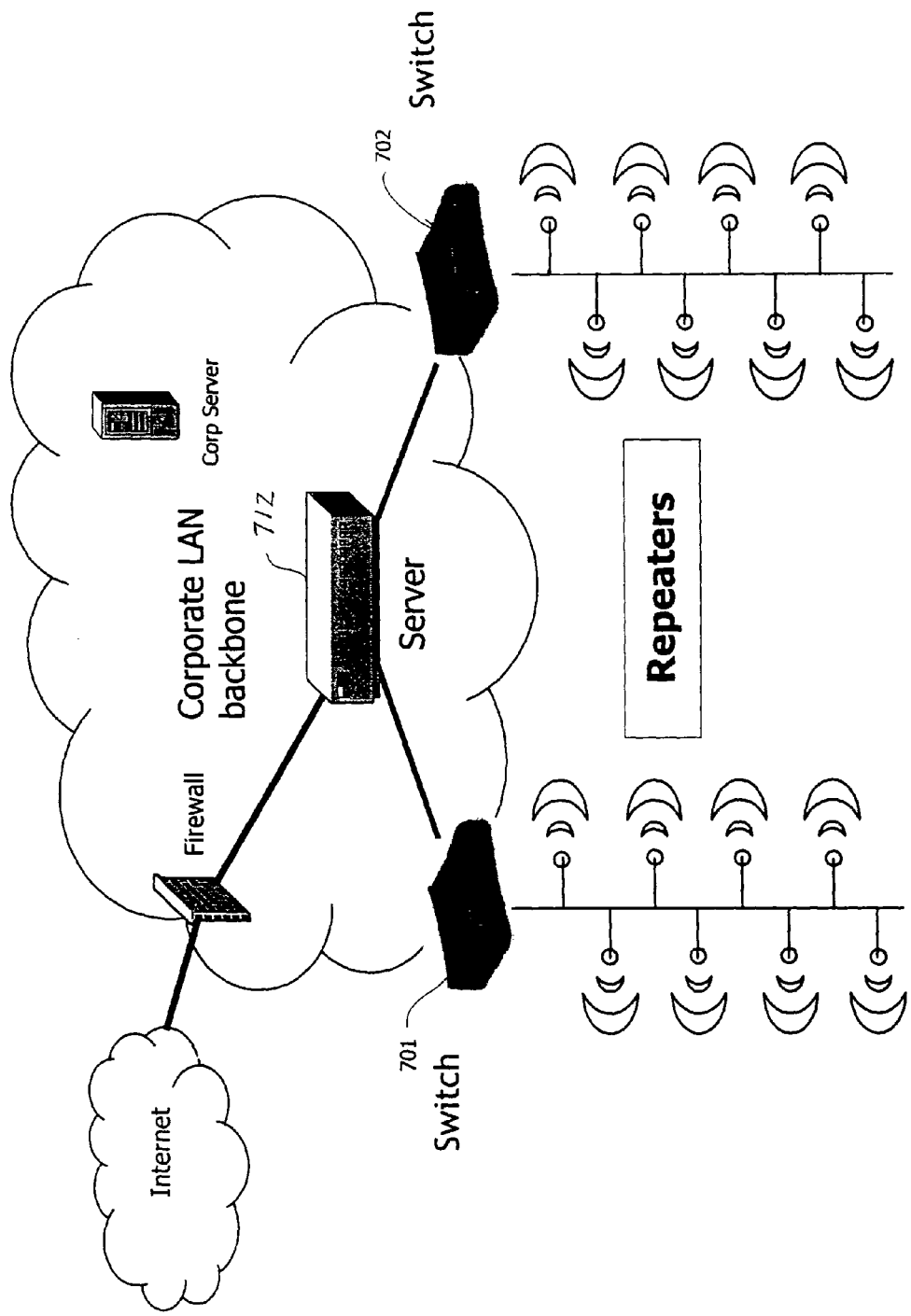
FIG. 7 illustrates one embodiment of a network system.

FIG. 7 illustrates one embodiment of a multi-switch system. Referring to FIG. 7, the network architecture includes switches 701 and 702 are communicably coupled to server 712. In one embodiment, server 712 is part of a LAN backbone through which access to the Internet and other resources is made. Alternatively, server 712 may act as an interface to another portion of the communication system. Each of switches 701 and 702 is coupled to one or more repeaters in the same manner as described above with respect to FIG. 3. In still another embodiment, server 712 may exist within one of, or both, switches 701 and 702.

Protocol Architecture

Figure 8:
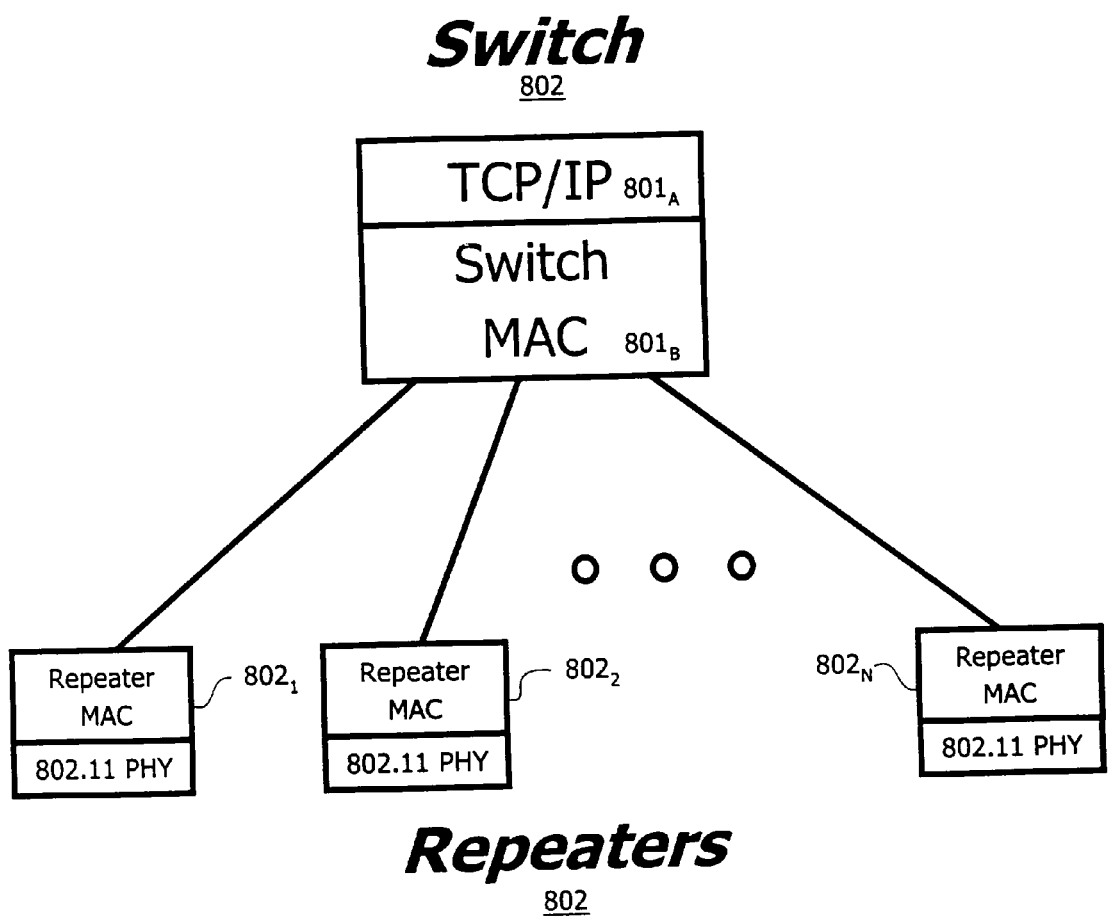
FIG. 8 illustrates one embodiment of a protocol architecture.

FIG. 8 illustrates one embodiment of a protocol architecture. Referring to FIG. 8, switch 801 is shown having a network layer 801A and a MAC layer 801B. In one embodiment, the network layer 801A comprises a TCP/IP network layer. MAC sublayer 801B communicates with a MAC sublayer of each of repeaters $802_1$-$802_N$. Thus, in contrast to the prior art in which the 802.11 MAC layer is completely within the access point, the 802.11 MAC layer is split between switch 301 and repeaters $802_1$-$802_N$, and the MAC sublayer of the repeaters performs much less functionality than the MAC sublayer of the access points described above.

In one embodiment, the repeater MAC sublayer is responsible for performing portions of the 802.11 protocol including handling CSMA/CA, DIFS/EIFS interframe spacing (IFS) timing, SIFS timing and control, generating acknowledgement (of ACK) frames (during transmit only) on data packets received, such as 802.11 data frames and generating CTS (clear-to-send) frames in response to RTS (request-to-send) frames. The repeater MAC sublayer may also respond to the resetting of internal network allocation vectors (NAVs) which are embedded into certain frames (e.g., RTS and CTS frames). Each of the above repeater MAC functions may be implemented in a manner that is well-known is the art.

In addition to the MAC sublayer, each of repeaters $802_1$-$802_N$ includes an 802.11 physical layer or other wireless physical layer.

The switch MAC sublayer is responsible for handling multiple frame types during reception from the repeaters. In one embodiment, the MAC frame types the switch is capable of handling include an association request, reassociation request, probe request, ATIM, disassociation, authentication, deauthentication, PS-Poll, CTS (updates NAV in repeaters), ACK (in response to data frames), data and Null frames.

The switch MAC frame types that are accommodated during transmission include an association response, a reassociation response, probe response, ATIM (announcement traffic indication message), disassociation, deauthentication, PS-Poll, data frames, Null frames, RTS (updates NAV in repeater), and beacon frames. It should be noted that the MAC frame types that the switch accommodates during receive and transmit are well known in the arts and part of the 802.11 standard. Each of the above switch MAC functions may be implemented in a manner that is well-known is the art.

Figure 9A:
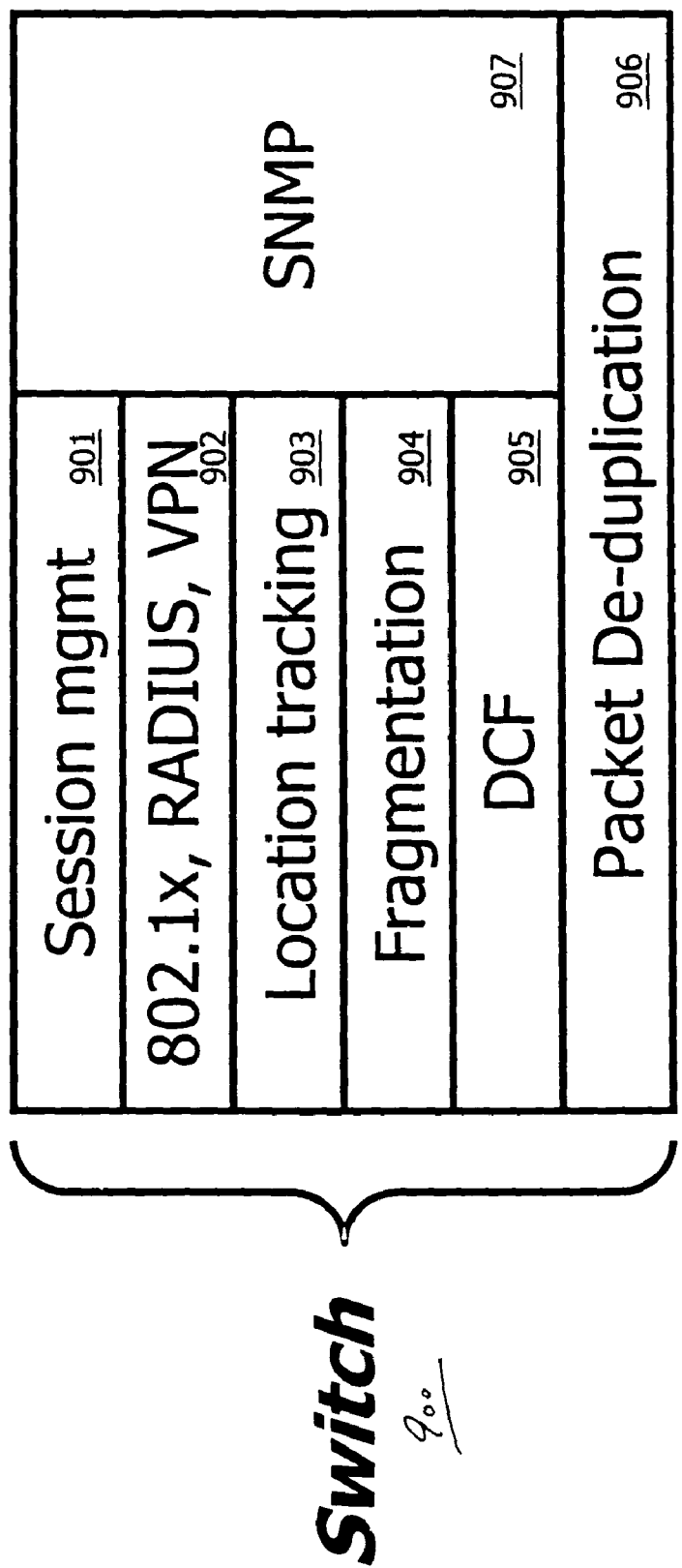
FIG. 9A illustrates one embodiment of a switch.

FIG. 9A illustrates an embodiment of a switch. In one embodiment, exemplary switch 900 includes session management unit 901, protocol unit 902, location tracking unit 903, fragmentation unit 904, DCF (distributed coordination function) unit 905, packet de-duplication unit 906 and SNMP (simple network management protocol) unit 907. Some of these units may be implemented within the corresponding MAC layer of the switch. In one embodiment, session management unit 901, which may be a part of the switch management entity (SwME), is responsible for handling initial handshakes with one or more repeaters and the associated mobile devices, including, but not limited to authentication, association, and disassociation, etc. In one embodiment, protocol unit 902 handles a variety of network protocols including 802.11 wireless protocol, RADIUS, VPN (virtual private network) protocol, as well as other wireless protocols, such as, for example, 802.15 (wireless personal area network or WPAN, also referred to as Bluetooth) protocol or 802.16 (broadband wireless metropolitan area network) protocol.

Location tracking unit 903 is responsible for tracking one or more mobile stations communicating with one or more repeaters using one of the aforementioned mechanisms shown in FIGS. 5A and 5B. In one embodiment, location tracking unit 903 obtains the RSSI for each packet received by the repeaters and may have multiple RSSI values for a packet when that packet is received by two or more different repeaters. More specifically, a mobile station communicates with two (or more) repeaters and one repeater typically has a stronger received signal strength than the other for the same packet. Based on this information, location tracking unit 903 is able to determine that a mobile station is closer to one repeater than the other. By continually monitoring the received signal strength, location tracking unit 903 tracks the movement of a mobile station with respect to the repeaters. Based on this information, location tracking unit 903 may automatically perform an operation similar to a site survey and may reconfigure the communication network, which will be described in details further below. In one embodiment, location tracking unit 903 may notify session management unit 901 to perform such operations. In a further embodiment, location tracking unit 903 may further detect whether an interference between multiple mobile stations exists and may signal session management unit 901 to perform further action, such as, for example, queuing and rescheduling of requests, such that multiple mobile stations may be able to share a communication channel (e.g., single frequency band), which will be described further below.

Fragmentation unit 904 is responsible for fragmenting packets to improve performance in the presence of RF interference detected using one of the aforementioned processes. The use of fragmentation can increase the reliability of frame transmissions. By sending smaller frames, collisions are much less likely to occur. The fragment size value may be typically set between 256 and 2,048 bytes. However, this value may be user controllable via, for example, a user interface of session management unit 901.

DCF unit 905 is responsible for handling DCF functionality according to 802.11 specifications. DCF unit 905 typically operates based on the CSMA/CA (carrier sense multiple access with collision avoidance) protocol. In a conventional approach, typical 802.11 stations contend for access and attempt to send frames when there is no other station transmitting. If another station is sending a frame, the stations wait until the channel is free. According to one embodiment, when DCF unit 905 detects if interference exists between multiple mobile stations, DCF unit 905 may signal session management unit 901 to queue up the frames and reschedule to processing of these frames to avoid interference. As a result, mobile stations do not need to worry about interference and wait for a free channel, which leads to a wider bandwidth of the network.

As described above, switch 900 may receive multiple identical packets from multiple repeaters because the corresponding mobile station may send the same packet to multiple repeaters within a coverage area. The switch may broadcast the packet to the rest of the repeaters. In order to avoid broadcasting the same packet multiple times, switch 900 may invoke packet de-duplication unit 906 to de-duplicate the duplicated packets and only one of multiple instances of the same packet gets broadcasted.

SNMP unit 907 performs typical network management operations well known in the art. SNMP is a protocol governing network management and the monitoring of network devices and their functions. It is not necessarily limited to TCP/IP networks.

Figure 9B:
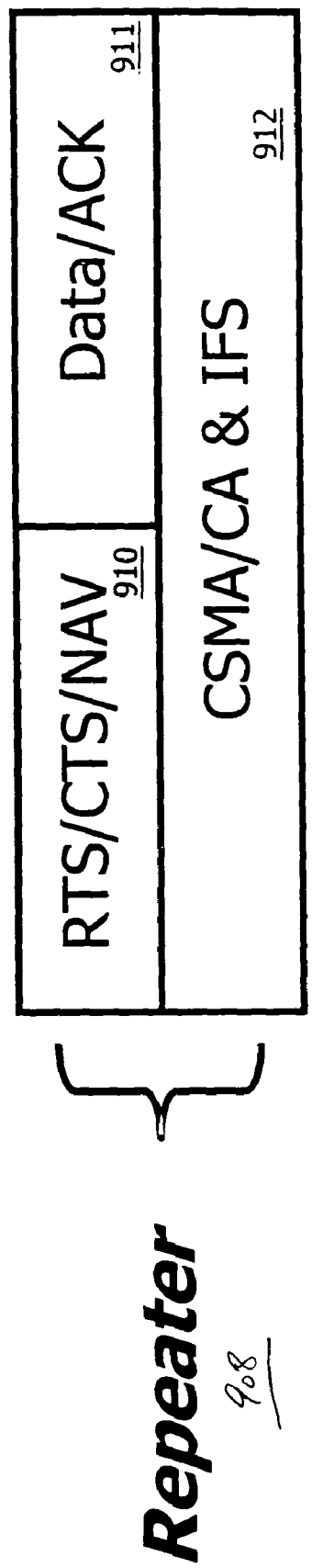
FIG. 9B illustrates one embodiment of a repeater.

FIG. 9B illustrates an embodiment of a MAC sublayer of a repeater. In one embodiment, the repeater MAC sublayer 908 is responsible for performing portions of the 802.11 protocol including handling CSMA/CA, DIFS/EIFS interframe spacing (IFS) timing, SIFs timing and control (block 912), generating acknowledgement (of ACK) frames (during transmit only) on data packets received, such as 802.11 data frames (block 911) and generating CTS (clear-to-send) frames in response to RTS (request-to-send) frames. The repeater MAC sublayer may also respond to the resetting of internal network allocation vectors (NAVs) which are embedded into (e.g., RTS and CTS frames) (block 910). Each of the above repeater MAC functions may be implemented in a manner that is well-known in the art.

Figure 10:
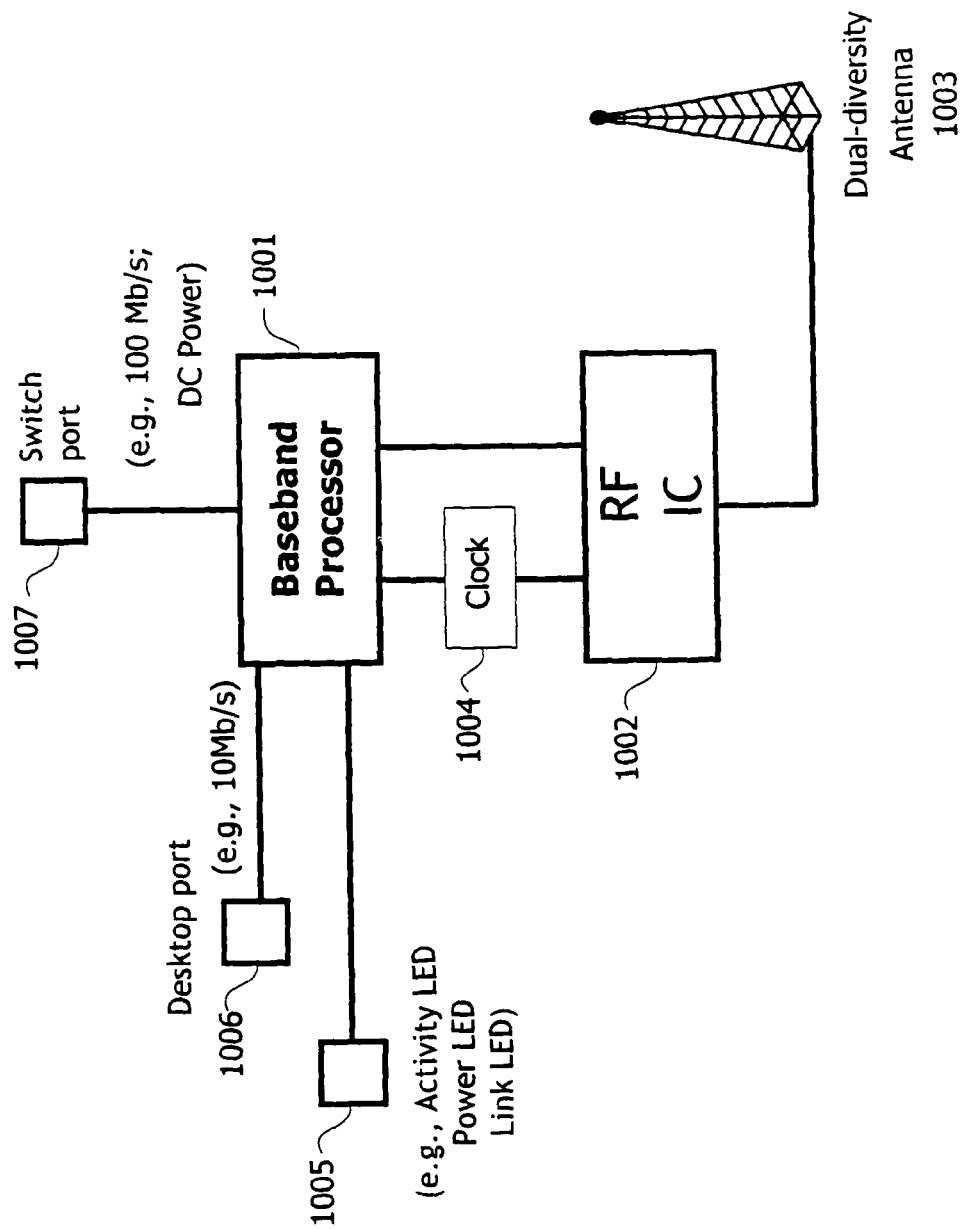
FIG. 10 illustrates one embodiment of a hardware architecture for a repeater.

FIG. 10 illustrates one embodiment of a hardware architecture for a repeater. Referring to FIG. 10, an RF chip 1002 receives and transmits RF transmissions using antenna 1003. In one embodiment, RF chip 1002 comprises a standard 802.11 RF chip. In one embodiment, antenna 1003 comprises a dual-diversity antenna. Communications received by RF chip 1002 are forwarded on to baseband processor 1001, which is a digital chip that is described in further detail below. Similarly, transmissions to be sent are received by RF chip 1002 from baseband processor 1001.

Baseband processor 1001 is a digital chip that performs the reduced MAC functions as described above. The repeater also includes a port 1007 for coupling to a switch, such as switch 301. Baseband processor 1001 handles communication with switch 301 using port 1007. In one embodiment, port 1007 also transfers information (through the port) at 100 Mb/s bits per second. Port 1007 may also provide power to baseband processor 1001.

A desktop port 1006 may be included to allow desktop or other systems to plug into the repeater. Also, in one embodiment, LEDs 1005, such as an activity LED, power LED, and/or link LED, may be included in the repeater as well.

Figure 11:
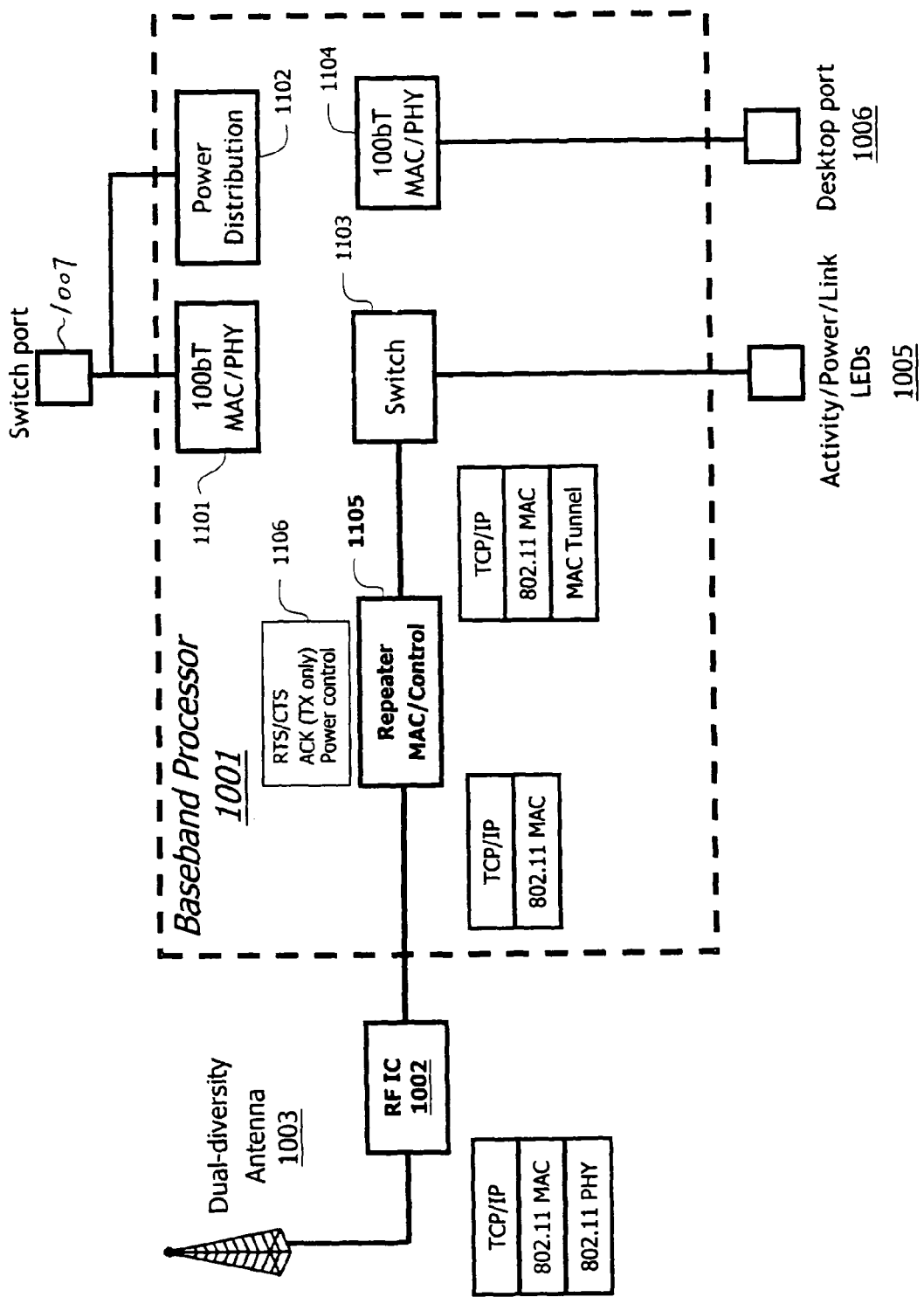
FIG. 11 is a block diagram of one embodiment of the base stand processor of a repeater.

FIG. 11 is a block diagram of one embodiment of the baseband processor of a repeater. Baseband processor 1001 includes a repeater MAC and control unit 1105 that interfaces with RF chip 1002 using a protocol. In one embodiment, the interface comprises a TCP/IP layer and an 802.11 MAC sublayer. The repeater MAC/control unit 1105 is coupled to switch 1103. In one embodiment, MAC/control unit 1105 communicates with switch 1103 using a TCP/IP layer and an 802.11 MAC sublayer tunneled inside Ethernet packets. Switch 1103 is also coupled to MAC/PHY layer unit 1104 which interfaces the baseband processor to desktop port 1006. Switch 1103 is also coupled to the activity/power/link LEDs 1005. Similarly, switch 1103 is coupled to the MAC/physical layer unit 1001 that interfaces the rest of the components on baseband processor 1001 to switch port 1007 via switch 1103. Also coupled to switch port 1007 is a power distribution unit 1102. In one embodiment, power distribution unit 1102 obtains power from the CAT5 wiring and provides it to the rest of baseband processor 1001.

Figure 12A:
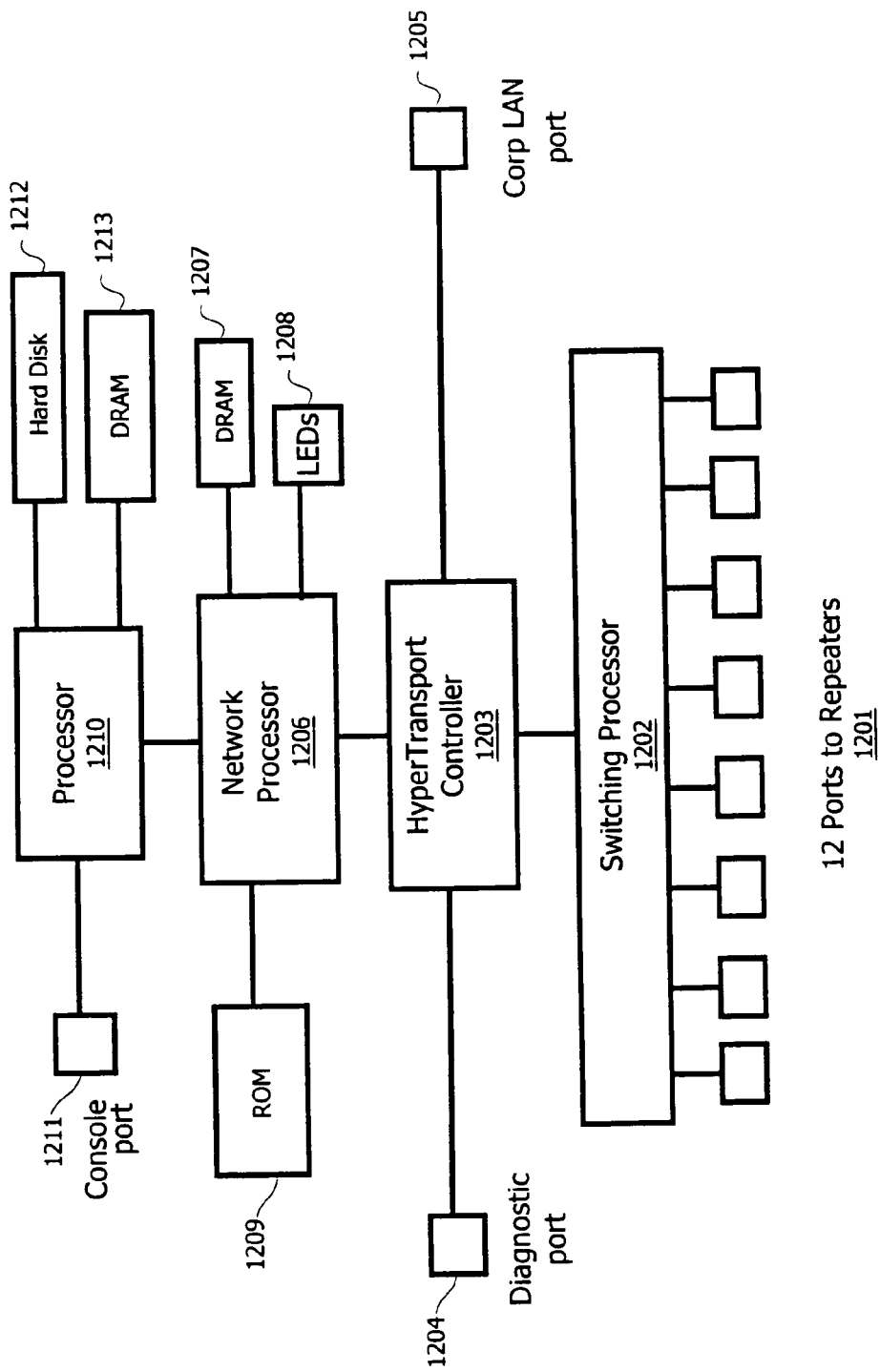
FIG. 12A is a block diagram of one embodiment of a switch.

FIG. 12A is a block diagram of one embodiment of a switch. Referring to FIG. 12, the switch includes one or more ports 1201 to repeaters 1201. Although 12 are shown, any number may be included. Ports 1201 are coupled to a switching processor 1202. In one embodiment, switching processor 1202 switches 13 ports of gigabit Ethernet and allows broadcast packets to be received on one port and broadcast on the others without involving the rest of the switch. In one embodiment, switching processor 1202 comprises a BRCM 5633 gigabit switching processor from Broadcom Corporation of Irvine, Calif.

HyperTransport controller 1203 is coupled to switching processor 1202 and provides a gigabit Ethernet interface to the rest of the switch architecture. In one embodiment, the HyperTransport controller 1203 includes a diagnostic port 1204 and another Ethernet port 1205 for use, for example, in coupling to a corporate LAN.

In one embodiment, HyperTransport controller 1203 comprises a Gallileo HyperTransport controller from Marvell of Sunnyvale, Calif.

A network processor 1206 is coupled to HyperTransport controller 1203 and performs the majority of the functions of the switch, including the receiver diversity functions and location-tracking functions described herein, with the exception of the rebroadcast of the broadcast packets received by the switch, which is handled by switching processor 1202. In one embodiment, network processor 1206 is coupled to a boot memory 1209, a DRAM 1207 and one or more LEDs 1208. In one embodiment, network processor 1206 comprises a PMC-Sierra RM9000X2 sold by PMC-Sierra of Santa Clara, Calif., boot memory 1209 comprises an MB boot flash AMD AM29LV640D boot flash memory and DRAM 1207 comprises 64 MB synchronous DRAM (SDRAM) from Advanced Micro Devices, Inc. of Sunnyvale, Calif.

In one embodiment, network processor 1206 includes a PCI interface to a processor 1210. Processor 1210 may host certain applications, such as, for example, firewall applications. Processor 1210 may perform these functions with the use of hard disk 1211, DRAM 1213 and console port 1211. Console port 1211 may provide access to a monitor or keyboard or other peripheral device. In one embodiment, processor 1210 comprises a Pentium Processor manufactured by Intel Corporation of Santa Clara, Calif.

In one embodiment, network processor 1206 executes software instructions, which performs the 802.11 MAC layer. Network processor 1206 may also execute a wireless LAN configuration module to configure the wireless LAN network, a priority traffic administration (e.g., traffic shaping) module, a management software (e.g., Cisco IOS), a security protocol (e.g., 802.1x) module, and a VPN/firewall module. Processor 1210 executes a location tracking module to perform the location tracking. Processor 1210 may also execute one or more of the following software modules: clustering/HA, RADIUS/DHCP (remote authentication dial-In user service/dynamic host configuration protocol), session mobility, third party applications, XML (extensible markup language) Web services, user administration software, and network management software.

Reconfiguration of the Communication System

A technique described herein allows for the performance of an automatic site survey to reconfigure the wireless communication network. As part of the process, the repeaters in essence cause their own reconfiguration by providing information to the switch that the switch uses to determine whether reconfiguration is necessary. In one embodiment, as a result of performing the reconfiguration process, one or more repeaters may change their state from activated, deactivated, or hot standby to another state and/or change their transmitter power level and/or receiver sensitivity. When in the activated state, a repeater is able to receive packets from sending devices (e.g., mobile devices in the network) and transmit packets to those devices. When in the deactivated state, a repeater is not able to receive packets from nor transmit packets to other devices (e.g., mobile devices in the network). When in the hot standby state, a repeater is able to receive packets from sending devices but not transmit packets to those devices. It is possible that a repeater may not change its state as part of the reconfiguration process, but may change its transmit power level and/or its receiver sensitivity.

Reconfiguration may also occur by having one or more repeaters change their channel numbers. The reconfiguration of the network includes turning on and off repeaters and adjusting transmitter power levels and receiver sensitivity. The reconfiguration occurs periodically. Reconfiguration may occur after a predetermined period of time (e.g., an hour) or a predetermined amount of activity. The reconfiguration may occur in response to an event. For example, if the activity of a repeater receives a predetermined number of packets within a predetermined period of time or the rate of packet reception increases by a predetermined amount, then the reconfiguration may be performed. As another example, the event may comprise a mobile station entering a particular location (e.g., a conference room) where a repeater is located and not on (thereby causing the system to be reconfigured to have the repeater activated). In one embodiment, when the event occurs, an alarm in the switch is triggered, causing the switch to run the reconfiguration process.

Figure 12B:
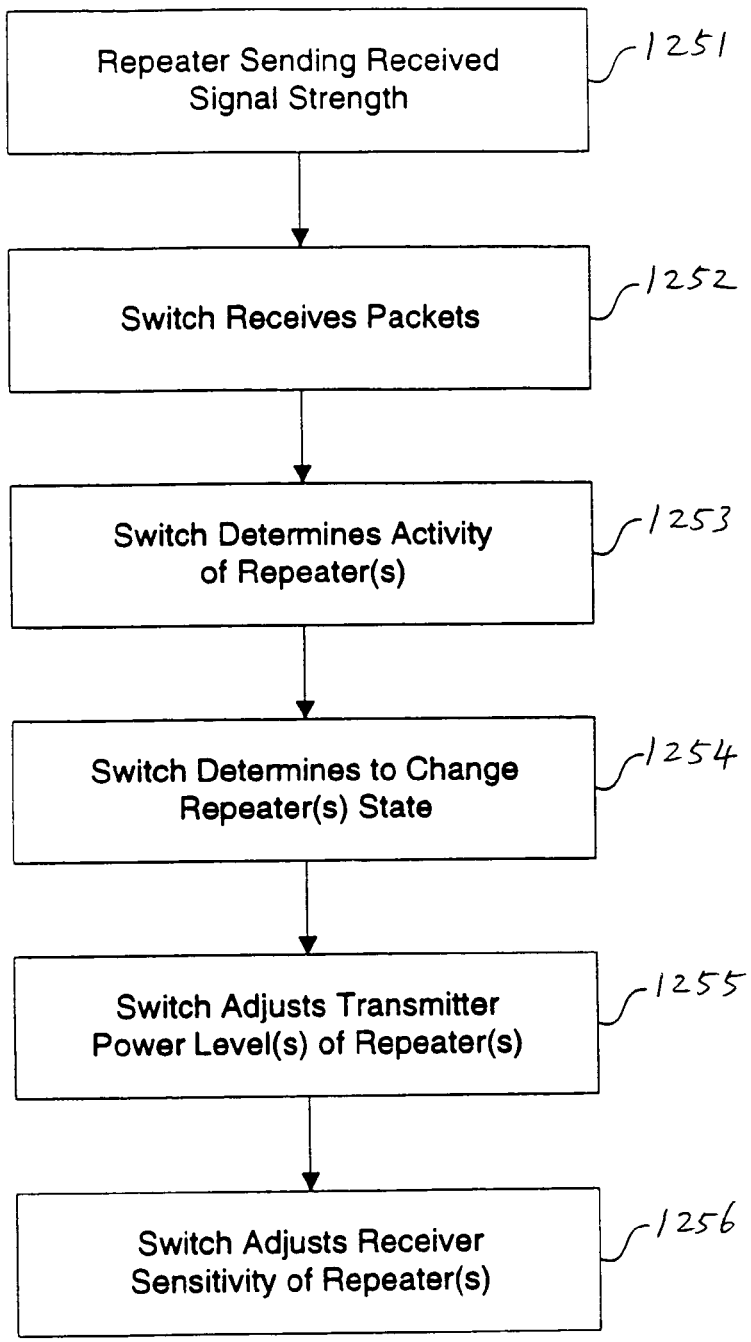
FIG. 12B is a flow diagram of one embodiment of a process for reconfiguring the wireless communication system.

FIG. 12B is a flow diagram of one embodiment of a process for reconfiguring the wireless communication system. Referring to FIG. 12B, exemplary process 1250 begins by each repeater that is activated or in the hot standby state sending the received signal strength indication, as set forth above, along with the SNR for each packet received cleanly to the switch (processing block 1251). As described above, the received signal strength and SNR may be determined on a packet-by-packet basis. Also as discussed above, communications between the repeater(s) and the switch(es) occur via a wired connection (e.g., an Ethernet connection) and/or may be through a level 2 network. Note that in another embodiment, such communications may be performed, at least in part, wirelessly using a different protocol than the protocol used between the mobile stations and the repeaters.

In response to sending the packet(s), the switch receives the packet(s) (processing block 1252) and determines the amount of wireless communication activity each repeater is experiencing (processing block 1253).

More specifically, the repeater receives a packet and embedded in the packet header is the Ethernet MAC address of the mobile station. When the repeater forwards that packet to the switch, it attaches the received signal strength and SNR values. In response to the packet, the switch is able to open up the packet and determine that the packet is from another unique IP address and, thus, another unique user. Based on this, the switch determines the density of unique users on a particular repeater. In other words, the switch determines the number of unique users (mobile stations) sending packets that are being received by an individual repeater. The switch may use a database to maintain this information. This database may be the location tracking database described above.

Based on the location and density of the repeaters as tracked by the switch, using the information sent from the repeater(s), the switch determines which repeaters to activate, deactivate, or move to the hot standby state (processing block 1254). The switch also determines the transmitter power levels for the repeaters that are activated (processing block 1255). The transmitter power levels are the power levels used by the repeaters when transmitting packets wirelessly to other devices in the network. The switch may also adjust the receive sensitivity of one or more of the repeaters (processing block 1256). The switch may also adjust the channel numbers of one or more repeaters. In one embodiment, the switch causes these changes to be made by sending control commands to the repeater over, for example, a wired connection (e.g., the Ethernet connection).

Thus, if the switch determines that a particular repeater is to be activated (the repeater can receive and transmit), deactivated (the repeater cannot receive nor transmit), or placed in hot standby mode (the repeater can receive but cannot transmit), that changes to the repeater's transmitters power level and/or the repeater's receiver sensitivity, or that changes to the repeater's channel number are necessary, then the switch sends a command to the repeater specifying the desired action.

In one embodiment, if the number of unique users being received cleanly by a repeater in a hot standby state is above a threshold, then the switch activates the repeater.

This reconfiguration process has a number of advantages over the prior art. For example, as part of the reconfiguration process in the prior art, an access point may have to be moved. This is because there are typically no additional access points in the area that are not already being used because of their expense. In contrast, because repeaters are generally cheaper devices, many more of them may be distributed throughout the network, even though they are not going to be used all the time. Thus, when there is a need for additional capacity, one of the repeaters that is not currently activated can be activated.

In one embodiment, the reconfiguration of the wireless communication system may include changing the transmit power levels of the mobile stations. As with the reconfiguration described above, the purpose of this reconfiguration of the mobile station is to improve network capacity. The improvement to network capacity may be due to a reduced interference to repeaters and other mobile stations in adjacent coverage cells that a mobile station causes because its transmit power level is changed.

The reconfiguration of the mobile stations may occur in response to the switch examining the interference in a particular area and comparing this interference with a predetermined amount of interference (e.g., a threshold). The predetermined amount of interference may be based on an allowable amount of interference for the wireless communication system or an allowable amount of variance from the allowable amount of interference.

The switch (or other control entity) determines the amount to change the transmit power level. In order to determine the amount of change to a particular transmit power level, the switch initially determines what the current transmit power level is. In one embodiment, the switch sends a query as a control message to the mobile station to obtain the transmit power level of the mobile station. Alternatively, the switch maintains a list (e.g., a database) of the transmit power levels of the mobile stations and accesses the list to obtain the transmit power level for a particular mobile station. The switch may obtain this information from the mobile stations. In addition, the switch might also send a command to the mobile station to modify its power level on a percentage basis. This would not require the knowledge of a specific power level. For example, in one embodiment, the mobile stations send a control message to the switch at boot-up indicating their transmit power levels.

Once the current transmit power level has been obtained, the switch determines the amount to change the transmit power level. This may be based on the received signal strength (e.g., RSSI) of the packets received by the repeater currently assigned to the mobile station. For example, if the received signal strength is very high, yet the mobile station is causing interference (e.g., its packets are being received by one or more other repeaters), the switch may cause the mobile station to reduce its transmit power level to a predetermined level or by a predetermined amount (e.g., a percentage of its current transmit power level) because the effect of such a reduction would not prevent its packets from being received by its assigned repeater.

The change in the transmit power level may be performed in a number of ways. For example, in one embodiment, the switch controls the transmit power level of the mobile station(s). In such a case, the switch may send a command message to the mobile station, via a repeater, to cause the mobile station to adjust its transmit power level. The command could indicate that the mobile station should increase or decrease its transmit power level. Alternatively, such a command could come from a repeater or a control entity in the communication system other than the switch.

An Exemplary MAC Software Architecture

Figure 13:
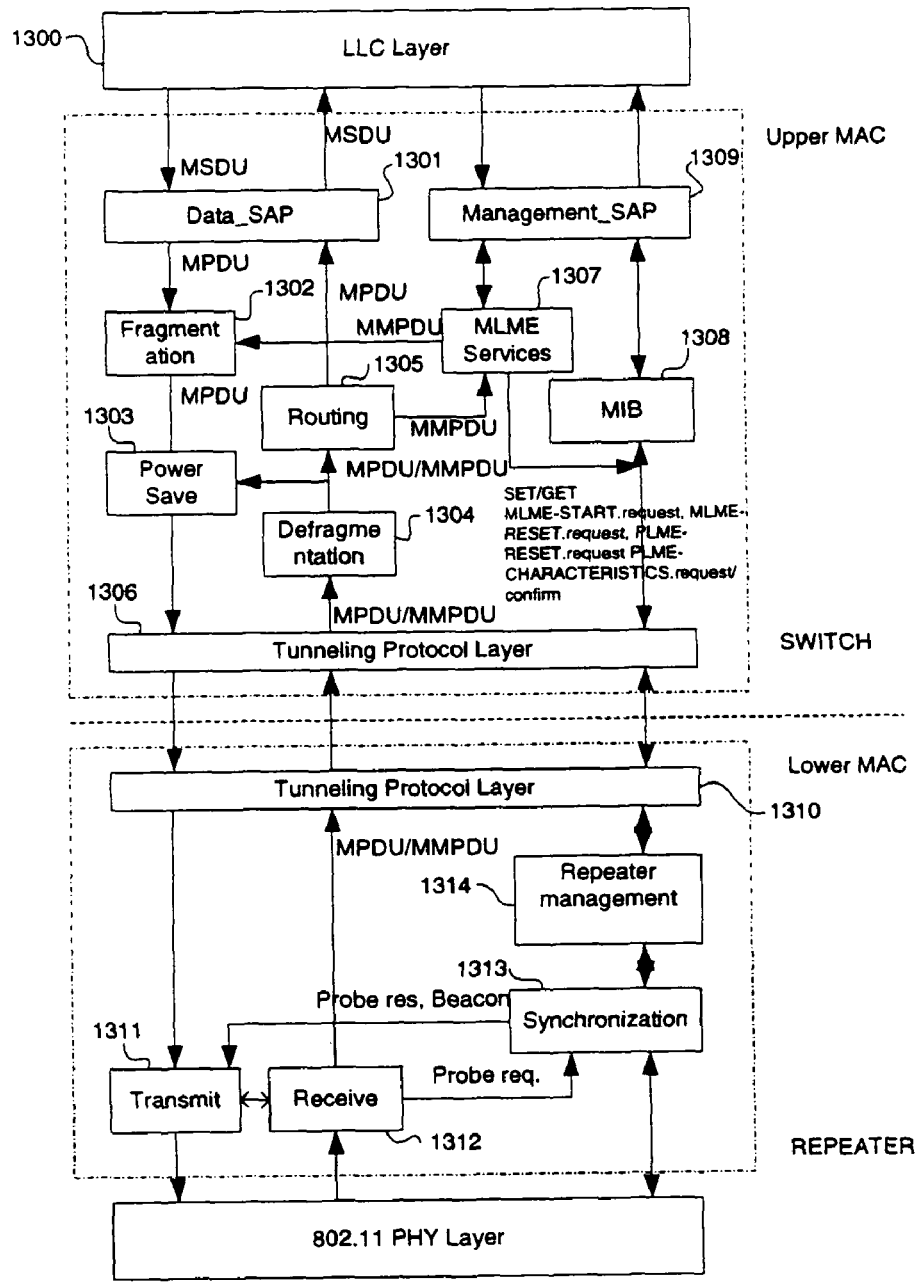
FIG. 13 is one embodiment of a distributed MAC architecture.

FIG. 13 is one embodiment of a distributed MAC architecture. The 802.11 MAC layer is distributed between the switch and a number of the repeaters connected to the switch. On one side, the MAC is terminated on the switch and on the other side the MAC is terminated on the repeaters. Thus, in this way, the distributed architecture is "one to many" relationship.

In one embodiment, the MAC sublayer on the repeater is engaged in performing real time functions related to the time synchronization (BEACON, PROBE request/response processing), receiving and transmitting 802.11 frames, including acknowledgment of the received frames.

The MAC sublayer on the switch is centralized and controls multiple repeaters. In one embodiment, the MAC sublayer on the switch includes centralized management of the mobile stations and handles mobile stations in power save mode.

In one embodiment, the switch runs multiple instances of the MAC sublayer on the switch. In this manner, the switch may support multiple, separate logical groupings of repeaters on the switch. Each grouping may be based on channel frequency such that each group is associated with a particular frequency. The frequency need not be unique to all the frequencies of all the groupings (e.g., some groups use the same frequency and other groups do not use that frequency). The groupings may be created based on channel numbers.

By being able to run multiple instances of the MAC sublayer of the switch, the architecture offers flexibility when configuring the wireless communication system and individual embodiments that allows at least one of the following benefits. First, tuning of the size of the RF coverage per logical grouping of repeaters. Second, the roaming of the stations is easy to control. Third, the management of mobile stations in power save mode is centralized. That is, the frames for the mobile stations in power save mode are buffered in the MAC sublayer on the switch and can be exchanged between other instances of the MAC sublayer on the same switch (between MAC instances) when the mobile station in power save mode is roaming.

Referring to FIG. 13, each of the units may be implemented in hardware, software, or a combination of both. Data_SAP unit 1301 exchanges messages with the LLC (logic link control) layer, conveying MSDUs (MAC service data units) from and to the LLC layer. Fragmentation unit 1302 performs fragmentation of outgoing MPDUs and MMPDUs (MAC management protocol data units). In one embodiment, since the sending of the fragmented PDU (protocol data unit) by a repeater has some timing constraints, the fragmented PDUs between the switch and the repeater are transferred in one tunneling protocol message. The tunneling protocol covers this case by putting a number of fragments in the tunneling protocol header. Power save unit 1303 performs power save device management, including TIM (Traffic Indication Map) management, in which TIM is sent to the repeaters periodically. The repeaters use the updated TIM for buffering of unicast MPDUs for mobile stations in power save mode. In one embodiment, the switch maintains buffered unicast PDUs for all mobile stations in power save mode. Broadcasts and multicast PDUs are not buffered at the switch and are sent to the repeaters to be sent out immediately after any beacon containing a TIM element with a DTIM (delivery traffic indication message) count field with a value of 0. Power save unit 1303 also performs PS-Poll request and response handling.

Routing unit 1305 routes data frames to MAC Data SAP (service access point) unit 1301 and management inbound frames to management_SAP unit 1309. De-fragmentation unit 1304 performs de-fragmentation of inbound frames. Management SAP unit 1309 includes an interface to MIB (management information base) unit 1308 and MLME (MAC sub-layer management entity) service unit 1307. MLME services unit 1307 handles the incoming associate and re-associate frames, as well as disassociate requests, and processes authentication and de-authenticate requests and generates authentication and de-authenticate response frames.

MIB management unit 1308 performs get and set functions to get and set parameters of the repeater and performs reset functions to reset all the parameters of a repeater and return the parameters to default values. The above processes may be performed using a tunneling protocol between a switch and the respective repeater.

With respect to block tunneling protocol layer 1306, both MPDUs and MMPDUs frames between the switch and the repeater are transferred by the tunneling protocol. In one embodiment, the 802.11 frames are encapsulated into Ethernet frames. In one embodiment, the tunneling protocol header is placed after the Ethernet header. This protocol transfers both data and management frames as well as special defined tunneling protocol control messages.

On the repeater, transmit unit 1311 transfers frames from MAC to PHY transmitter, generates FCS (frame check sequence), inserts timestamps in the beacons and probe responses, performs DCF timing (SIFS, DIFS, EIFS), handles ACK, RTS, CTS, and performs a back-off procedure.

Receive unit 1312 transfers frames from PHY to MAC, receives the MPDUs from the PHY, calculating and checking the FCS value (frames with valid FCS, length and protocol version are sent for receive filtering). Receive unit 1312 also filters valid received frames by destination address, and BSSID (basic service set identification) for group destination addresses, as well as handles ACK, CTS and RTS. Other functions include detection of duplicated unicast frames, updating the NAV (network allocation vector) using Duration/ID value from 802.11 frames, maintenance of the channel state based on both physical and virtual carrier sense, time slot reference generation, and providing Busy, Idle & Slot signals to transmission.

Synchronization unit 1313 processes the MLME start request in which it starts a new BSS (basic service set) and set all parameters for a beacon frame. Synchronization unit 1313 generates beacon frames periodically and handles Probe request and response frames.

Repeater management unit 1314 relays all MIB set/get requests, start requests, reset requests, request/confirm characteristic commands to a proper block on the repeater.

With respect to block tunneling protocol 1 layer 1310, frames for both MPDUs and MMPDUs between the switch and repeater are transferred by the tunneling protocol. The frames are encapsulated into the Ethernet frames and the tunneling protocol header is placed after the Ethernet header. This protocol transfers both data and management frames as well as special defined tunneling protocol control messages.

An Exemplary Switch Software Architecture

Figure 14:
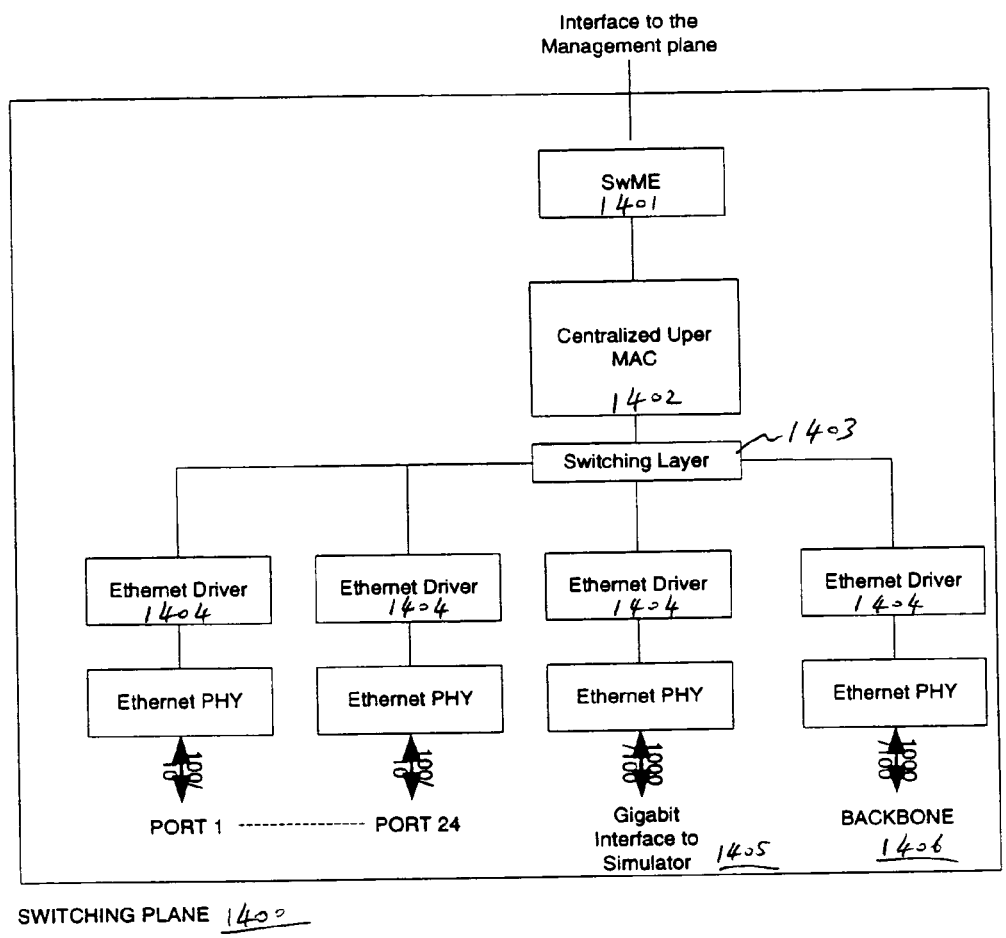
FIG. 14 illustrates one embodiment of the switching plane.

The switch contains the switching and management planes. FIG. 14 illustrates one embodiment of the switching plane. Referring to FIG. 14, the switching plane 1400 contains the switch MAC sublayer 1402 (i.e., the upper MAC), a switch management entity (SwME) 1401 and a switching layer 1403. The switching layer 1403 interfaces with the Ethernet drivers 1404 and performs the switching function. The Ethernet drivers 1404 are connected to the 10/100 BT ports of the switch (PORT1 to PORT24) or connected to another Ethernet switch with its uplink connected to the Gigabit interface 1406 on the switch. The simulator 1405 may also be connected to the any of these ports. In one embodiment, in order to support this kind of abstraction, the tunneling protocol header contains the number of the Ethernet port assigned for use with the repeater.

Data Traffic Procedures

Figure 15:
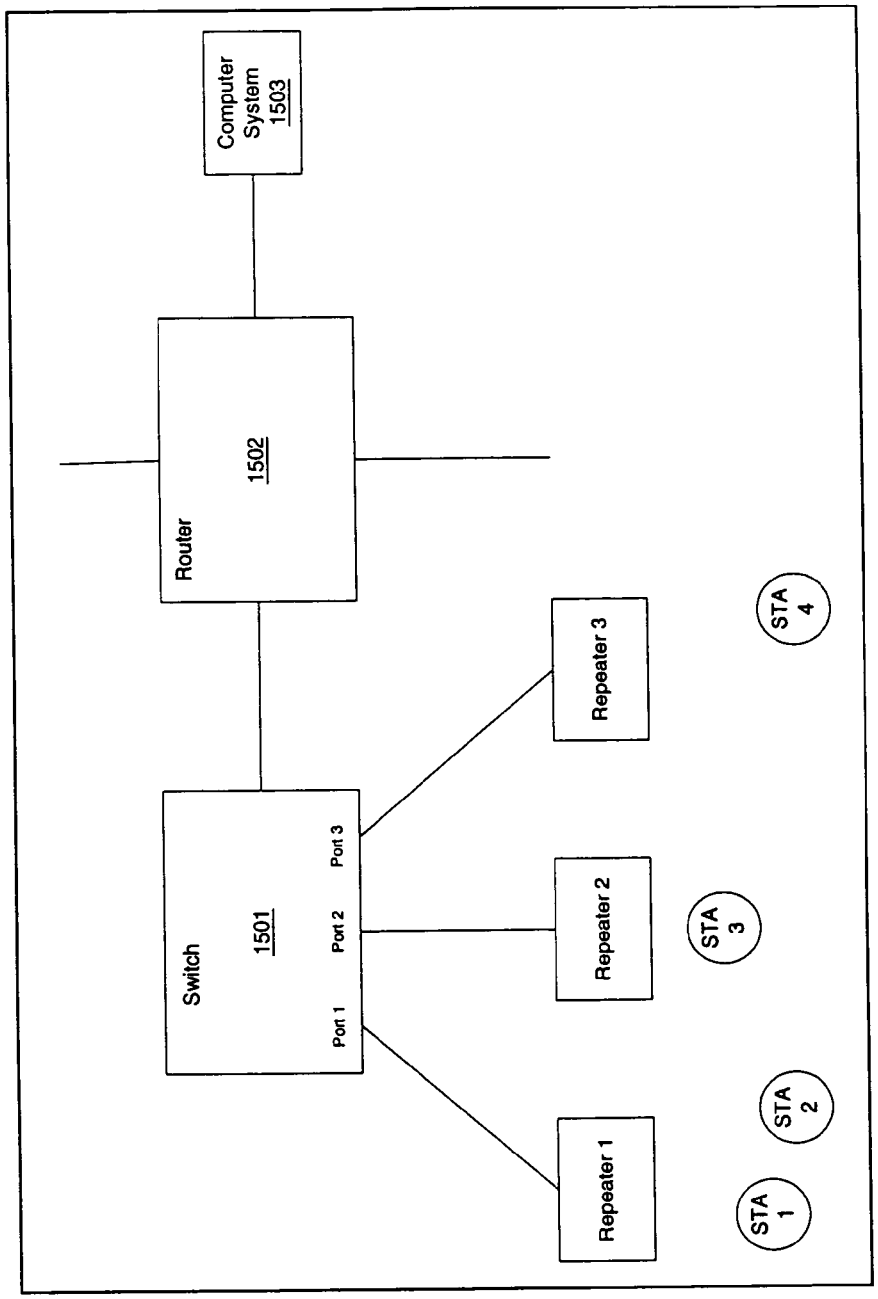
FIG. 15 illustrates the communication network and exemplary data traffic process.

FIGS. 15-18 illustrate the communication network and exemplary data traffic process. Referring to FIG. 15, switch 1501 is shown coupled to router 1502 and repeaters 1-3, via ports 1-3. Stations (STA) 1-4 are mobile stations that communicate wirelessly with the repeaters 1-3. Router 1502 is also shown coupled to computer system 1503.

Figure 16:
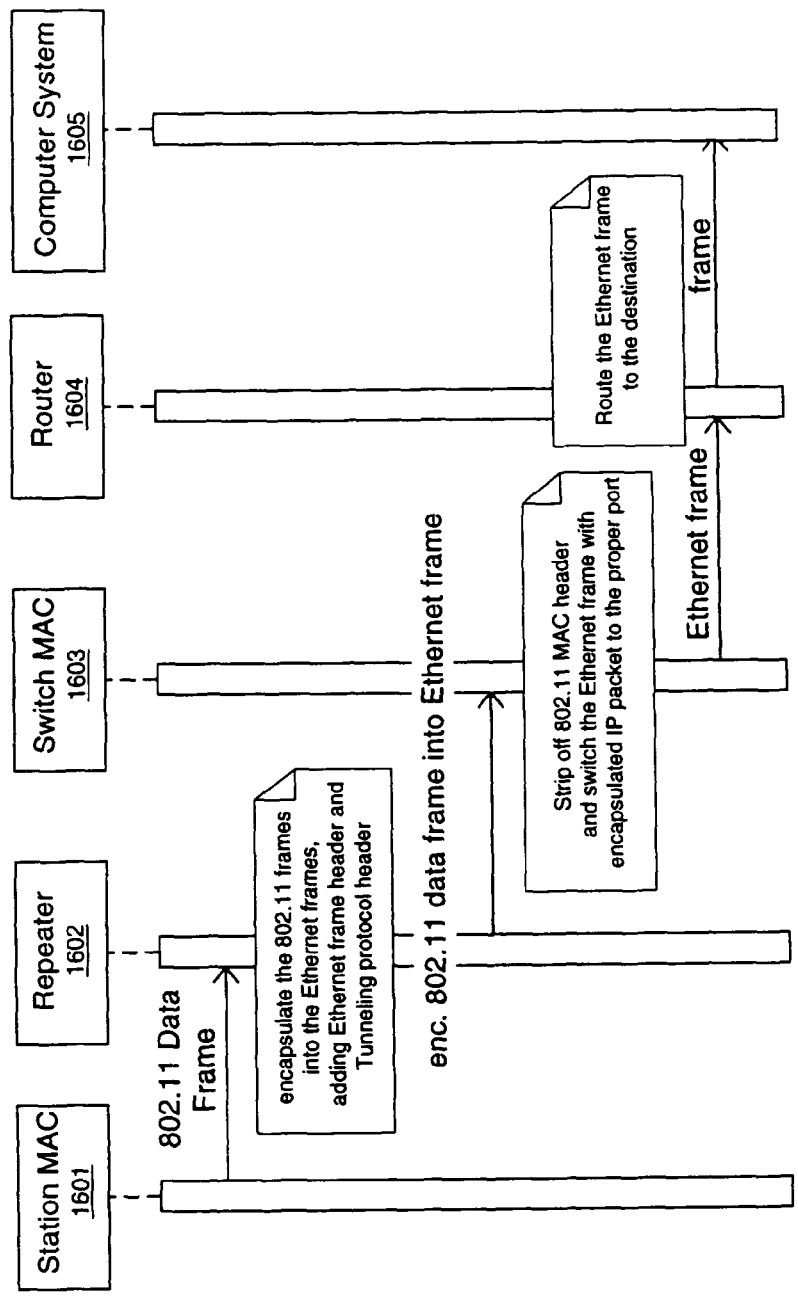
FIG. 16 illustrates an exemplary process for transferring data traffic from a mobile station to a desktop.

FIG. 16 illustrates an exemplary process for transferring data traffic from a mobile station to a desktop computer system. Referring to FIG. 16, repeater 1602 receives the one or more 802.11 data frames (packets) and encapsulates each received 802.11 data frame into one or more Ethernet packets, adding an Ethernet frame header and a tunneling protocol header to each Ethernet packet. Thereafter, repeater 1602 sends the Ethernet frames (packets) to switch MAC sublayer 1603 on the switch. At the switch, switch MAC sublayer 1603 processes the Ethernet frames by stripping off the 802.11 MAC header and tunneling protocol headers and switches Ethernet frames (packets) with encapsulated IP packets to the proper switch port. Switch MAC sublayer 1603 sends the Ethernet frames (packets) to router 1604 (backbone). Router 1604 routes each Ethernet frame to a destination, such as, for example, computer system 1605.

Figure 17:
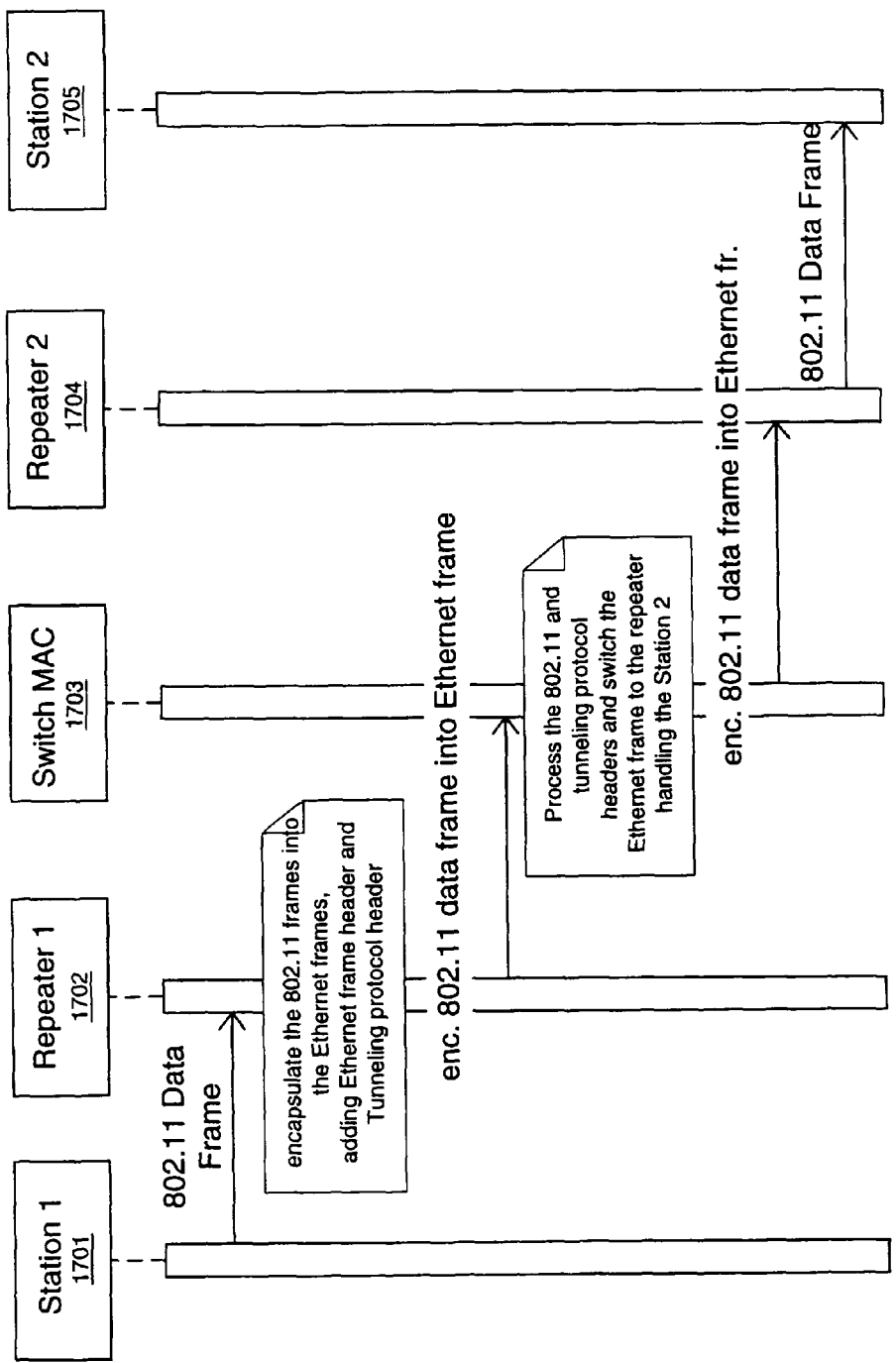
FIG. 17 illustrates an exemplary process for transferring data traffic between two mobile stations.

FIG. 17 illustrates an exemplary process for transferring data traffic between two mobile stations. In this case, the destination address is another mobile station address and the switch MAC sublayer processes both the 802.11 and tunneling protocol headers and switches the packet to the proper port. Referring to FIG. 17, a first station, station 1701, sends 802.11 data frames to a first repeater, repeater 1702. Repeater 1702 receives the 802.11 data frame and encapsulates the 802.11 frames into Ethernet frames, including adding an Ethernet frame header and tunneling protocol header to each 802.11 frame. Repeater 1702 sends the encapsulated 802.11 data frames to switch MAC sublayer 1703. Switch MAC sublayer 1703 processes the 802.11 data frames and tunneling headers and switches Ethernet frames to the repeater (repeater 1704 in this example) handling the destination station (station 1705 in this example). Switch MAC sublayer 1703 encapsulates the 802.11 data frames into Ethernet frames and sends them to repeater 1704. Repeater 1704 receives the encapsulated 802.11 data frames and sends the 802.11 data frames to station 1705.

Figure 18:
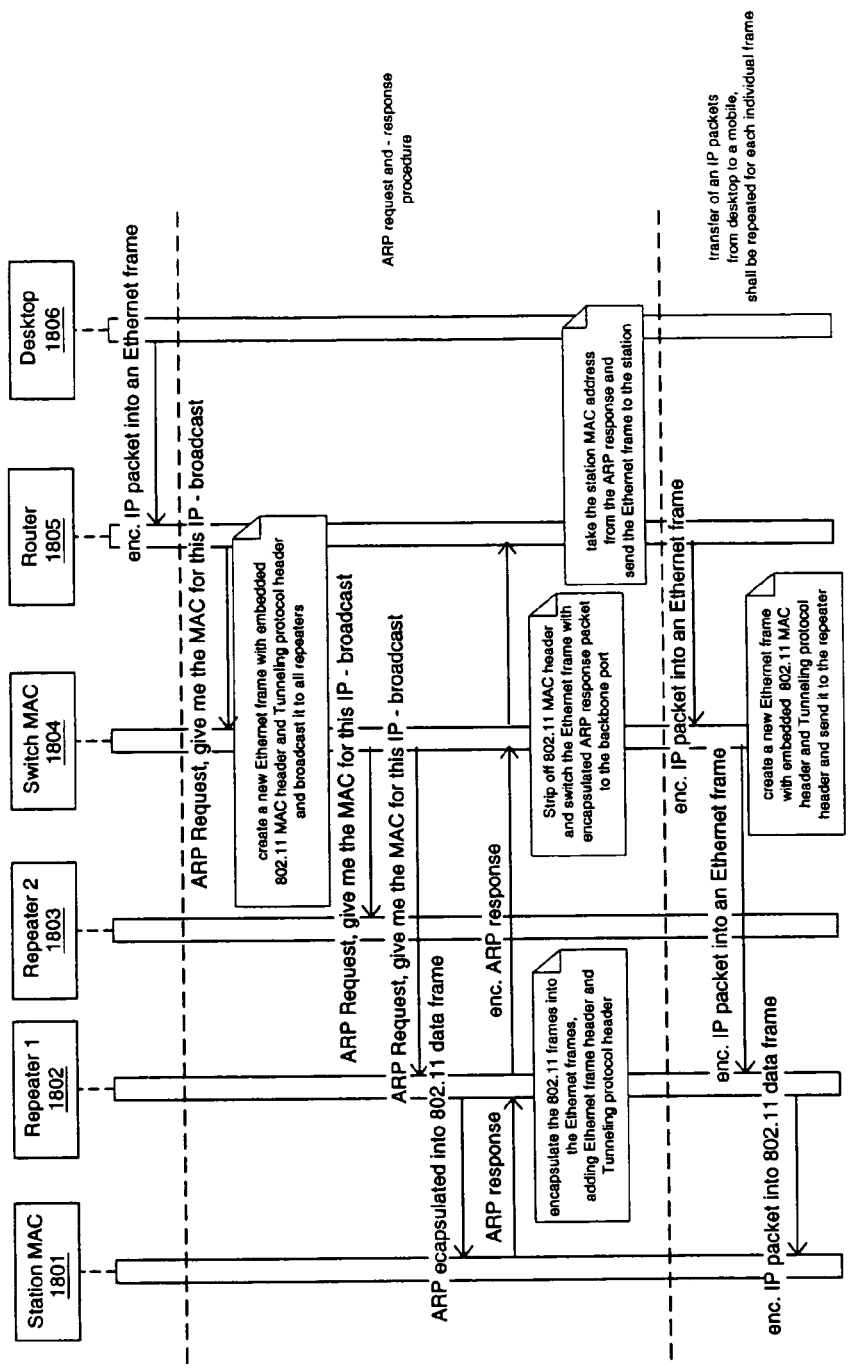
FIG. 18 illustrates an exemplary process for transferring data traffic from a desktop to a mobile station.

FIG. 18 illustrates an exemplary process for transferring data traffic from a desktop computer system to a mobile station. Referring to FIG. 18, computer system 1806 encapsulates IP packets into Ethernet frames. For the first IP packet destined to a mobile station, the router starts an ARP (address resolution protocol) procedure in order to obtain the corresponding MAC address. Router 1805 sends an ARP request to switch MAC sublayer 1804 to request the MAC for this IP broadcast. Switch MAC sublayer 1804 encapsulates the ARP request into an 802.11 packet and then encapsulates this packet into an Ethernet packet, essentially creating a new Ethernet frame with an embedded 802.11 MAC header and tunneling protocol header. Switch MAC sublayer 1804 broadcasts this packet to all repeaters, repeaters 1802-1803 in this example, which then rebroadcast it for the desired mobile station to receive. The mobile station, station 1801, with the IP address contained in the ARP request sends an ARP response with its MAC address. Repeater 1802 receives the ARP response and encapsulates the 802.11 frames into Ethernet frames, adding an Ethernet frame header and tunneling protocol header. Repeater 1802 sends the encapsulated ARP response to switch MAC sublayer 1804, which strips off the 802.11 MAC header and switches the Ethernet frame with encapsulated ARP response packet to the backbone port.

After this procedure, the router takes the station MAC address from the ARP response and routes all IP packets for this mobile station as described above. Since the switch MAC sublayer has the configuration information about MAC and IP addresses, the ARP response could come from the switch.

Management Procedures

There are a number of management procedures supported by the distributed MAC architecture. In one embodiment, these include starting up the switch, resetting the MAC, starting a new BSS, synchronization, authentication, and de-authentication, association, disassociation and re-association.

With respect to starting up the switch, the switch is started by the switch management entity (SwME). To configure and start the switch and the repeaters, the SwME issues commands to the switch MAC sublayer on the switch. The commands intended for the repeaters are transferred using the tunneling protocol. Layers of the tunneling protocol are running on the switch and the repeaters.

With respect to MAC reset, the switch and repeaters cooperate to perform a reset of the MAC. Since the MAC is distributed between the switch and repeaters, the reset process is modified to support this architecture. In one embodiment, the switch management entity sends a reset request to each of the repeaters as part of a tunneling protocol process and receives a reset response indicating if the reset was successful. The reset process may set the MAC to initial conditions, clearing all internal variables to the default values. MIB (management information base) attributes may be reset to their implementation-dependent default values.

With respect to the start process, the switch management entity requests that the MAC entity start a new BSS. The switch management entity generates the request to start an infrastructure BSS (basic service set) with the MAC entity acting as an access point and sends it to all MAC entities where the switch is acting as a multiple access point. Each repeater responds with an indication as to whether the start process was successful.

With respect to synchronization, the synchronization process determines the characteristics of the available BSSs and allows for synchronizing the timing of a mobile station with a specified BSS (switch MAC entity). In one embodiment, the synchronization process begins with an instance of the switch MAC sublayer generating a beacon frame, which is encapsulated and sent to the repeaters periodically. The repeater updates the timestamp of the beacon frame before sending the beacon frame in the air. Based on the beacon frame, the mobile station synchronizes its timers.

The switch management entity also causes authentication to establish a relationship between a station MAC sublayer and the instances of the switch MAC sublayers. In one embodiment, a mobile station is authenticated if its MAC address is in the access list on the switch. Similarly, de-authentication is supported to invalidate an authentication relationship with a switch MAC entity. In one embodiment, de-authentication is initiated by the mobile station. In this case, the instance of the switch MAC sublayer on the switch associated with the repeater assigned to the mobile station updates the station state as maintained by the switch. The result of de-authentication is that the state of the mobile station is listed in the switch as unauthenticated and unassociated.

Association

Data frames for a mobile station are forwarded from the repeater that has the token for the mobile station. In one embodiment, if a repeater without the token receives the data frames, it forwards only a short frame with the RSSI (in the tunneling protocol header) to the switch. The switch keeps track of the RSSI for the mobile station. If the repeater without the token has better reception and if the repeater with the token has "high" error rate, the switch may re-assign the token. The RSSI and token are part of the tunneling protocol header. The token assignment occurs within the association process.

Figure 19:
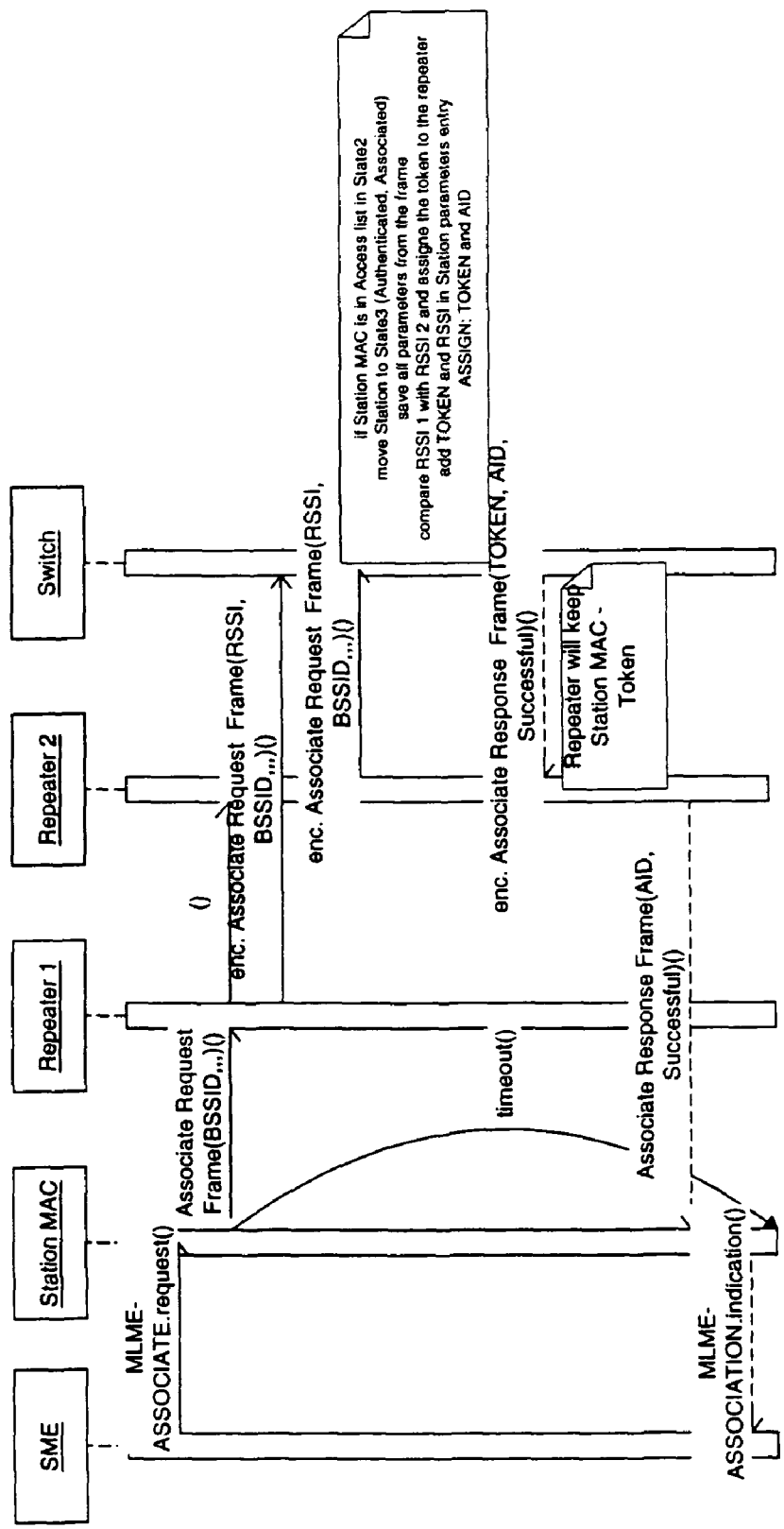
FIG. 19 is a data flow diagram of one embodiment of an association and token assignment process.

FIG. 19 is a data flow diagram of one embodiment of an association and token assignment process. Referring to FIG. 19, an association request is generated by a mobile station and sent by the mobile station, via the mobile station MAC. Repeater 2 has the token for the mobile station. Therefore, repeater 2 encapsulates the association request, along with is RSSI and BSSID, into an Ethernet packet and sends the encapsulated packet to the switch. Repeater 1, which does not have the token for the mobile station, forwards a short frame with the RSSI in the tunneling protocol header.

The switch takes the RSSIs for the two identical frames and determines which one is stronger. Based on which is stronger, the switch either allows the repeater that has the token and station MAC for the mobile station to keep them (e.g., repeater 2) or reassigns them to the repeater with the higher RSSI (e.g., repeater 1). In either case, the switch sends an association response encapsulated in an Ethernet packet with the token and association ID to the repeater, which de-encapsulates it and forwards it to the mobile station, via the mobile station MAC.

Re-Association

Figure 20:
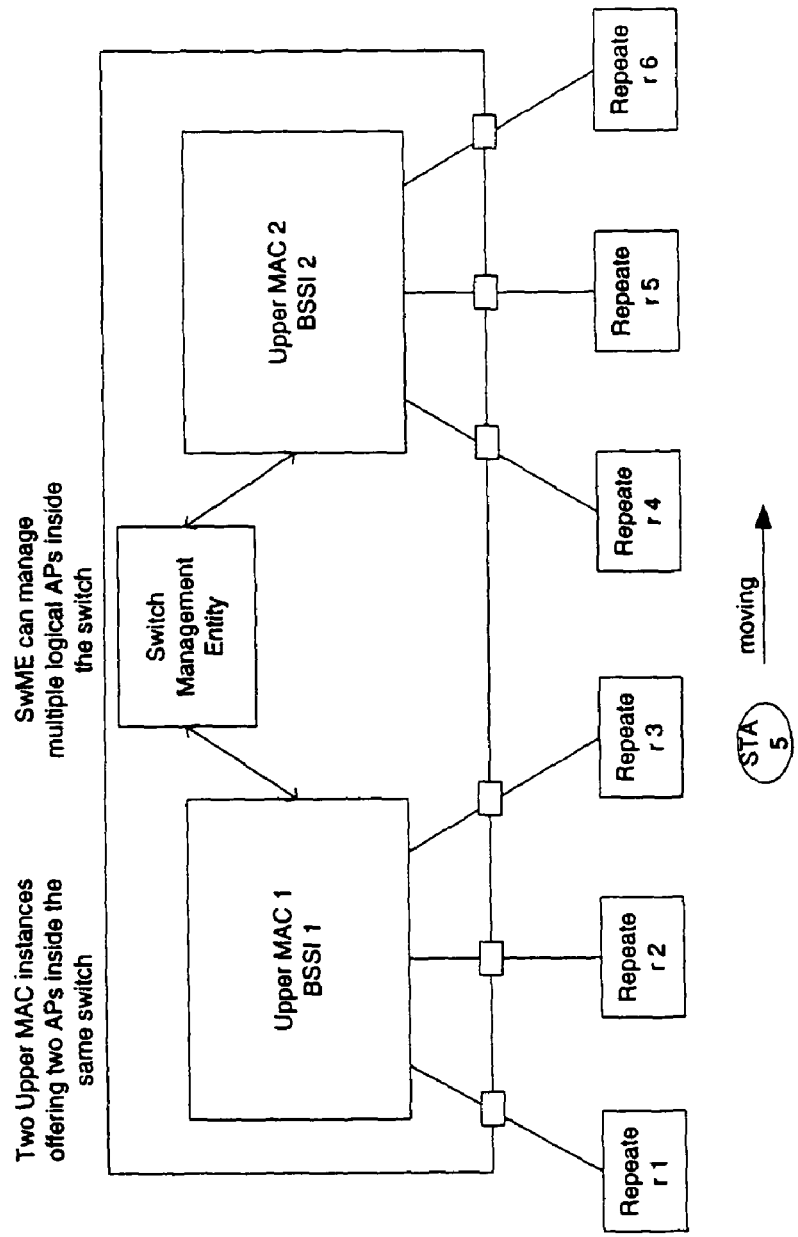
FIG. 20 is a block diagram of two MAC sublayer instances in a switch.

The following exemplary procedure describes how a mobile station becomes re-associated with another switch MAC entity (logical access point). FIG. 20 is a block diagram of two MAC sublayer instances in a switch. Referring to FIG. 20, two (or more) instances of the switch MAC sublayer run on the switch (offering the access points (APs) inside the same switch). Each instance has its own BSSID (basic service set identification) (e.g., the MAC address of the MAC instance). Both MAC instances are managed by the same switch management entity (SwME). The SwME manages these as multiple access points (APs) inside the switch. In one embodiment, communication between MAC instances is through the SwME. Both MAC instances as well as the switch management entity (SwME) reside on the same switch. Communication between the MAC instances can be direct or through the SwME. In one embodiment, the SwME has knowledge of all MAC instances and is involved in this communication. Thus, the switch acts as a distribution system containing multiple switch MAC sublayer instances (multiple logical access points) in which roaming is centralized in the switch.

In one embodiment, the association request from the mobile station is encapsulated and sent by the repeater to the switch. The association request with the BSSID of the first MAC sublayer instance is sent from the second MAC sublayer instance through the SwME to the first MAC sublayer instance. As a result, the first MAC sublayer instance generates a response representing that mobile station has been already associated with the first MAC sublayer instance. Using this process, the station does not have to go again through authentication procedure and it can be automatically associated with the second MAC sublayer instance. When the second MAC sublayer instance receives the response, the station becomes associated with the second MAC sublayer. Thus, when the station roamed, the handover procedure is performed in the switch. Therefore, the switch acts as a complete distribution system with multiple logical access points.

As described above, when a station roams between two MAC sublayer instances (logical access points) inside one distribution system, there is only one repeater controlled by one MAC sublayer instance. In one embodiment, a mobile station can roam from one repeater to another repeater controlled by the same MAC sublayer instance (logical access point) without a need to associate again, and only the token re-assignment procedure described herein has to be performed. In one embodiment, the station is not aware of the token re-assignment procedure.

If a mobile station moves from one repeater belonging to one logical access point (one MAC sublayer instance) to a second repeater belonging to a second logical access point (second MAC sublayer instance), the station has to be re-associated and the token re-assignment procedure has to be performed. The handover procedure is performed in the switch. Again, the station is not aware of any token assignment procedures.

Note that mobile stations are associated with switch MAC sublayers instances not with a repeater. If a station is controlled by a repeater, the repeater has a token for that station. All repeaters controlled by a particular MAC sublayer instance are associated with a station if the station is associated with that MAC sublayer instance, and only one repeater has a token for that station.

A user can configure the switch to have any number of MAC instances. In one embodiment, this is configured using a parameter. Also configurable is which repeater belongs to MAC instance. For example, if the switch has 64 ports, it can be configured to act as 8 access points (8 upper MAC instances running concurrently), with 8 repeaters per access point (one upper MAC sublayer controlling 8 repeaters).

Figure 21:
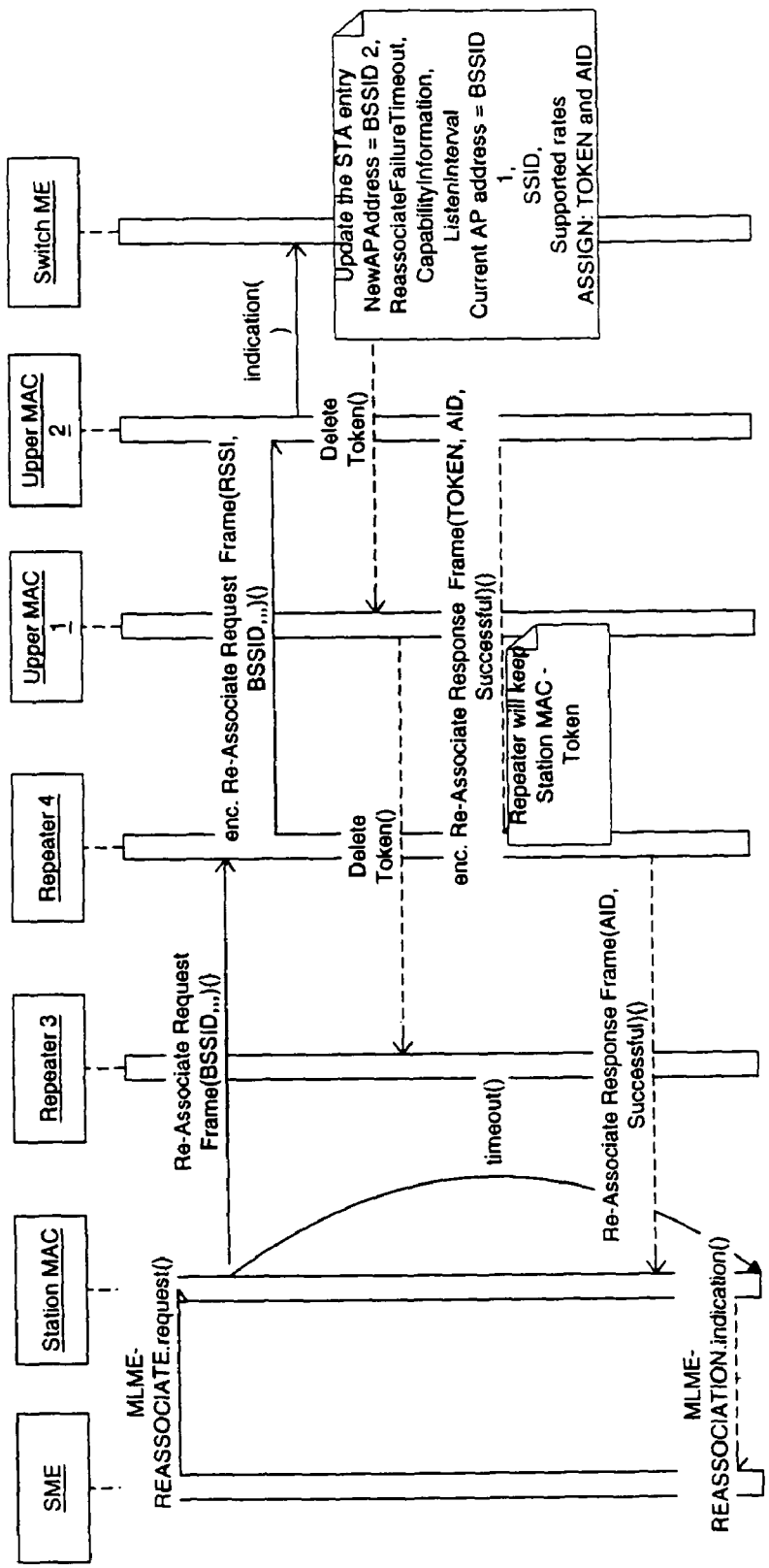
FIG. 21 is a data flow diagram of one embodiment of a re-association process.

FIG. 21 is a data flow diagram of one embodiment of a re-association process. Referring to FIG. 21, a mobile station SME (station management entity) generates a re-association request and sends it to a repeater, repeater 4 in this case, along with its BSSID via the mobile station MAC. In one embodiment, the mobile station knows that it needs to make a re-association request because it has received a BEACON frame with different BSSID (i.e., a different MAC instance), indicating that the mobile station had been roaming. The repeater receives the re-association request, encapsulates the packets of the re-association request with the RSSI into an Ethernet packet, and sends the Ethernet packet to the instance of the switch MAC sublayer associated with the repeater. In response thereto, the instance of the switch MAC sublayer generates an indication to the switch management entity indicating that a re-association request has been made.

In response to the indication, the switch management entity causes a new AID (association id) to be assigned to the mobile station, a token for the mobile station to be assigned to a new repeater, and the previous token assignment to be deleted. In one embodiment, the association identifier (AID) is a number (value between 0 and 2007) assigned to a mobile station by the switch or an access point during the association procedure. It is an 802.11 standard defined parameter. After the station is associated, the station inserts the AID in every message. More specifically, the switch management entity updates the entry for the mobile station in the access list, including setting the new access point address to the address of the instance of the switch MAC sublayer associated with the repeater. The switch management entity also assigns a token and an association ID.

The switch management entity sends a delete token command to the instance of the switch MAC layer associated with the repeater previously assigned to the mobile station, which the instance of the switch MAC layer forwards to the repeater (repeater 3 in this case).

The instance of the switch MAC sublayer (upper MAC 2 in this case) associated with the repeater that forwarded the re-associate request (repeater 4 in this case) sends a re-associate response frame to the repeater with the token, association ID, and an indication that the re-association was successful. The repeater de-encapsulates the packet, stores the mobile station MAC token, and forwards the de-encapsulated re-associate response frame to the mobile station MAC with the association ID and the successful indication.

Disassociation

Figure 22:
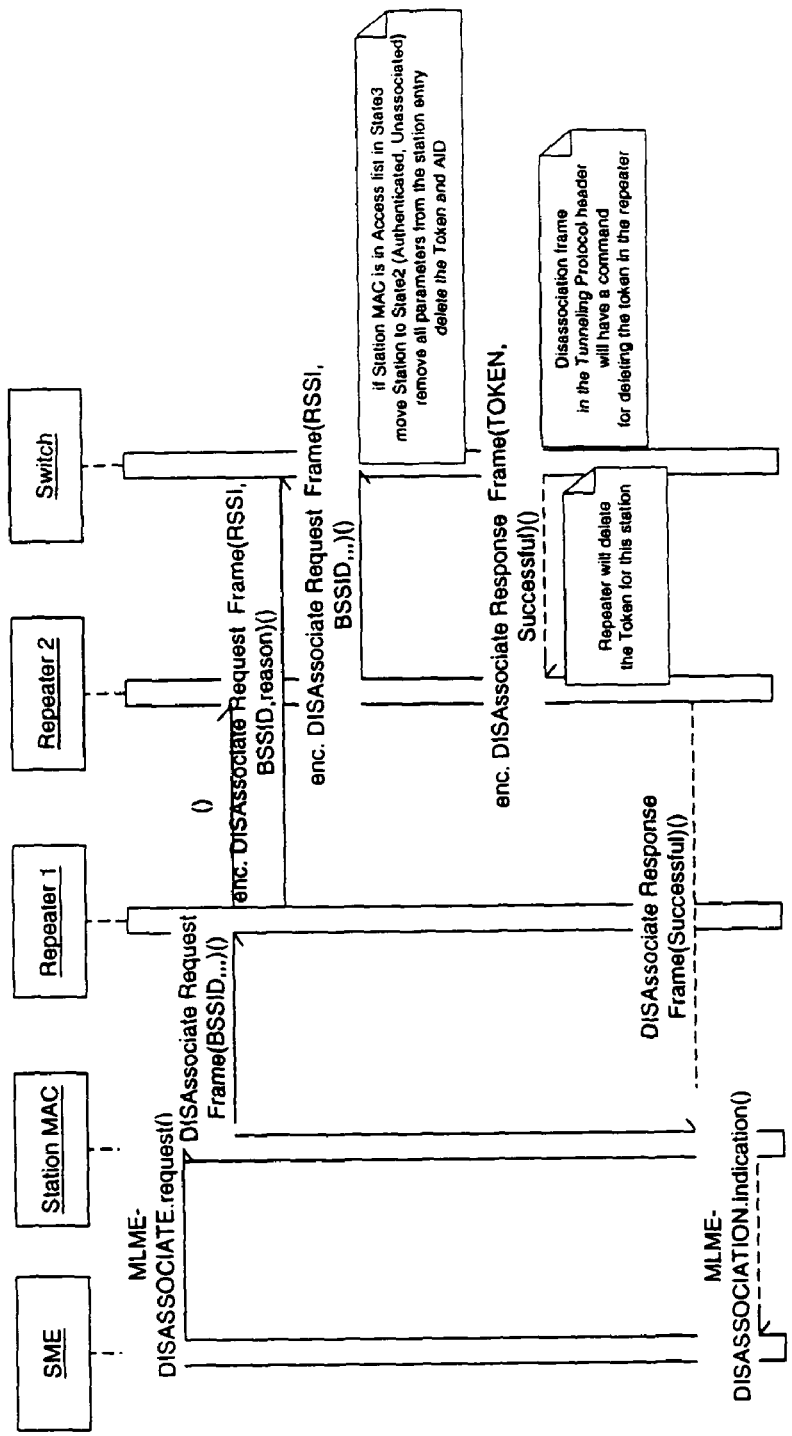
FIG. 22 is a flow diagram on one embodiment of a disassociation process.

A mobile station may request disassociation with a specified peer MAC entity that is acting as a logical access point. The mobile station may request this due to inactivity or because a switch is unable to handle all currently associated mobile stations, etc. FIG. 22 is a flow diagram on one embodiment of a disassociation process. Referring to FIG. 22, a disassociation request is generated by the SME (station management entity) on the mobile station and sent by the mobile station MAC as a disassociate request frame with the BSSID (i.e., the instance identifiers). The BSSID is a basic service set identifier representing the MAC address of an upper MAC instance. Each repeaters that receives the disassociate request frame without errors encapsulates it with its RSSI and forwards it to the switch, regardless of whether it has the token for the mobile station. In response to the receiving the disassociate request frame, the switch MAC sublayer determines whether the mobile station is in the access list and changes the state of the mobile station in the access list to authenticated and unassociated, removes all parameters from the access list entry for the mobile station, and deletes the token and association ID. In one embodiment, the access list is a dynamically created hash table containing records for all authenticated stations, in which each record contains a station MAC address, association identifier, BSSID, a station state, and a repeater port number which has station token. In other words, on the switch MAC sublayer, the state of the mobile station is updated and its AID is deleted. The switch then sends a disassociate response frame encapsulated in an Ethernet frame to the repeater having the token. Embedded in the tunneling protocol header of the frame is a tunneling protocol command to delete the token, which causes the repeater having the token to delete the token. Thereafter, the repeater that deleted the token sends the de-encapsulated disassociate response frame to the MAC of the mobile station with an indication that disassociation was successful.

In one embodiment, this process can be initiated by the switch management entity. This can happen if the switch decides to disassociate the mobile station because of inactivity or because a switch is unable to handle all currently associated mobile stations.

An Exemplary Communication Network

Figure 23:
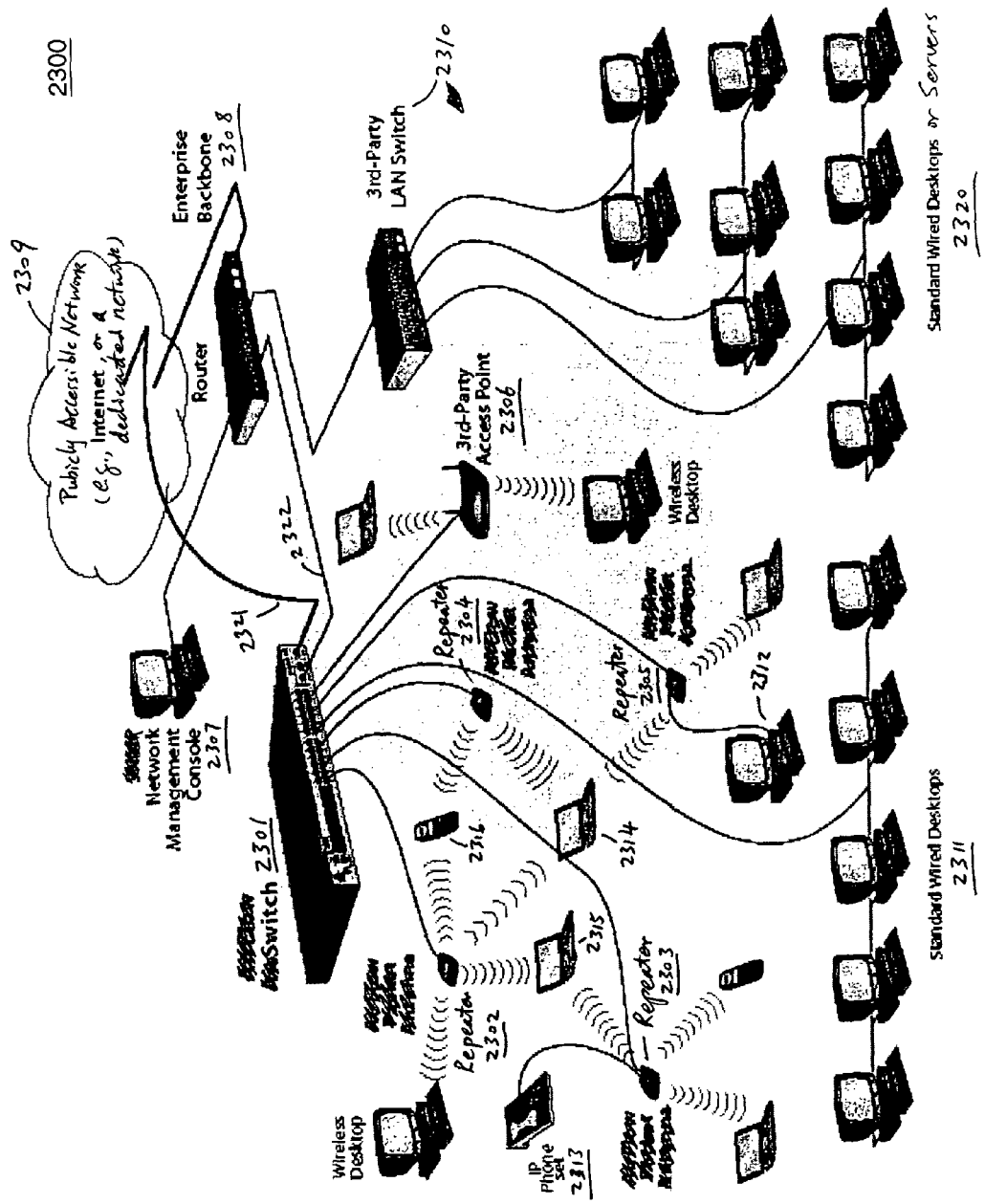
FIG. 23 is a block diagram of one embodiment of a communication system.

FIG. 23 is a block diagram of an embodiment of a communication system. The wireless components of exemplary system 2300 may be operating at a substantially the same frequency, which will be described in details further below. In one embodiment, system 2300 includes a switch 2301 having one or more switch ports which may be coupled to one or more repeaters, such as repeaters 2302 to 2305. Repeaters 2302 to 2305 may be wireless communication devices capable of receiving and transmitting data wirelessly with one or more mobile stations, also referred to as packet antennas. Repeaters 2302 to 2305 may wirelessly communicate with one or more mobile stations, such as mobile stations 2314 to 2316. A mobile station may be able to wirelessly communicate with more than one repeater. For example, mobile station 2316 may be able to communicate with repeaters 2302 and 2304. Each of the repeaters 2302 and 2304 may include a received signal strength indicator (RSSI) that allows switch 2301 to determine which repeater is the closest repeater with respect to mobile station 2316. In one embodiment, the repeaters and the mobile stations are operating at substantially the same frequency. In this embodiment, switch 2301 is responsible for managing transmission of packets to the mobile stations to avoid data collisions.

In one embodiment, each of the repeaters 2302-2305 receives one or more packets of wirelessly transmitted packets from the mobile stations. In one embodiment, each of the repeaters receives an indication of which of the wirelessly transmitted packets were received without errors by other repeaters and a received signal strength for those packets. In one embodiment, each of the repeaters forwards to the switch each packet of the wirelessly transmitted packets that each repeater had received at a received signal strength higher than any other repeater. Alternatively, only the repeater with the token for a mobile station forwards the packets from the mobile station to the switch. The repeaters may forward to the switch RSSI values for all packets received without error.

In one embodiment, the repeaters are grouped and the switch handles each group of repeaters separately. Even so, if a mobile station moves to a location in which a different repeater in a different group is associated with the mobile station, any data buffered by the switch may be forwarded to the mobile device through the new repeater using a single data transfer within the switch.

In addition to wireless components, according to one embodiment, a repeater may further include one or more ports to allow another station to couple to the switch. For example, repeater 2303 may include a wired port to connect with an IP ready phone which may be able to communicate with other phone systems using voice over IP (VoIP) techniques, while repeater 2303 is able to communicate wirelessly with other mobile stations, such as mobile station 2315. Similarly, repeater 2305 may include a wired port to connect a wired station, such as a conventional desktop station 2312.

Compared to traditional 802.11 access points, in one embodiment, the repeaters are technologically light, simply providing a portal from the RF air medium into a wired network where network convergence occurs. According to one embodiment, the repeaters do not perform any or very little packet processing themselves, the repeaters merely pass data, management and control frames back and forth between wireless clients and switch 2301. Nor do the repeaters perform any of the access control, security, or management functions of the conventional 802.11 access points. Instead, switch 2301 performs most of these functionalities, which will be described in details further below.

Furthermore, according to another embodiment, switch 2301 may include one or more ports suitable to connect a local area network (LAN), such as a LAN with one or more standard wired desktop systems 2311, to switch 2301. According to yet another embodiment, the local area network coupled to switch 2301 may be another wireless network using, for example, a third party access point device 2306.

According to one embodiment, an uplink of switch 2301 may be coupled to an enterprise backbone, such as enterprise backbone 2308, through a router. Enterprise backbone 2308 may include one or more local area networks, such as Intranet 2309 having one or more servers and clients 2320. A network management console 2307 may be coupled to the enterprise backbone 2308 to access switch 2301. For example, a network administrator may use network management console 2307 (e.g., via a graphical user interface (GUI) or a command line interface (CLI)) (e.g., telnet) to access and to configure switch 2301 on behalf of one or more client nodes (e.g., mobile stations or wired stations), including Ethernet routing information and security policies associated with each of the client nodes. In one embodiment, the Ethernet routing information and security policies may be stored in a table within switch 2301, which will be described in details further below.

According to one embodiment, switch 2301 includes one or more ports 2321 (also referred to as public interfaces or public ports) coupled to a separate network 2309, which will be described in details further below. Separate network 2309 may be a publicly accessible network, such as a wide area network (WAN) (e.g., Internet) or a publicly accessible dedicated network. Separate network 2309 may be a private network, such as a corporate Intranet network. When switch 2301 receives a packet from one of the client nodes, either a wired node or a mobile station, switch 2301 may route the packet either to publicly accessible network 2309 via one or more public ports 2321 or to enterprise backbone 2308 via uplink 2322, based on the Ethernet routing information and the security policies associated with the client nodes.

An Exemplary Single Frequency Wireless Communication System

As mentioned above, according to one embodiment, the wireless components of system 2300, such as repeaters 2302 to 2305 and mobile stations 2314 to 2316, may operate at substantially the same frequency. Switch 2301 manages and schedules transmission of packets back and forth between the respective repeaters and mobile stations, such that no data collision occurs among multiple repeaters and mobile stations. Since the wireless components are operating at substantially the same frequency, contrary to traditional 802.11 access points that operate on non-overlapping communication frequencies, the communication bandwidth is greatly enhanced. In addition, the transmitting and receiving power levels of the mobile stations may stay at a lower level since no interference occurs and there is no need to raise the transmitting and receiving power levels, contrary to conventional approaches. As a result, the battery life of a mobile station is greatly enhanced.

In one embodiment, repeaters operating at substantially the same frequency may be grouped to function as a single entity, similar to a traditional 802.11 access point. That is, the repeaters operating at substantially the same frequency may coordinate transmissions of data packets with each other and function as an access point with respect to the one or more mobile stations and the switch. For example, repeaters 2302 to 2305 may be operating at substantially the same communication frequency. Repeaters 2302 to 2305 may coordinate with each other (e.g., using a token or a signal strength indicator as described above), with respect to transmissions of data to one or more mobile stations, such as mobile stations 2314 to 2316. A mobile station, such as mobile station 2315, may consider repeaters 2302 and 2303 as a single access point when it communicates with both repeaters 2302 and 2303. In fact, repeaters 2302 and 2303 may operate as a communication channel of an access point, similar to third-party access point 2306, in accordance with the IEEE 802.11 protocol.

Alternatively, in one embodiment, some of the repeaters may be grouped to operate at a first communication frequency while other repeaters may be grouped to operate at a second communication frequency. The grouped repeaters may operate at substantially the same frequency, which may function as an access point, similar to an 802.11 access point. For example, repeaters 2302 and 2303 may operate at a first communication frequency while repeaters 2304 and 2305 may operate at a second communication frequency. The first and second communication frequencies may be set up similar to those used in a traditional 802.11 access point. For example, repeaters 2302 and 2303 may be considered as a first communication channel and repeaters 2304 and 2305 may be considered as a second communication channel. The first and second communication channels may be defined similar to those used in a traditional 802.11 access point. As a result, switch 2301 and repeaters 2302 to 2305 may operate as a virtual access point having multiple communication channels (e.g., a communication channel made of repeaters 2302 and 2303 and another communication channel made of repeaters 2304 and 2305). An identification number (e.g., a channel number) may be assigned to the grouped repeaters operating at substantially the same frequency.

According to one embodiment, when switch 2301 receives a packet destined for a mobile station, such as mobile station 2315. Switch 2301 determines whether an immediately transmitting the packet to mobile station 2315 via repeater 2302 would cause interference at mobile station 2315. If switch 2301 determines that immediately transmitting the packet to mobile station 2315 would cause interference, switch 2301 may delay the transmission and schedule the transmission at some other time, such as, for example, at a time when no other communications occur to mobile station 2315.

Specifically, for example, when switch 2301 receives a packet destined for a mobile station with a particular IP address (e.g., mobile station 2315), switch 2301 performs an address translation to translate, for example, the IP address into an Ethernet MAC address. Switch 2301 uses the Ethernet MAC address to search in a location tracking database to determine which repeater is closest to the mobile station having the Ethernet MAC address. Once the repeater (e.g., repeater 2302) is identified by switch 2301, switch 2301 knows the switch port on which the packet should be sent so that it is sent to the repeater listed in the location tracking database (for forwarding by repeater 2302 to mobile station 2315).

Once the repeater (and the port number) has been identified, switch 2301 checks whether an interference problem would be created if the packet is sent by switch 2301 to the mobile station at that time. An interference problem would be created if there are other transmissions that would be occurring when the packet is forwarded onto its destination mobile station (e.g., mobile station 2315). If no interference problem exists, switch 2301 sends the packet through the identified port to the repeater (e.g., repeater 2302) most recently determined to be closest to the mobile station. However, if an interference problem would be created by sending the packet immediately, then switch 2301 delays sending the packet through the identified port to the repeater most recently determined to be closest to the mobile station.

In one embodiment, to determine if an interference problem would exist if a packet is sent immediately upon determining the switch port number on which the packet is to be sent, switch 2301 maintains and uses two databases. One of the databases indicates which of the repeaters interfere with each other during their transmissions. This database may be examined for every packet that is to be sent and switch 2301 schedules the transmission of packets so that repeaters that interfere with each other when their transmissions overlap do not transmit at the same time.

The other database is a listing of mobile stations and the corresponding set of repeaters that last received the transmissions. If two mobile stations have overlapping sets, then it is possible for their acknowledgement packets to interfere when they simultaneously receive non-interfering data packets from different repeaters. Because mobile stations send acknowledge packets upon receiving downstream packets, there is a possibility that mobile stations will interfere with each other when sending their acknowledgement packets. Switch 2301 takes this information into account during scheduling and schedules downstream packets to the mobile stations to reduce the occurrence of mobile stations interfering with other when sending acknowledgment packets. The information in these two databases may be collected by sending out test packets to the WLAN to determine which repeaters and mobile devices cause the interference described above.

Alternatively, in one embodiment, all repeaters communicatively coupled to the switch perform the scheduling instead of the switch. This type of scheduling is also referred to as a distributed form of scheduling, which is in addition to the centralized scheduling typically performed by a switch. In one embodiment, there is no need to have databases to keep track of where the interference may occur (e.g., between the communications of repeaters and mobile stations). Instead, each repeater acts on its own to transmit packets when the repeater determines that the communication channel is clear. For example, if a repeater detects that there may be one or more transmissions performed by one or more other repeaters that would cause interference that prevents the packets from being received by the intended mobile station, the repeater may wait for a period of time to allow the respective communication channel cleared, using some techniques similar to a CSMA/CD (carrier sense multiple access/collision detection) algorithm. Alternatively, the repeaters may communicate with each other, wired or wirelessly, with respect to the scheduling using, for example, tunneling protocols within the Ethernet protocol. However, in one embodiment, in such a case, the switch still handles routing the token to the correct repeater for mobility support.

Figure 24A:
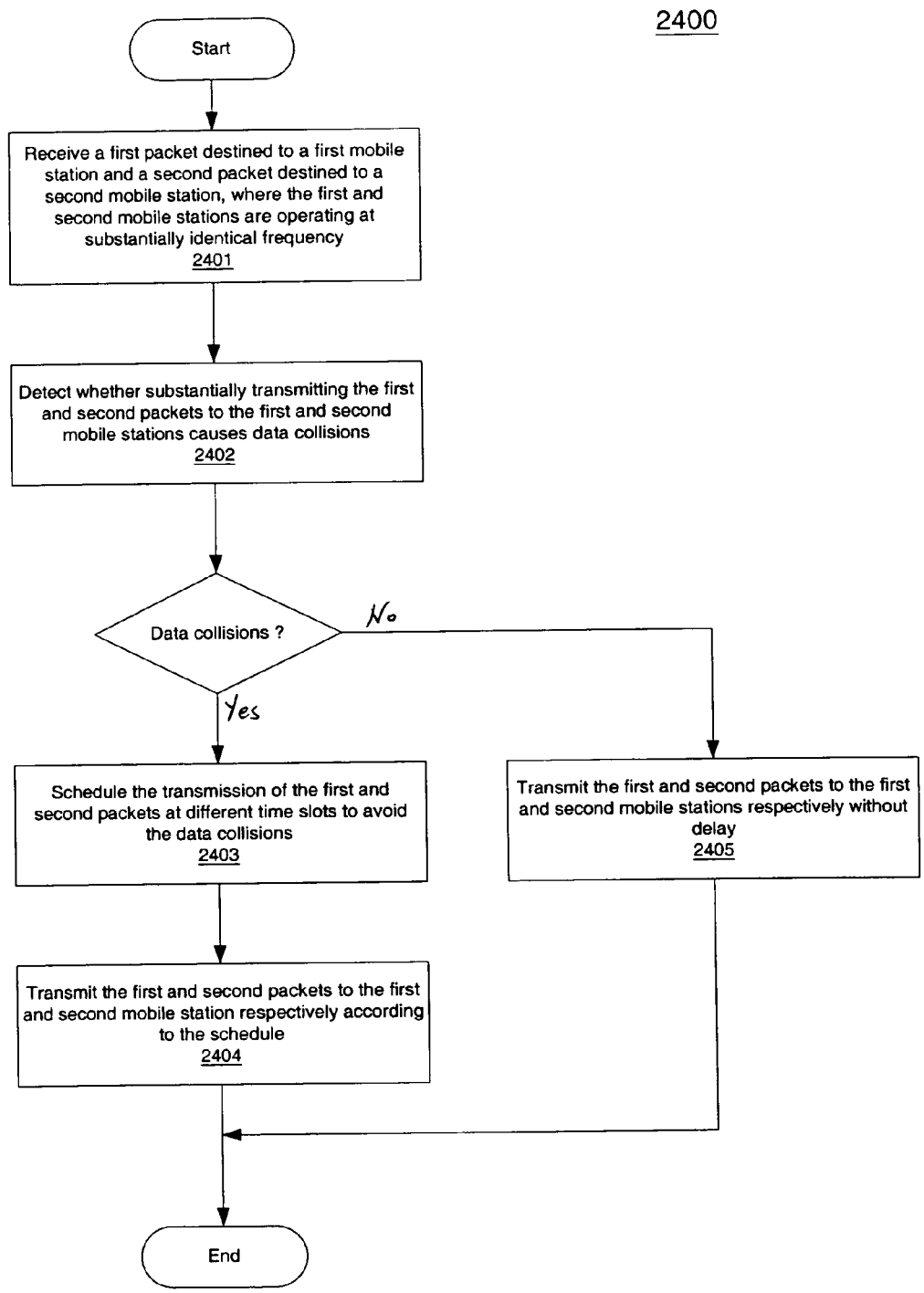
FIG. 24A is a flow diagram of an embodiment of a process in a single frequency wireless communication system.

FIG. 24A is a flow diagram of one embodiment of a process performed by a switch. The process may be performed by processing logic that may comprise hardware (circuitry, dedicated logic, etc.), software (such as is run on a general purpose computer system or a dedicated machine), or a combination of both. In one embodiment, exemplary process 2400 includes transmitting wirelessly, at one or more repeaters, a first packet and a second packet to a first mobile station and a second mobile station respectively without data collisions, wherein the first and second mobile stations are operating at substantially identical frequency.

Referring to FIG. 24A, at processing block 2401, processing logic receives a first packet destined to a first mobile station and a second packet destined to a second mobile station. Processing logic determines whether substantially transmitting the first and second packets to the first and second mobile stations would cause data collisions (processing block 2402). In one embodiment, the processing logic determines the closest repeaters associated with the first and second mobile stations using one of the aforementioned techniques. Based on the location of the repeaters relative to the first and second mobile stations, processing logic may determine whether there would be interference between transmissions to the first and second mobile stations when the first and second packets are transmitted substantially simultaneously.

If it is determined that there would be interference between the first and second mobile stations, processing logic schedules the transmission of the first and second packets at different time slots to avoid the interference (processing block 2403). Thereafter, processing logic transmits the first and second packets to the respective repeaters, which forward the first and second packets to the first and second mobile stations respectively (processing block 2404).

If, however, it is determined that there would be no interference between transmissions to the first and second mobile stations (e.g., the first and second mobile stations with their respective repeaters are far away enough from each other), processing logic may transmit, without delay, the first and second packet to the respective repeaters which forward the first and second packets to the first and second mobile stations respectively.

Figure 24B:
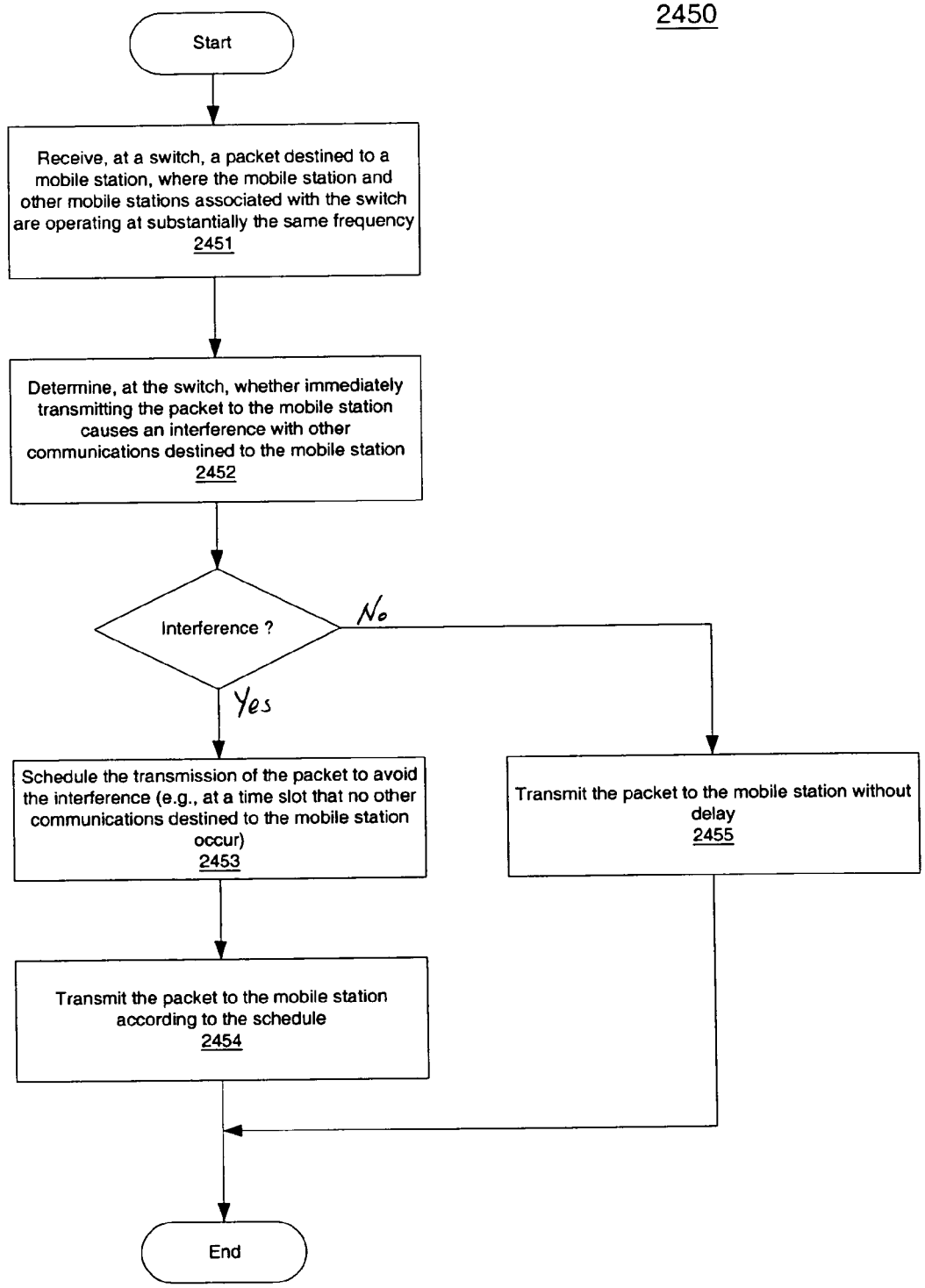
FIG. 24B is a flow diagram of another embodiment of a process in a single frequency wireless communication system.

FIG. 24B is a flow diagram of one embodiment of a process performed by a switch. The process may be performed by processing logic that may comprise hardware (circuitry, dedicated logic, etc.), software (such as is run on a general purpose computer system or a dedicated machine), or a combination of both. In one embodiment, exemplary process 2450 includes receiving, at a switch, a packet destined to a mobile station, and transmitting wirelessly the packet to the mobile station while there is no other communications destined to the mobile station occurring, where the mobile station and other mobile stations associated with the switch operate at substantially identical frequency.

Referring to FIG. 24B, at processing block 2451, processing logic receives, at a switch, a packet destined to a mobile station. Processing logic then determines whether immediately transmitting the packet to the mobile station would cause interference with other communications destined to the mobile station (processing block 2452), using one of the aforementioned techniques. If processing logic determines that immediately transmitting the packet would cause interference, at processing block 2453, processing logic schedules the transmission of the packet to avoid the interference. In one embodiment, the transmission of the packet is scheduled such that no other communication is being transmitted to the mobile station at the scheduled time slot. Thereafter, processing logic transmits the packet to the mobile station according to the schedule (processing block 2454). If processing logic determines that there would be no interference to a transmission to the mobile station, the processing logic transmits the packet to the mobile station without delay (processing block 2455).

An Exemplary Plug-and-Playable Wireless Communication System

According to one embodiment, a repeater can be directly plugged into an available Ethernet jack, which connects to a switch port of a switch, and the repeater is ready to be used without requiring a site survey, contrary to a conventional 802.11 access point. Since the repeater does not have an IP address, there is no need for time-consuming IP address assignment or discovery that is required with a conventional 802.11 access point. As soon as a repeater is plugged in, the switch detects the presence of the repeater (e.g., by MAC address), adds the detected repeater to a database for management purposes, and configures the repeater with all necessary default configuration information. In one embodiment, the switch downloads the repeater control software and firmware. Thus, the repeater needs only a boot loader when installed to handle the configuration process, including the download. Once the repeater is configured, it starts to broadcast signals and a new coverage cell is created. The performance of the repeater coverage cells may be controlled and monitored by the switch using one of the aforementioned techniques.

Figure 25A:
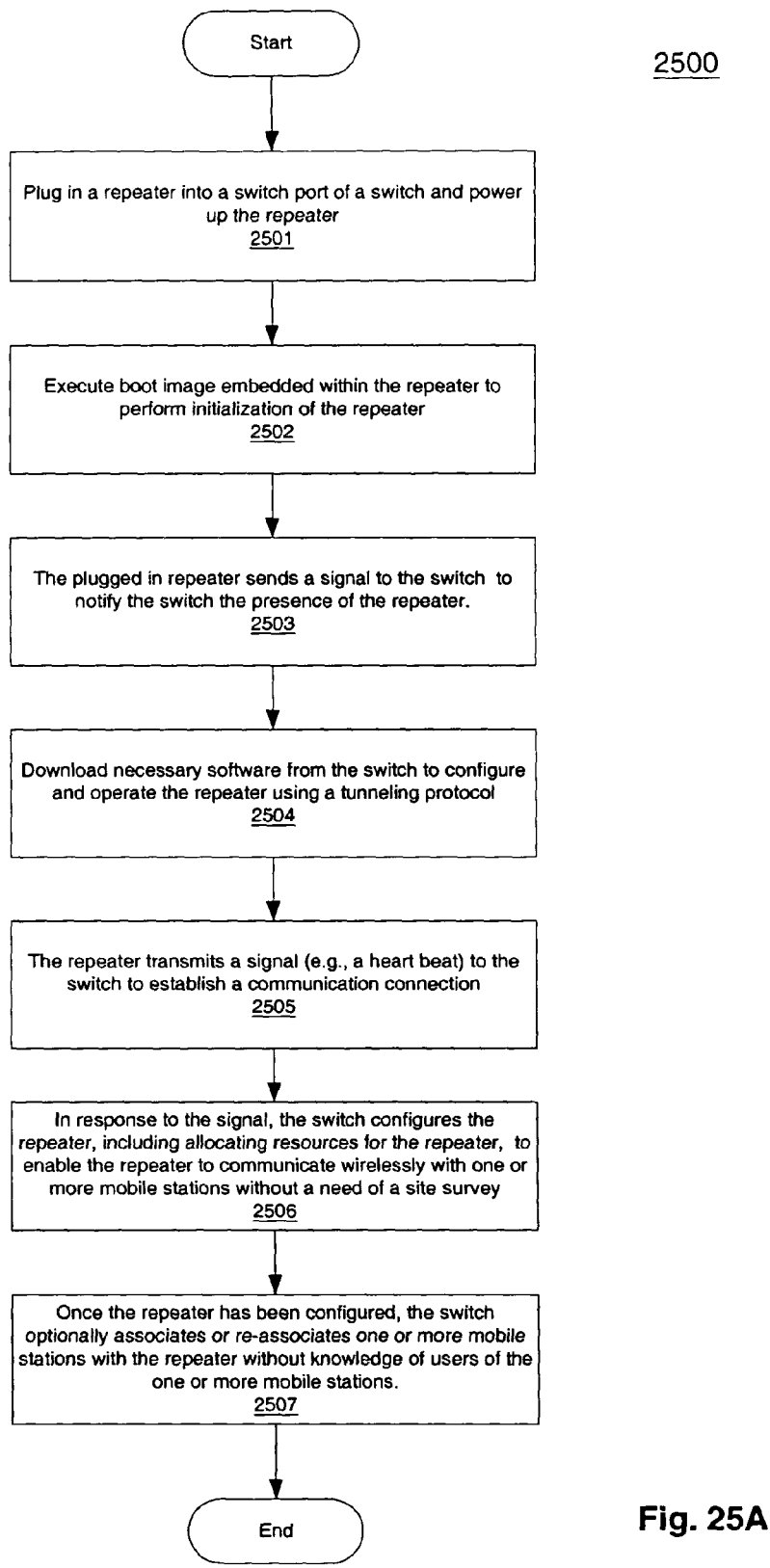
FIG. 25A is a flow diagram of an embodiment of a plug-and-play process in a wireless communication system.

FIG. 25A is a flow diagram of one embodiment of a plug-and-play process, which may be performed by a switch, a repeater, or both. The process may be performed by processing logic that may comprise hardware (circuitry, dedicated logic, etc.), software (such as is run on a general purpose computer system or a dedicated machine), or a combination of both. In one embodiment, exemplary process 2500 includes detecting, at a switch, a presence of a first repeater coupled to the switch and automatically configuring the first repeater to enable the first repeater to communicate wirelessly with a mobile station without a site survey.

Referring to FIG. 25A, at processing block 2501, when a repeater is plugged into a switch port of a switch, processing logic powers up the repeater. In one embodiment, the power is drawn from the switch over the Ethernet using power-over-Ethernet (PoE) technology. Once the repeater is powered up, at processing block 2502, processing logic loads the boot image embedded within the repeater into a memory and executes the boot image to perform initialization of the repeater. Once the repeater is initialized, at processing block 2503, processing logic sends a signal from the repeater to the switch to notify the switch the presence of the repeater. At processing block 2504, processing logic downloads necessary software from the switch to configure and operate the repeater using a proprietary tunneling protocol. Alternatively, once the switch detects the presence of the plugged repeater, the switch transmits the necessary software to the repeater to configure the repeater to operate. As a result, the repeater constantly maintains updated software from the switch. According to one embodiment, the repeater may periodically download updated software from the switch during normal operations.

Once the repeater has been configured and operates using the downloaded software, at processing block 2505, the repeater periodically transmits a signal, such as, for example, a heart beat signal, to the switch to maintain a connection. In response, at processing block 2506, processing logic of the switch configures the repeater, including allocating resources for the repeater, to enable the repeater to communicate wirelessly with one or more mobile stations. In one embodiment, the switch and the repeater may perform additional operations as a part of handshaking, such as, for example, determining a location of the repeater, etc.

According to another embodiment, the plugged-in repeater and other repeaters coupled to the switch, as well as the mobile stations communicating with the repeaters, are operating at substantially the same frequency using one of the aforementioned techniques. As a result, the plugged-in repeater and other repeaters are operating as an access point, similar to an 802.11 access point. Alternatively, the plugged-in repeater and other repeaters may be grouped in different groups operating at multiple communication frequencies, similar to different communication channels of an access point (e.g., a 802.11 access point), as described above.

According to one embodiment, the transmission of data between the repeaters and mobile stations are managed and controlled by the switch to avoid any interference. As a result, a repeater can be plugged-in and playable without a need of site survey, regardless the density of the repeaters, contrary to conventional access point designs. Once the plugged-in repeater is up and running, at processing block 2507, the switch may optionally associate or reassociate one or more mobile stations with the plugged-in repeater using one of the aforementioned techniques. Such association and reassociation of one or more mobile stations are performed transparently to users of the mobile stations.

Similarly, a repeater may be unplugged at any time without disrupting the services to the associated mobile stations. Users who want to reshape their network by removing or relocating repeaters can simply unplug the repeaters and move the repeaters to a new location. Based on a periodic heartbeat signal from all repeaters, the switch immediately detects any changes, sets off an alarm to the associated members, such as management console 2307 of FIG. 23, and adjusts the coverage pattern of neighboring cells accordingly. Such flexibility is a great benefit in a variety of environments, such as, for example, trade shows, conventions and exhibitions, and even military operations, where users need temporary wireless coverage that can be installed, reshaped and removed with a degree of speed and ease which are not available with conventional access points.

Figure 25B:
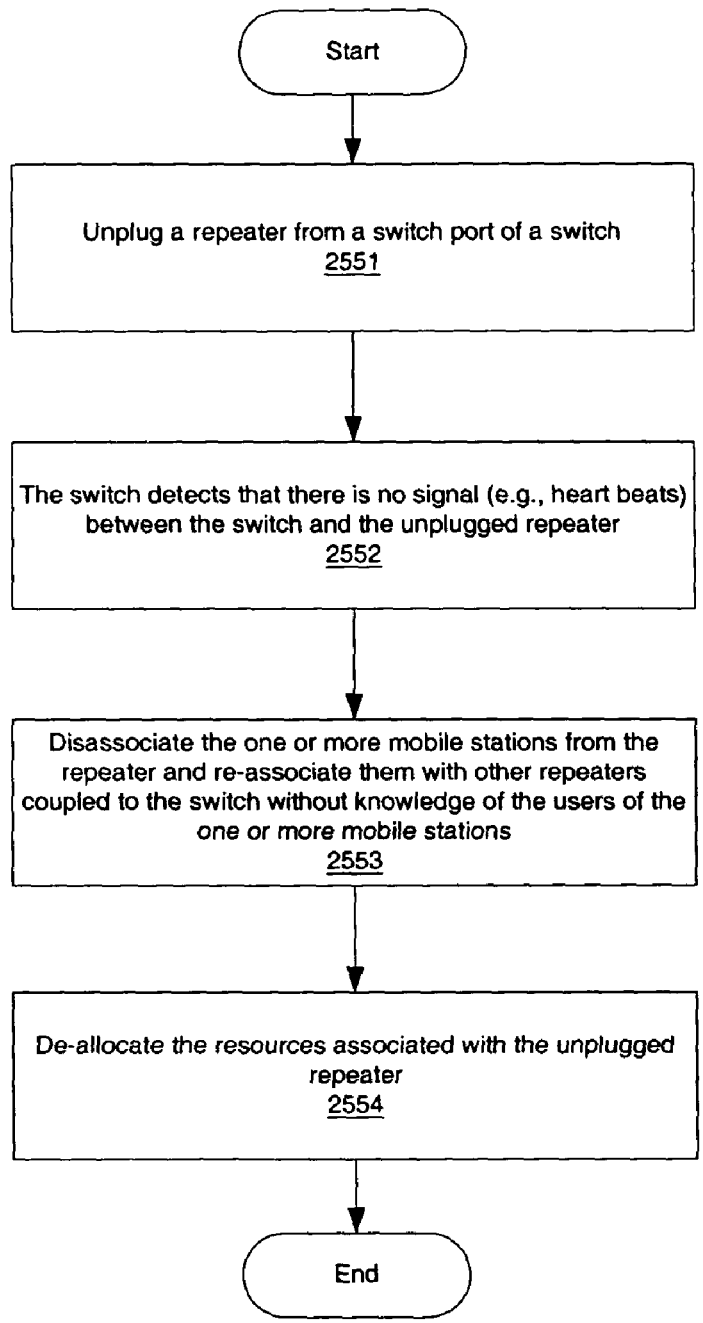
FIG. 25B is a flow diagram of another embodiment of a plug-and-play process in a wireless communication system.

FIG. 25B is a flow diagram of one embodiment of an unplug-and-play process, which may be performed by a switch, a repeater, or both. The process may be performed by processing logic that may comprise hardware (circuitry, dedicated logic, etc.), software (such as is run on a general purpose computer system or a dedicated machine), or a combination of both. Referring to FIG. 25B, at processing block 2551, a repeater is unplugged from a switch port of a switch. Once the repeater is unplugged, at processing block 2552, processing logic detects that the repeater has been unplugged. In one embodiment, the switch detects that the repeater has been unplugged because there is no signal (e.g., heartbeat signals) between the switch and the repeater. In response, at processing block 2553, processing logic may optionally disassociate one or more mobile stations associated with the unplugged repeater and reassociate them with other repeaters coupled to the switch using one of the aforementioned techniques. In one embodiment, the disassociation and reassociation are performed transparently to users of the mobile stations. At processing block 2554, processing logic of the switch may deallocate any resources associated with the unplugged repeater.

In one embodiment, as described above, multiple repeaters and their associated mobile stations may communicate with each other within the same communication channel, using substantially the same communication frequency. By using one of the aforementioned plug and play techniques, one or more repeaters may be installed within the same communication channel of a network without a site survey, where a traditional approach would cause interference.

An Exemplary Switch with a Public Interface

According to one embodiment, a switch communicating one or more repeaters includes functionality capable of identifying whether a mobile station is eligible to access an enterprise backbone directly. If so, the switch routes packets received from the mobile station to the enterprise backbone via an internal interface. However, if the switch determines that the mobile station is ineligible to access the enterprise backbone, the switch may route the packets to an external interface (e.g., a public interface), where the packets may be rerouted to the enterprise backbone via a publicly accessible network and thus go through normal security processes of the enterprise backbone, such as, for example, a firewall and authentication, etc. In one embodiment, the determination of whether the mobile station is eligible to directly access the enterprise backbone is performed based on a table (e.g., an extended Ethernet routing table) having Ethernet routing information and security policies associated with the mobile station, which will be described in details further below.

Figure 26:
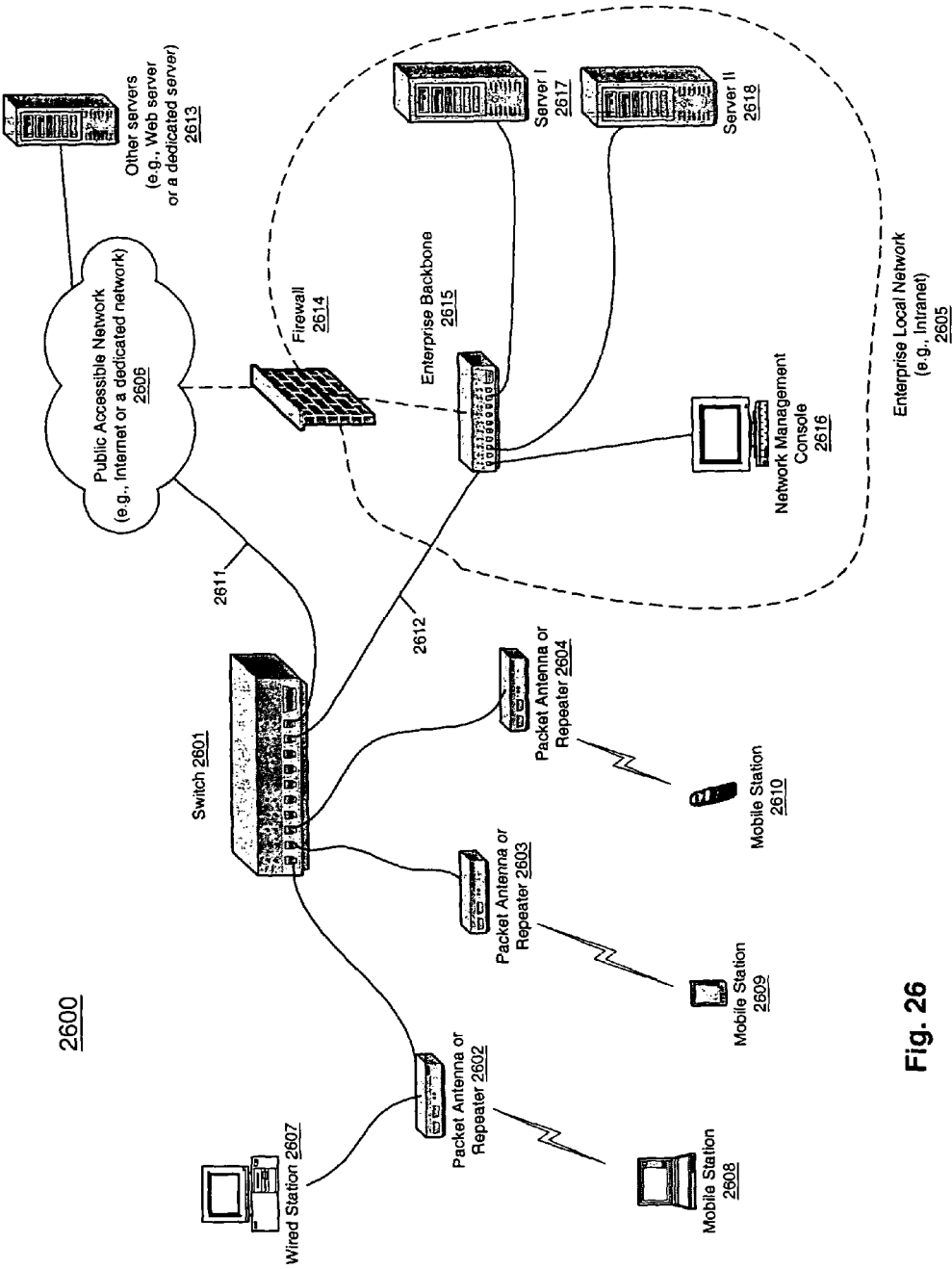
FIG. 26 is a block diagram of one embodiment of a communication system with a switch having a public interface.

FIG. 26 is a block diagram of an embodiment of communication system with a switch having a public interface. In one embodiment, exemplary system 2600 includes a switch having one or more switch ports coupling with one or more client nodes, a first interface coupled to a secure network, and a second interface coupled to a publicly accessible network. According to one embodiment, packets received from the one or more client nodes are routed to the first interface if the one or more client nodes are authenticated, and the packets are routed to the second interface if the one or more client nodes are not authenticated.

Referring to FIG. 26, exemplary system 2600 includes a switch 2601 having one or more switch ports coupled to one or more repeaters, such as repeaters 2602-2604. Repeaters 2602-2604 may wirelessly communicate with one or more mobile stations, such as mobile stations 2608-2610. In addition, each of the repeaters may include a wired port to allow a wired station, such as wired station 2607, to coupled to the switch 2601 via the wired port (not shown). Alternatively, wired station 2607 may directly couple to switch 2601 through a wired port (not shown) of switch 2601. Furthermore, the wired port of switch 2601 may be coupled to an uplink of another local area network, such as local area network 2311 of FIG. 23, via a hub.

According to one embodiment, repeaters 2602-2604 and mobile stations 2608-2610 may be operating at substantially the same communication frequency. The transmission of data between the repeaters 2602-2604 and mobile stations 2608-2610 may be managed and controlled by switch 2601 to avoid any interference, using one of the aforementioned techniques. According to another embodiment, repeaters 2608-2610 may be plug-and-playable using one of the aforementioned techniques without requiring a site survey.

Port 2612 of switch 2601 may be coupled to an enterprise local network 2605, such as, for example, an Intranet of an organization, via an enterprise backbone 2615. Within enterprise local network 2605, one or more servers, such as servers 2617 and 2618 may provide services to one or more mobile stations or clients (e.g., clients 2607-2610), via switch 2601.

In addition, switch 2601 includes a public interface (e.g., a public port) 2611 to allow a station, either a wired or a wireless station, to access a separate network, such as a publicly accessible network 2606. In one embodiment, the publicly accessible network may be an Internet. Alternatively, the public accessible network may be a dedicated network sponsored by an organization maintained either by the sponsored organization or by a third party. One or more servers 2613, such as Web servers or dedicated servers, may be coupled to network 2606.

When switch 2601 receives a request to access enterprise network 2605, switch 2601 determines whether the corresponding client is eligible to directly access enterprise network 2605 without further security processes (e.g., authentication). According to one embodiment, switch 2601 maintains a table (within a memory of switch 2601) having a security policy associated with each of clients that switch 2601 supports. The table may also include network routing information, such as Ethernet routing information (similar to those in an Ethernet routing table). When switch 2601 receives a request from a client accessing enterprise network 2605, switch 2601 accesses the table to determine whether the respective client is eligible to access enterprise network 2605.

In one embodiment, a mobile station is listed with limited access enterprise network 2605. A user may be given access to the mobile station with a password to gain access to the enterprise network 2605. When the mobile station enters the network, the switch attempts to authenticate it by obtaining its MAC address in the table. If it cannot authenticate the mobile station, it sends a page with a dialog box requesting the access information (e.g., a password). Once the password is entered on a dialog box on a display of the mobile station, switch 2601 checks the access policy for the mobile station and determines that the access by the mobile station must be indirect and forces connection through the public network. In this case, access privileges for the mobile station are set up with the table prior to its use.

In one embodiment, switch 2601 may perform any necessary authentication of the client. If switch 2601 determines that the client is eligible to access enterprise network 2605, switch 2601 may route the request (as well as the associated data packets) to the enterprise network 2605 via uplink 2612 without further security processes.

However, if switch 2601 determines that the client is ineligible to directly access enterprise network 2605, switch 2601 may route the request to publicly accessible network 2606 via public interface 2611. The request may ultimately access enterprise network 2605 via a normal gateway of enterprise network 2605 including, for example, firewall 2614 and a series of security processes (e.g., additional authentication). Alternatively, the client may access other facilities, such as Web servers 2613 via the Internet (e.g., publicly accessible network 2606). According to one embodiment, publicly accessible network 2606 may be a dedicated network maintained by an organization, such as, for example, a training facility.

These features are particularly useful when a visitor and an employee of an organization access enterprise network 2605 via switch 2601. For example, clients 2607 to 2609 may be employees of an organization having enterprise network 2605, while client 2610 may be a visitor of the organization. When clients 2607 to 2609 access switch 2601, switch 2601 determines that, via a table as described above, clients 2607 to 2609 are employees of the organization and routes the data of clients 2607 to 2609 to enterprise network 2605 via uplink 2612 without requiring further security processes. When client 2610 accesses switch 2601, switch 2601 determines, based on a security policy associated with client 2610, that client 2610 is not an employee of the organization, switch 2601 may route the data to publicly accessible network 2606 via public interface 2611.

In this embodiment, client 2610 may be just a visitor of the organization trying to access to Internet (e.g., Internet 2606). Alternatively, client 2610 may be, for example, a trainee attending a training course host by a dedicated facility (e.g., facility 2613) in a dedicated network (e.g., dedicated network 2606). Note that the dedicated network may be a securely separate network within enterprise network 2605. Alternatively, the dedicated network may be a remote facility maintained by a third party over a wide area network, such as Internet. Furthermore, client 2610 may be a visitor given a temporary permission to access enterprise network 2605. In this case, client 2610 may be required to access enterprise network 2605 via publicly accessible network (e.g., Internet) via a normal channel including, but not limited to, firewall 2614 and other necessary security processes (e.g., authentication).

Figure 27:
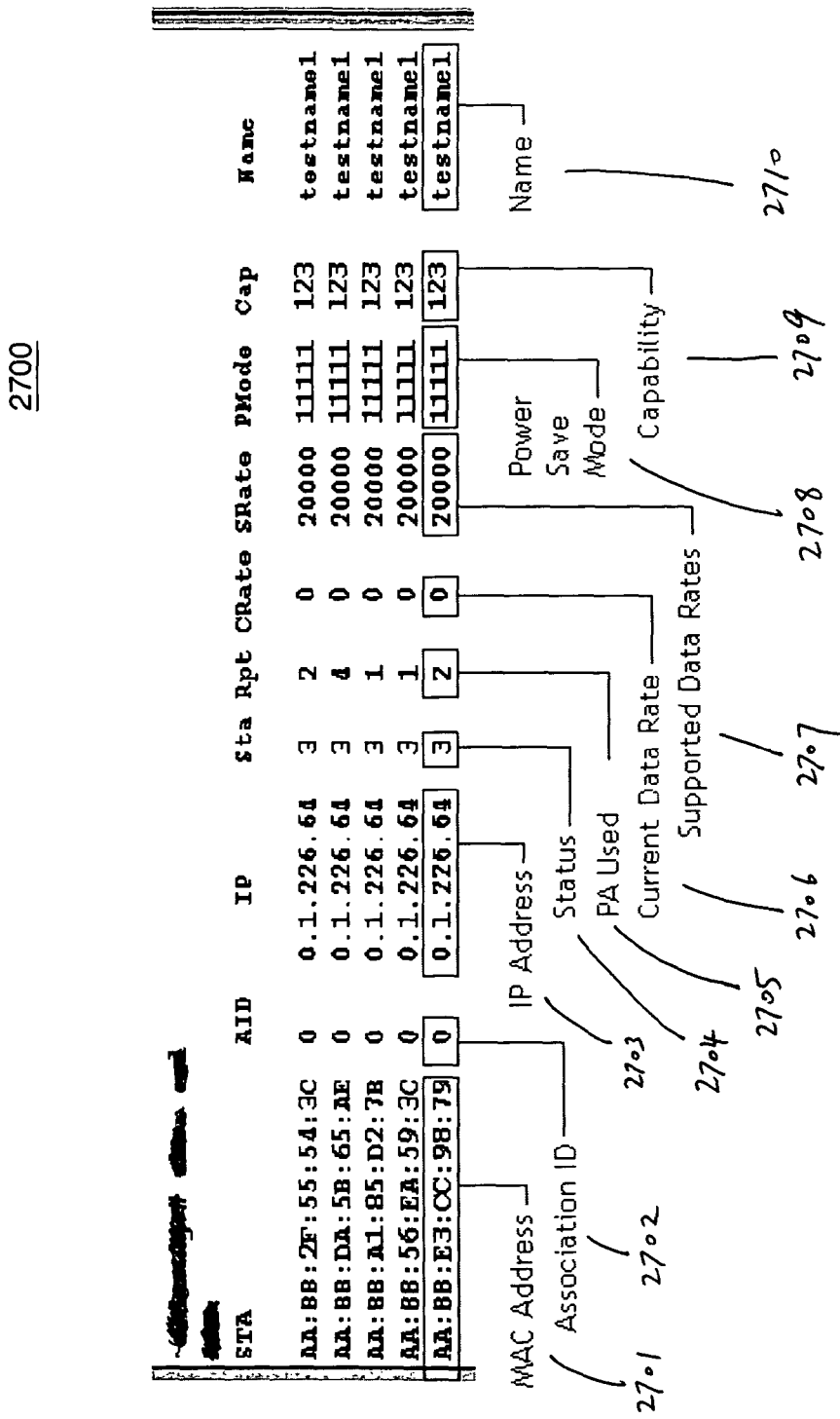
FIG. 27 is a block diagram of one embodiment of a table maintained by a switch.

As described above, according to one embodiment, the above determination may be performed via a table within the switch having Ethernet routing information and the security polices associated with each client. FIG. 27 is a block diagram of one embodiment of a table maintain within a switch. In one embodiment, in addition to Ethernet routing information, exemplary table 2700 includes a list of active clients currently coupled to a switch. Table 2700 may be configured and set up by a network administrator via a management station, such as network management console 2616.

Referring to FIG. 27, according to one embodiment, exemplary table 2700 includes, for each client coupled to the switch (either a wireless or a wired client), a MAC address 2701, an association ID 2702, an IP address 2703, status 2704, an associated repeater (also referred to as a packet antenna) 2705, and a current rate 2706. Association ID 2702 may be a unique numeric ID assigned to each client when the respective client is coupled to the switch and associated with one of the repeaters using one of the aforementioned techniques. Status 2704 may include status of each client. In one embodiment, an exemplary status may include one of the following:

| Status | Descriptions |
|---|---|
| 1 | Not authenticated or associated |
| 2 | Authenticated but not associated |
| 3 | Authenticated and associated |

An associated repeater is represented by an ID assigned and maintained by the switch. The repeater's ID is assigned by the switch when the respective repeater is plugged into a switch port of the switch, during a plug-and-playable operation described above. Similarly, when a repeater is unplugged from the switch, the corresponding ID is released back to the ID pool for future usage. Current data rate 2706 represents a data rate which a respective client connected to the switch is sending and receiving packets over connection, either a wireless or a wired connection.

In addition, according to one embodiment, table 2700 may include, but not limited to, supported data rate 2707 (e.g., maximum data rate allowed for the respective client), current power mode 2708 of the client which may be controlled by the switch using one of the aforementioned techniques, capacity mask 2709, and a user name 2710 assigned to the respective client. It will be appreciated that other information may be included in the table. For example, exemplary table 2700 may include a status concerning whether a Web or a VPN (virtual private network) has been enabled and whether a client is an unauthorized client (e.g., a visitor) or an authorized client (e.g., an employee). Alternatively, exemplary table 2700 may include an indication indicating an authentication method, such as RADIUS, involved between the switch and the client. Other information apparent to one with ordinary skill in the art may be included in table 2700.

Figure 28:
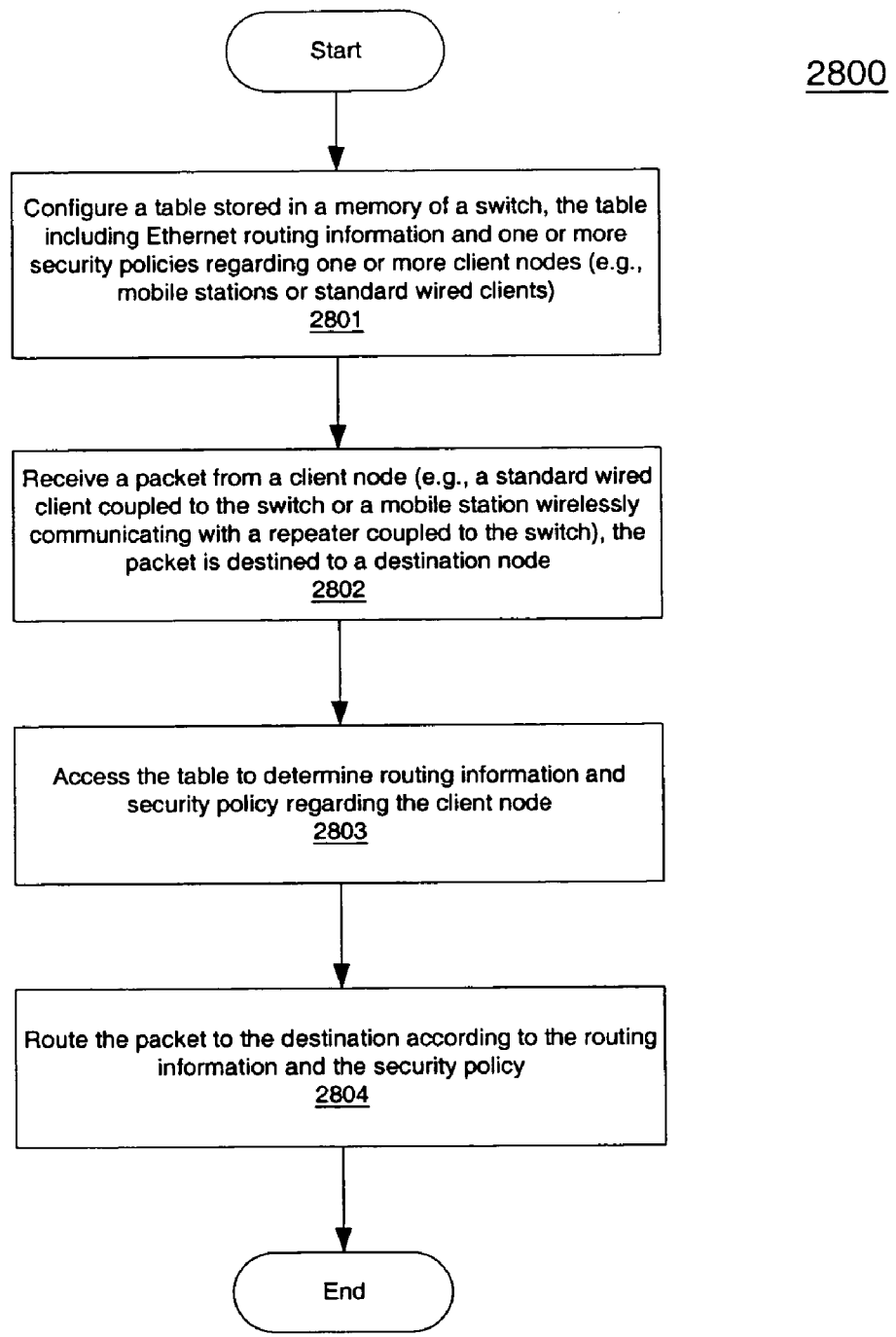
FIG. 28 is a flow diagram of an embodiment of a process which may be performed by a switch.

FIG. 28 is a flow diagram of one embodiment of a process which may be performed by a switch. The process may be performed by processing logic that may comprise hardware (circuitry, dedicated logic, etc.), software (such as is run on a general purpose computer system or a dedicated machine), or a combination of both. In one embodiment, exemplary process 2800 includes receiving, at a switch, a packet from a client device, the packet destined to a destination device, accessing a table within the switch, the table having Ethernet routing information and a security policy regarding the client device, and routing the packet to the destination device based on the Ethernet routing information and the security policy.

Referring to FIG. 28, initially at processing block 2801, processing logic configures a table stored in a memory of a switch. The table may include network routing information, such as Ethernet routing information, and one or more security policies regarding one or more clients including wireless clients and wired clients. In one embodiment, the table may be configured by a network administrator via a network management station, such as network management console 2616 of FIG. 26 using a remote access protocol (e.g., telnet). At processing block 2802, a packet is received from a client (e.g., a standard wired client or a wireless client) destined to a destination node. At processing block 2803, processing logic accesses the table to determine the routing information and the security policy associated with the client. At processing block 2804, processing logic routes the packet to the destination according to the routing information and the security information retrieved from the table.

Figure 29:
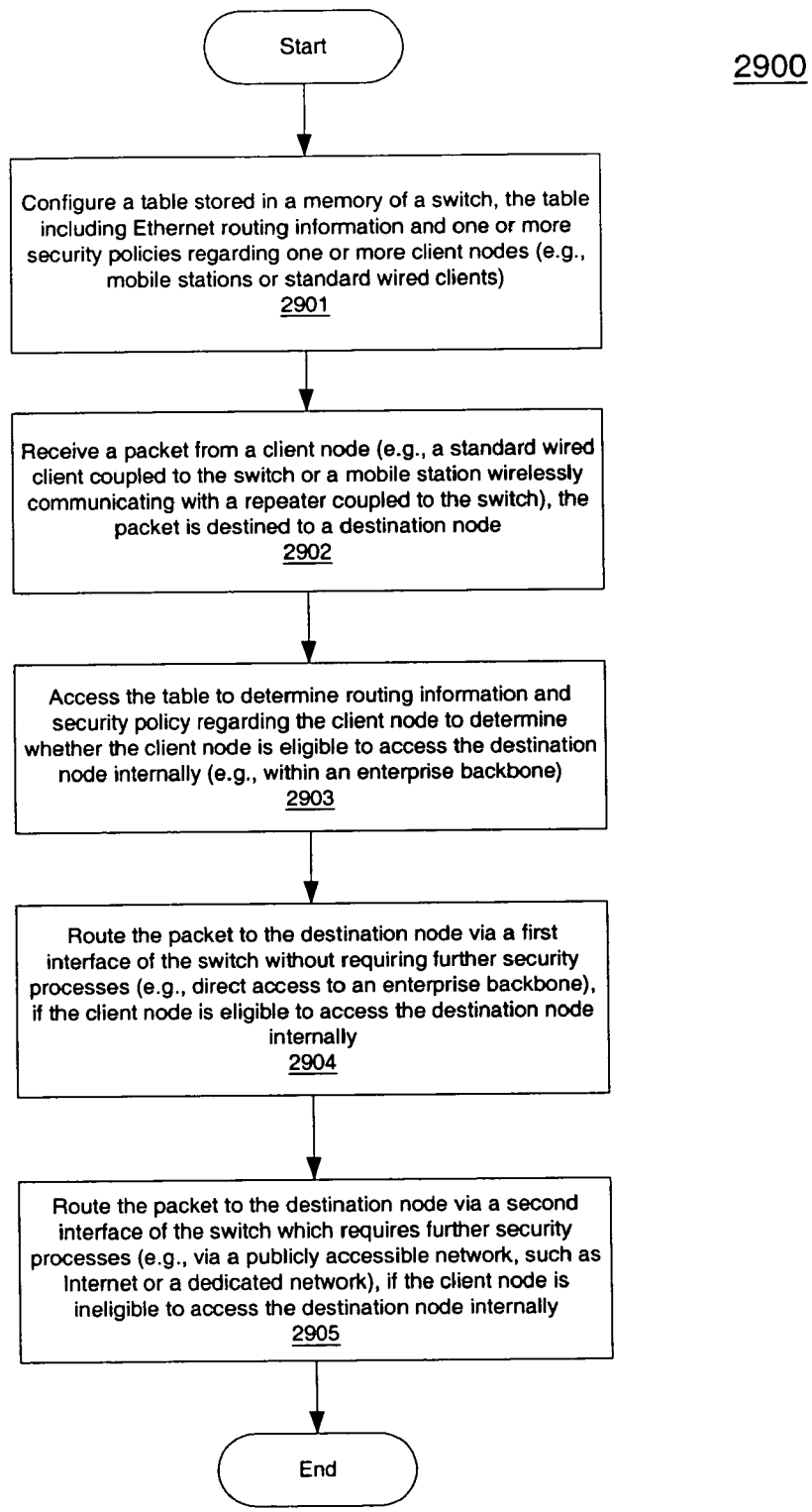
FIG. 29 is a flow diagram of another embodiment of a process which may be performed by a switch.

FIG. 29 is a flow diagram of an embodiment of a process which may be performed by a switch. The process may be performed by processing logic that may comprise hardware (circuitry, dedicated logic, etc.), software (such as is run on a general purpose computer system or a dedicated machine), or a combination of both. In one embodiment, exemplary process 2900 includes receiving, at a switch, a packet from a client node, the packet destined to a destination node, determining whether the client node is eligible to internally access the destination node, routing the packet to the destination node via a first interface of the switch without requiring further security processes, if the client node is eligible to access the destination node internally, and routing the packet to the destination node via a second interface of the switch which requires further security processes, if the client node is ineligible to access the destination node internally.

Referring to FIG. 29, initially at processing block 2901, processing logic configures a table stored in a memory of a switch. The table may include network routing information, such as Ethernet routing information, and one or more security policies regarding one or more clients including wireless clients and wired clients. In one embodiment, the table may be configured by a network administrator via a network management station, such as network management console 2616 of FIG. 26 using a remote access protocol (e.g., telnet). At processing block 2902, a packet is received from a client (e.g., a standard wired client or a wireless client) destined to a destination node. At processing block 2903, processing logic accesses the table to determine the routing information and the security policy associated with the client to determine whether the client is eligible to access the destination node internally (e.g., within an enterprise network, such as network 2605 of FIG. 26). At processing block 2904, if processing logic determines that the client is eligible, processing logic routes the packet to the destination via an internal interface (e.g., an uplink) without further requiring security processes. If, however, at processing block 2905, processing logic determines that the client is ineligible, processing logic routes the packet to the destination node via a public interface (e.g., a public port) of the switch which may requires further security processes.

An Exemplary Satellite Communication System

Figure 30:
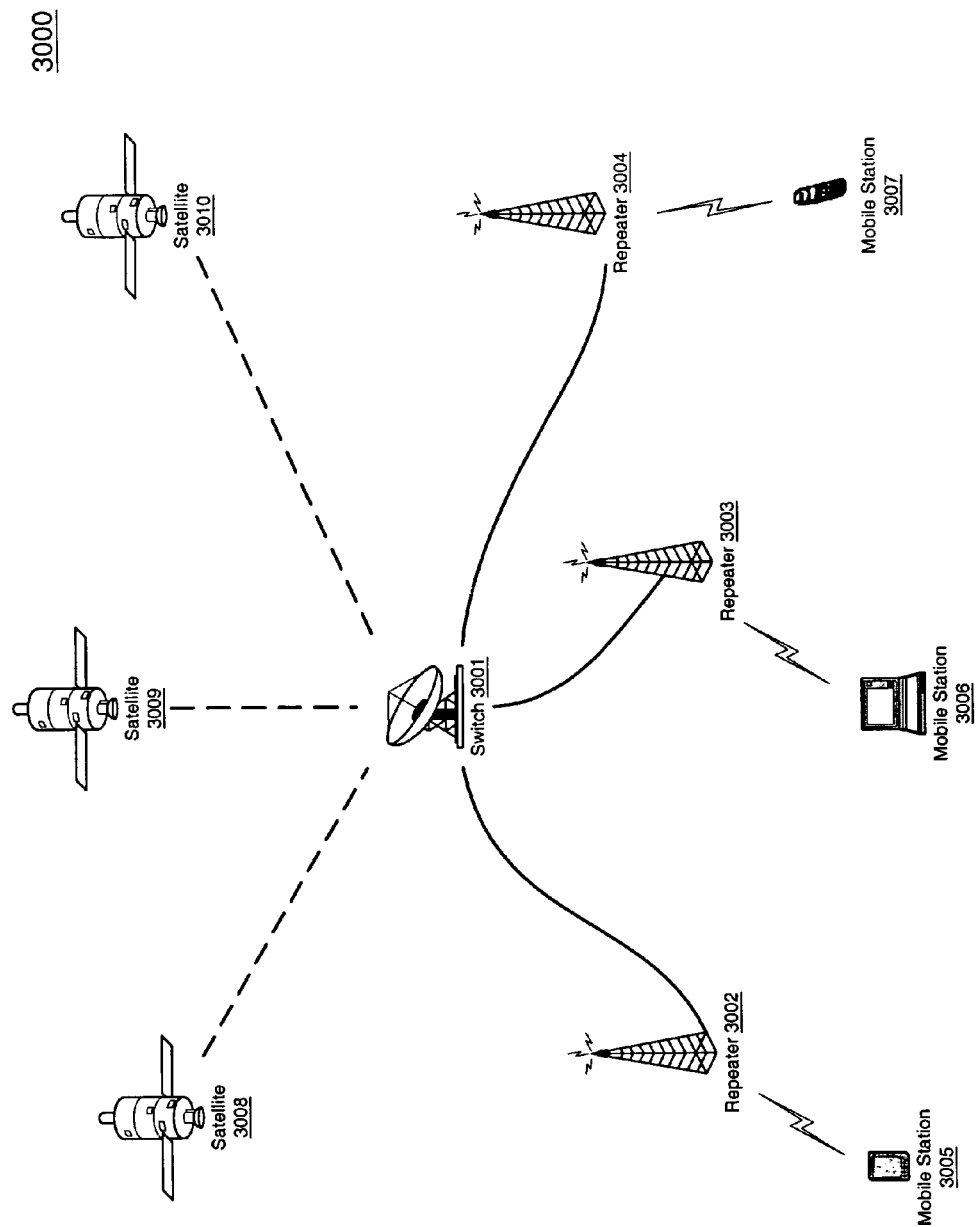
FIG. 30 is a block diagram of an embodiment of a satellite communication system.

Although the techniques described above are primarily described in an IEEE 802.11 environment, it will be appreciated that the techniques may be applied to other communication networks, such as a satellite network. FIG. 30 is a block diagram of one embodiment of a wireless network. In one embodiment, exemplary system 3000 includes a switch 3001 coupled to one or more repeaters 3002 to 3004 which wirelessly communicating with one or more mobile stations 3005 to 3007. Switch 3001 also communicates with one or more satellites 3008 to 3010. In one embodiment, the processes of data may be split between switch 3001 and repeaters 3002 to 3004 using a technique similar to those described above. According to one embodiment, repeaters 3002 to 3004 and mobile stations 3005 to 3007 may be operate at substantially the same frequency. Switch 3001 may manage transmission of data (e.g., scheduling) to avoid interference. The techniques may be applied to a variety of satellite communication systems, such as, for example, CDMA (Code Division Multiple Access), TDMA (Time Division Multiple Access), or SDMA (Synchronous Code Division Multiple Access), or different technology generations such as 1G, 2G or 3G and beyond. Other techniques described above are also applied to system 3000.

The techniques described herein may be applicable to other wireless communication systems, such as GSM (Global System for Mobile Communications), and other protocols such as IEEE 802.16.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method, comprising:
configuring, by a switch, a plurality of repeaters operating at a substantially identical communication frequency to coordinate transmissions of first and second data packets to first and second mobile stations, respectively, that are wirelessly communicatively coupled to a repeater from among the plurality of repeaters, the first data packet being characterized as having a first address that corresponds to the first mobile station and the second data packet being characterized as having a second address that corresponds to the second mobile station;
performing, by the switch, an address translation on the first and second addresses to identify a switch port from among a plurality of switch ports that corresponds to the repeater;
determining, by the switch, whether wirelessly transmitting the first and second data packets from the repeater to the first and second mobile stations, respectively, will create interference between the first and second data packets; and
transmitting, by the switch, the first and second data packets through the switch port to the repeater at different times when it is determined that wirelessly transmitting the first and second data packets from the repeater will create interference.

2. The method of claim 1, further comprising:
operating the plurality of repeaters as a communication channel in accordance with a wireless communication protocol.

3. The method of claim 1, wherein the step of transmitting the first and second data packets through the switch port comprises:
scheduling, by the switch, transmissions of the first and second data packets through the switch port to avoid interference that would prevent the first and second data packets from being received by the first and second mobile stations, respectively.

4. The method of claim 3, wherein the step of transmitting the first and second data packets through the switch port further comprises:
transmitting the first and second data packets through the switch port without performing the scheduling, if transmitting the first and second data packets from the repeater to the first and second mobile stations, respectively, will not create interference between the first and second data packets.

5. The method of claim 4, wherein transmitting the first and second data packets from the repeater to the first and second mobile stations, respectively, will create interference between the first and second data packets, and wherein the step of transmitting the first and second data packets through the switch port further comprises:
transmitting the first and second data packets through the switch port according to the scheduling.

6. The method of claim 1, further comprising:
coordinately scheduling, at the plurality of repeaters, transmissions of the first and second data packets to avoid interference that would prevent one or both of the transmissions from being received by the first and second mobile stations when it is determined that wirelessly transmitting the first and second data packets from the repeater will create interference.

7. The method of claim 1, wherein the step of determining whether wirelessly transmitting the first and second data packets comprises:
determining whether the first and second data packets are to be transmitted substantially simultaneously to the first and second mobile stations, respectively, and
wherein the step of transmitting the first and second data packets through the switch port comprises:
transmitting the first and second data packets through the switch port at different time slots to avoid the interference if the first and second data packets are to be transmitted substantially simultaneously.

8. The method of claim 1, wherein the step of determining whether wirelessly transmitting the first and second data packets will create interference comprises:
maintaining in a database information regarding whether communications of the repeater will interfere with communications of another repeater from among the plurality of repeaters.

9. The method of claim 8, wherein the step of determining whether wirelessly transmitting the first and second data packets will create interference further comprises:
examining the database to determine whether the communications of the repeater will interfere with the communications of the another repeater, and
wherein the step of transmitting the first and second data packets through the switch port comprises:
delaying one of the first and second data packets to be transmitted by the repeater to its respective mobile station if the communications of the repeater will interfere with the communications of the another repeater.

10. The method of claim 8, further comprising:
periodically transmitting, by the switch, a test packet through the switch port to collect interference information.

11. The method of claim 1, wherein the step of determining whether wirelessly transmitting the first and second data packets will create interference comprises:
maintaining in a database a list of mobile stations and a corresponding plurality of repeaters that last received transmissions from the mobile stations.

12. The method of claim 11, wherein the step of determining whether wirelessly transmitting the first and second data packets will create interference further comprises:
examining the database to determine whether the repeater will interfere with transmissions from another repeater from among the plurality of repeaters when transmitting substantially currently, and
wherein the step of transmitting the first and second data packets through the switch port comprises:
delaying transmissions of one of the first and second packets to its respective mobile station if the transmissions from the repeater will interfere with the transmissions from the another repeater.

13. The method of claim 1, wherein the first and second addresses are a first destination internet protocol (IP) address that corresponds to the first mobile station and a second destination IP address that corresponds to the second mobile station, respectively, wherein the repeater is characterized as having a Ethernet Media Access Control (MAC) address from among a plurality of Ethernet MAC addresses, and wherein the step of performing the address translation on the first and second addresses comprises:
performing the address translation on the first and second destination IP addresses to determine the Ethernet MAC address of the repeater from among the plurality of Ethernet MAC addresses; and;
identifying the switch port from among the plurality of switch ports that corresponds to the Ethernet MAC address of the repeater.

14. A method, comprising:
receiving, by a switch, first and second data packets designated for transmission to a first mobile station and a second mobile station, respectively, via a plurality of repeaters transmitting on a substantially identical communication frequency, the first data packet being characterized as having a first address that corresponds to the first mobile station and the second data packet being characterized as having a second address that corresponds to the second mobile station;
performing, by the switch, an address translation on the first and second addresses to identify a switch port from among a plurality of switch ports that corresponds to the repeater;
detecting, by the switch, whether overlapping transmissions of the first and second data packets will result in interference that would prevent completion of transmissions of the first and second data packets; and
scheduling, by the switch, the transmissions of the first and second data packets via the switch port to avoid the interference if the overlapping transmissions of the first and second data packets will result in interference that would prevent completion of the transmissions of the first and second data packets.

15. The method of claim 14, wherein if the overlapping transmissions of the first and second data packets will not result in interference that would prevent completion of the transmissions of the first and second data packets, the method further comprising:
transmitting, by the switch, the first and second data packets through the switch port to the repeater without delay.

16. The method of claim 14, wherein the plurality of repeaters are configured to operate as a communication channel in accordance with a wireless communication protocol.

17. The method of claim 14, wherein the first and second addresses are a first destination internet protocol (IP) address that corresponds to the first mobile station and a second destination IP address that corresponds to the second mobile station, respectively, wherein the repeater is characterized as having a Ethernet Media Access Control (MAC) address from among a plurality of Ethernet MAC addresses, and wherein the step of performing the address translation on the first and second addresses comprises:
performing the address translation on the first and second destination IP addresses to determine the Ethernet MAC address of the repeater from among the plurality of Ethernet MAC addresses; and
identifying the switch port from among the plurality of switch ports that corresponds to the Ethernet MAC address of the repeater.

18. A method, comprising:
receiving, by a switch coupled to a plurality of repeaters, a data packet destined to a mobile station, the data packet being characterized as having an address that corresponds to the mobile station;
performing, by the switch, an address translation on the address to identify a switch port from among a plurality of switch ports that corresponds to a repeater from among the plurality of repeaters that is wirelessly communicatively coupled to the mobile station;
determining, by the switch, whether immediately transmitting the packet from the repeater to the mobile station will cause an interference with other communications destined to the mobile station; and transmitting, by the switch, the packet through the switch port to the repeater when it is determined that immediately transmitting the packet will not cause interference.

19. The method of claim 18, wherein the plurality of repeaters are configured to operate as a communication channel in accordance with a wireless communication protocol.

20. The method of claim 18, further comprising:
delaying transmission of the packet through the switch port if it is determined that immediately transmitting the packet would cause the interference.

21. The method of claim 20, wherein the step of delaying the transmission of the packet comprises:
scheduling the transmission of the packet at an alternative time slot where no other communications destined to the mobile station are occurring if it is determined that immediately transmitting the packet would not cause the interference.

22. The method of claim 20, further comprising:
transmitting the packet through the switch port without delay when it is determined that immediately transmitting the packet will cause the interference.

23. The method of claim 18, wherein the address is a destination internet protocol (IP) address that corresponds to the mobile station, wherein the repeater is characterized as having a Ethernet Media Access Control (MAC) address from among a plurality of Ethernet MAC addresses, and wherein the step of performing the address translation on the address comprises:

performing, by the switch, the address translation on the destination IP address to determine the Ethernet MAC address of the repeater from among the plurality of Ethernet MAC addresses; and identifying the switch port from among the plurality of switch ports that corresponds to the Ethernet MAC address of the repeater.

24. The method of claim 23, wherein the address translation is performed via a table stored within the switch.

25. A system, comprising:
a plurality of communication devices coupled to a switch, the plurality of communication devices communicating wirelessly over substantially the same communication frequency with a plurality of mobile stations,
wherein the switch is configured to coordinate transmissions of first and second data packets to first and second mobile stations from among the plurality of mobile stations, the first data packet being characterized as having a first address that corresponds to the first mobile station and the second data packet being characterized as having a second address that corresponds to the second mobile station, the coordinating including:
performing, by the switch, an address translation on the first and second addresses to identify a switch port from among a plurality of switch ports that corresponds to a communication device from among the plurality of communication devices;
determining, by the switch, whether wirelessly transmitting the first and second data packets from the communication device to the first and second mobile stations, respectively, will create interference between the first and second data packets; and
transmitting, by the switch, the first and second data packets through the switch port to the communication device at different times when it is determined that wirelessly transmitting the first and second data packets from the communication device will create interference.

26. The system of claim 25, wherein the switch is configured to manage communications between the plurality of communication devices and the plurality of mobile stations.

27. The system of claim 25, wherein the plurality of communication devices are configured to operate as a communication channel in accordance with a wireless communication protocol.

28. An apparatus, comprising:
means for configuring a plurality of repeaters operating at a substantially identical frequency to coordinate transmissions of first and second data packets to first and second mobile stations, respectively, that are wirelessly communicatively coupled to a repeater from among the plurality of repeaters, the first data packet being characterized as having a first address that corresponds to the first mobile station and the second data packet being characterized as having a second address that corresponds to the second mobile station;

means for performing an address translation on the first and second addresses to identify a switch port from among a plurality of switch ports that corresponds to the repeater;

means for determining whether wirelessly transmitting the first and second data packets from the repeater to the first and second mobile stations, respectively, will create interference between the first and second data packets; and means for transmitting the first and second data packets through the switch port to the repeater at different times when it is determined that wirelessly transmitting the first and second data packets from the repeater will create interference.

29. An apparatus, comprising:
means for receiving first and second data packets designated for transmission to first and second mobile stations, respectively, via a plurality of repeaters transmitting on a substantially identical communication frequency, the first data packet being characterized as having a first address that corresponds to the first mobile station and the second data packet being characterized as having a second address that corresponds to the second mobile station;

means for performing an address translation on the first and second addresses to identify a switch port from among a plurality of switch ports that corresponds to the repeater;

means for detecting whether overlapping transmissions of the first and second data packets will result in interference that would prevent completion of transmissions of the first and second data packets; and means for scheduling the transmissions of the first and second data packets via the switch port to avoid the interference if the overlapping transmissions of the first and second data packets will result in interference that would prevent completion of the transmissions of the first and second data packets.

30. An apparatus, comprising:
means for receiving a packet destined to a mobile station, the data packet being characterized as having an address that corresponds to the mobile station;

means for performing an address translation on the address to identify a switch port from among a plurality of switch ports that corresponds to a repeater from among a plurality of repeaters that is wirelessly communicatively coupled to the mobile station, the plurality of repeaters being coupled to the switch;

means for determining whether immediately transmitting the packet from the repeater to the mobile station will cause an interference with other communications destined to the mobile station; and means for transmitting the packet through the switch port to the repeater when it is determined that immediately transmitting the packet will not cause interference.

* * * * *

UNITED STATES PATENT AND TRADEMARK OFFICE
CERTIFICATE OF CORRECTION

| | | |
|---|---|---|
| PATENT NO. | : 8,027,637 B1 | Page 1 of 1 |
| APPLICATION NO. | : 10/661107 | |
| DATED | : September 27, 2011 | |
| INVENTOR(S) | : Harry Bims | |

It is certified that error appears in the above-identified patent and that said Letters Patent is hereby corrected as shown below:

Title page, item (56), OTHER PUBLICATIONS section, "Bim, Harry, "Plug-n-playable Wireless Communication System"" should be replaced with --Bims, Harry, "Plug-n-playable Wireless Communication System"--.

Title page, item (56), OTHER PUBLICATIONS section, "Bim, Harry, "Tunneling Protocols for Wireless Communications"" should be replaced with --Bims, Harry, "Tunneling Protocols for Wireless Communications"--.

Title page, item (57), ABSTRACT section, "at different time" should be replaced with --at different times--.

Title page, item (57), ABSTRACT section, "at time when the transmissions overlap" should be replaced with --at times when the transmissions overlap--.

At column 39, line 30, "a Ethernet Media Access Control" should be replaced with --an Ethernet Media Access Control--.

At column 40, line 15, "a Ethernet Media Access Control" should be replaced with --an Ethernet Media Access Control--.

At column 40, line 55, "the packet would not cause the interference" should be replaced with --the packet would cause the interference--.

At column 40, line 60, "the packet will cause the interference" should be replaced with --the packet will not cause the interference --.

At column 40, line 64, "a Ethernet Media Access Control" should be replaced with --an Ethernet Media Access Control--.

Signed and Sealed this
Sixth Day of March, 2012

David J. Kappos
*Director of the United States Patent and Trademark Office*